(12) United States Patent
Alkhalifa et al.

(10) Patent No.: US 12,524,262 B1
(45) Date of Patent: Jan. 13, 2026

(54) INTEGRATED AI-DRIVEN AND COMPLIANCE-AWARE MULTI-STATE ENCODING FRAMEWORK

(71) Applicant: SGM Infotech, LLC, Ashburn, VA (US)

(72) Inventors: Abubakr Y. Alkhalifa, Alpharetta, GA (US); Mufida Elkhalifa, Alpharetta, GA (US); Mohamed Yousif Elkhalifa, Alpharetta, GA (US)

(73) Assignee: SGM Infotech, LLC, Ashburn, VA (US)

( * ) Notice: Subject to any disclaimer, the term of this patent is extended or adjusted under 35 U.S.C. 154(b) by 0 days.

(21) Appl. No.: 19/198,817

(22) Filed: May 5, 2025

(51) Int. Cl.
*G06F 9/455* (2018.01)

(52) U.S. Cl.
CPC ............ *G06F 9/45558* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 4,231,023 A | 10/1980 | Warner | |
| 5,633,631 A | 5/1997 | Teckman | |
| 10,454,495 B2 | 10/2019 | Motwani | |
| 10,819,369 B2 | 10/2020 | Arelakis | |
| 11,720,813 B2 | 8/2023 | Babu | |
| 11,836,520 B2 | 12/2023 | Yu | |
| 11,849,128 B2 | 12/2023 | Rippel | |
| 12,184,309 B2 | 12/2024 | Martelock | |
| 2019/0354283 A1* | 11/2019 | Rowstron | G06F 3/0653 |
| 2020/0242511 A1 | 7/2020 | Kale | |
| 2021/0144190 A1 | 5/2021 | Amirpour | |
| 2021/0264025 A1 | 8/2021 | Givental | |
| 2021/0334475 A1 | 10/2021 | He | |
| 2025/0193077 A1* | 6/2025 | Masood | H04L 41/16 |

FOREIGN PATENT DOCUMENTS

| | | |
|---|---|---|
| WO | WO2020159568 A1 | 8/2020 |
| WO | WO2022120100 A1 | 6/2022 |

* cited by examiner

*Primary Examiner* — Wynuel S Aquino
(74) *Attorney, Agent, or Firm* — H. Brock Kolls

(57) ABSTRACT

The present invention relates to adaptive multi-state encoding and processing in virtualized computing environments. The system includes a virtualized state selection module that dynamically transitions between binary, ternary, quaternary, and higher-order encoding states based on workload, bandwidth, security posture, and compliance requirements. A virtual encoding engine utilizes hardware-accelerated components, such as vFPGAs, vGPUs, and cTPUs, to enhance encoding throughput. A compliance-driven feedback controller continuously monitors encoding efficiency, threat levels, and adherence to mandates such as GDPR, HIPAA, and FIPS 140-3. Additional features include AI-based anomaly detection, federated model refinement, distributed ledger-backed audit trails, and quantum-resistant encoding techniques. By integrating intelligent encoding decisions with scalable compliance enforcement, the system enables high-performance, secure, and regulation-ready data processing across distributed cloud and edge environments, delivering measurable improvements in system responsiveness, data integrity, and operational trust.

20 Claims, 21 Drawing Sheets

Adaptive Multi-State Encoding And Processing In A Virtualized Computing Environment (MSVT)

Data Transmission, Storage, And Security Applications

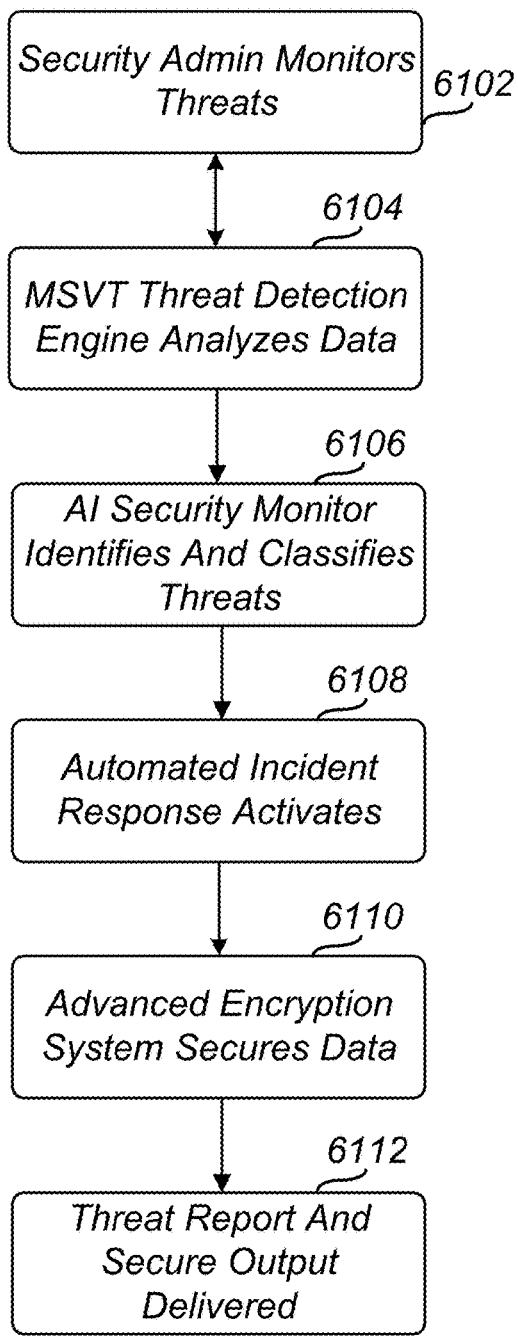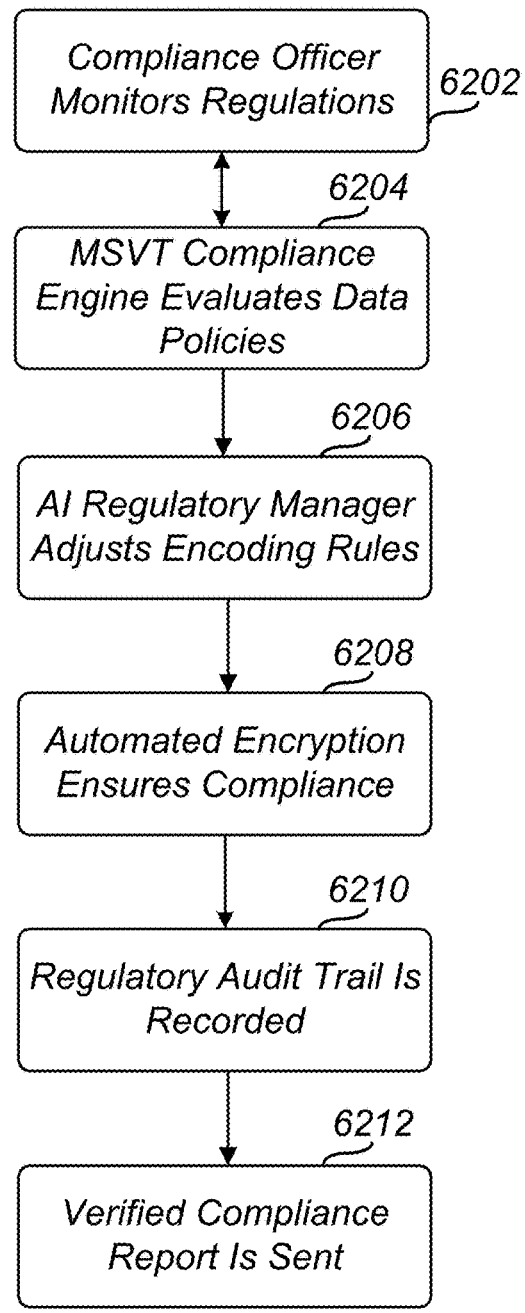
Fig. 2B
Fig. 2C

For Each Episode:
    Initiated state
    While not done:
        Select action via ε-greedy policy
        Apply action
        Observe next state
        Compute reward
        Store experience and policy
    Training loop

Fig. 7

| Encoding Model | Latency Reduction % | Processing Efficiency Increase % | Computational Cost Reduction % |
|---|---|---|---|
| Traditional Binary | 0 | 0 | 0 |
| Static Multi-Level | 10 | 8 | 12 |
| MSVT AI-Driven | 20 | 15 | 30 |

108

| AI Model | Encoding Adaptability | Learning Efficiency | Computational Complexity |
|---|---|---|---|
| Q-Learning | Moderate | Low | Low |
| Deep Q-Networks | High | Moderate | Moderate |
| Policy Gradient Methods | High | High | High |

| Feature | Prior Approach | MSVT Adaptive Security |
|---|---|---|
| Encryption Adaptability | Static | Dynamic |
| Threat Response Time | Slow | Fast |
| Data Integrity Protection | Limited | Strong |
| Anomaly Detection | Basic | AI-Driven |

Fig. 9   112

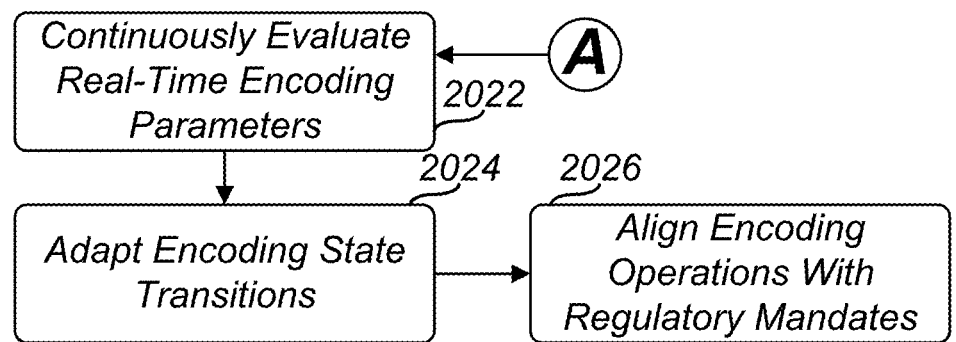
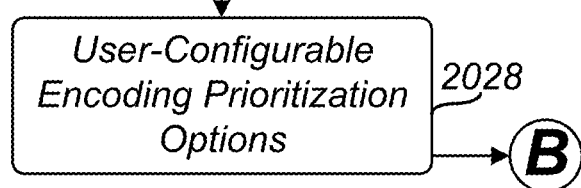
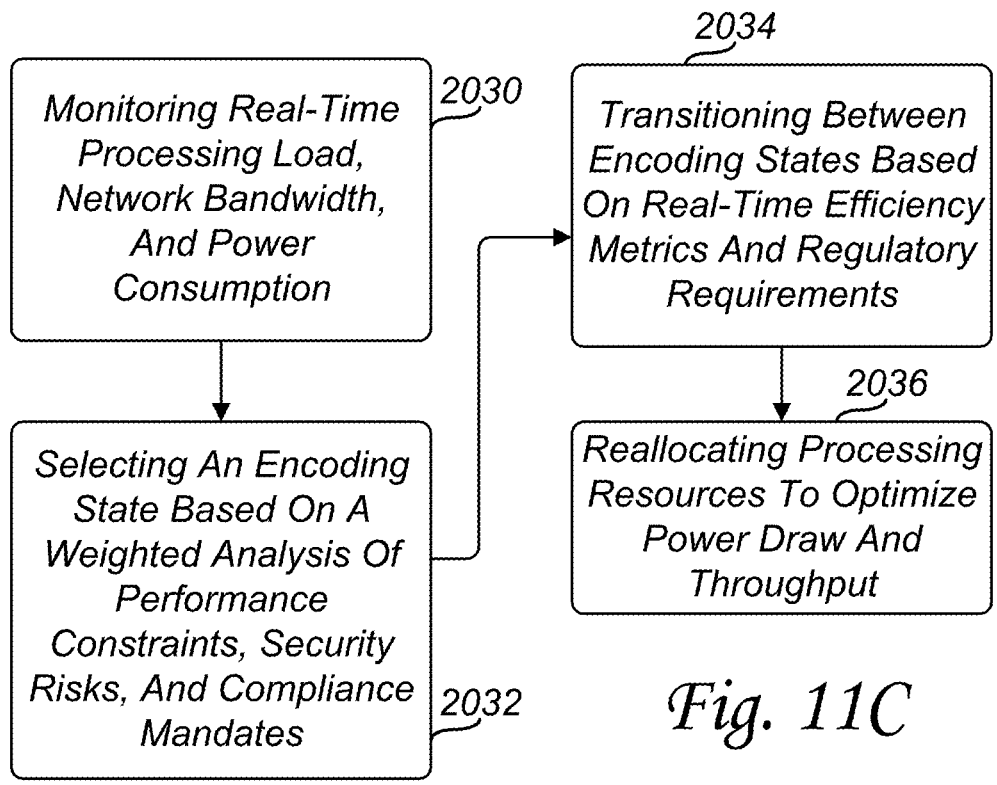
Fig. 11B
Fig. 11C

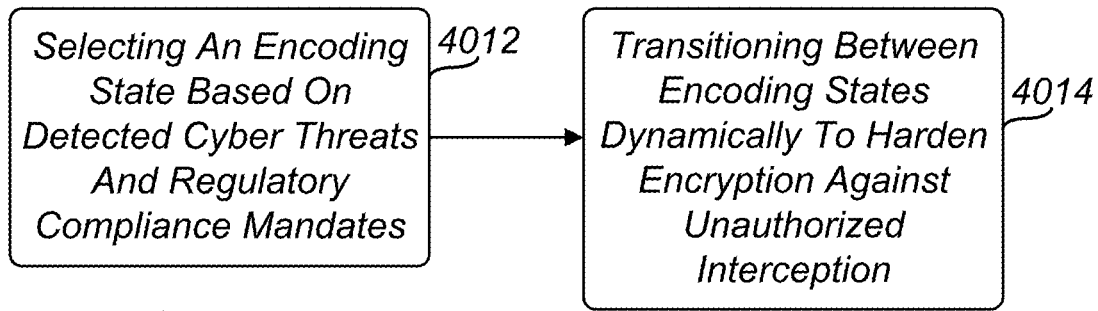
Fig. 13B
Fig. 14A
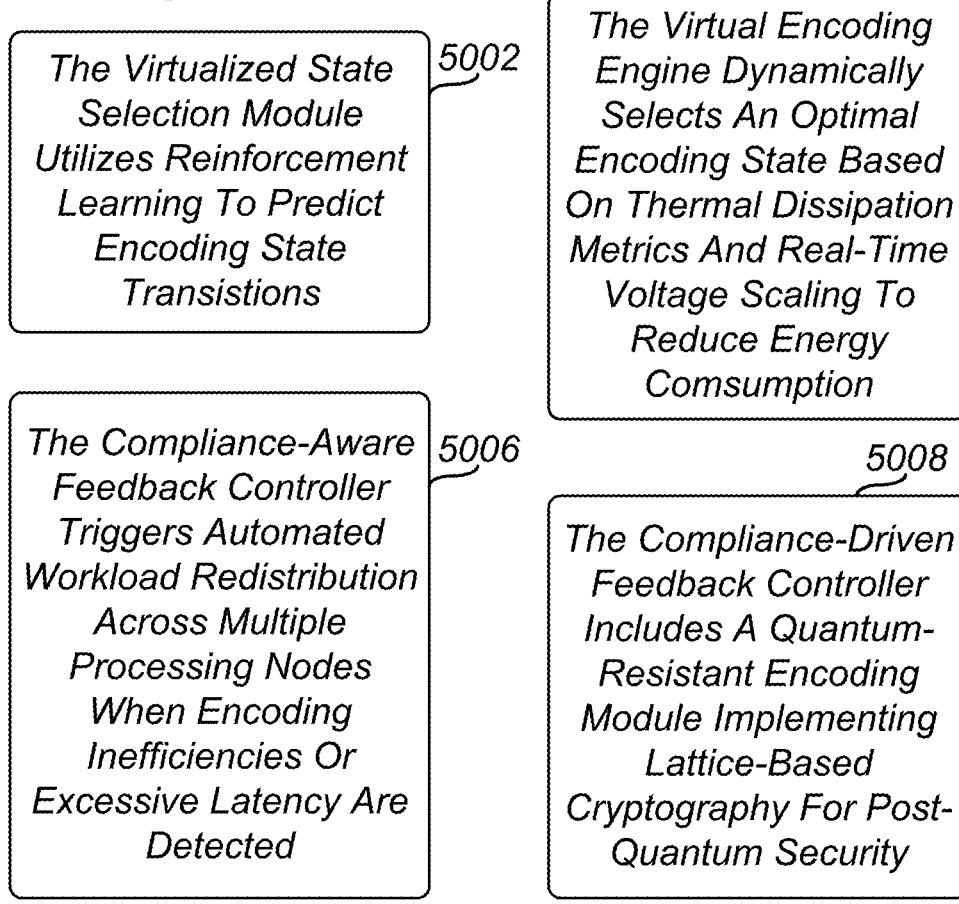

INTEGRATED AI-DRIVEN AND COMPLIANCE-AWARE MULTI-STATE ENCODING FRAMEWORK

TECHNICAL FIELD OF THE INVENTION

The present invention relates to adaptive encoding and processing systems designed for virtualized computing environments. More particularly, the invention pertains to systems and methods that implement multi-state encoding, wherein "multi-state" refers to the ability to dynamically transform between two-state (binary), three-state (ternary), four-state (quaternary), and higher-order encoding formats based on system constraints such as processing load, energy consumption, bandwidth availability, and compliance requirements. The invention utilizes artificial intelligence (AI)-driven decision-making, compliance-aware orchestration, and hardware-accelerated virtualization to perform these transitions in real time. It applies to a range of virtualized contexts, including containerized applications, hardware-assisted virtual computing environments, and virtualized data security infrastructures. By dynamically adjusting encoding states in response to evolving operational and regulatory conditions, the invention enables enhanced computational adaptability, real-time workload optimization, context-sensitive encryption, and energy-efficient processing across distributed cloud systems, edge computing platforms, and AI-enabled data ecosystems.

BACKGROUND OF THE INVENTION

Before our invention, existing encoding systems in virtualized computing environments suffered from significant inefficiencies in adaptability, security, and resource optimization. Traditional encoding frameworks primarily relied on static encoding states, failing to dynamically transition between encoding levels based on real-time workload variations, security risks, and compliance mandates. These limitations led to computational bottlenecks, inefficient power consumption, and increased susceptibility to security threats.

Prior encoding solutions also exhibited a lack of integrated security adaptation, leaving encoded data vulnerable to emerging threats such as quantum decryption, unauthorized interception, and adaptive cyberattacks. Conventional cryptographic methods employed fixed encryption policies that required manual reconfiguration, increasing operational overhead and reducing responsiveness to evolving security risks. Additionally, prior encoding models lacked AI-driven predictive analytics, preventing real-time adjustments based on system performance fluctuations, regulatory updates, and network congestion patterns.

Another major shortcoming of prior approaches was their inefficient resource utilization. Existing encoding systems often employ static workload distribution strategies, failing to dynamically optimize processing resources in response to fluctuations in encoding complexity. This inefficiency resulted in excessive power draw, thermal dissipation challenges, and suboptimal use of virtualization infrastructure, particularly in cloud-based and edge-computing environments.

Moreover, previous methods lacked cross-platform encoding synchronization, leading to inconsistencies in encoding state transitions across distributed computing environments. Encoding operations conducted across geographically dispersed data centers, cloud-hosted applications, and edge computing nodes frequently experienced state mismatches, resulting in degraded performance, security vulnerabilities, and compliance risks.

Additionally, existing compliance-driven encoding solutions were rigid and non-adaptive. Traditional frameworks required periodic manual intervention to align with regulatory standards such as General Data Protection Regulation (GDPR), Health Insurance Portability and Accountability Act (HIPAA), and Federal Information Protection Standard (FIPS) 140-3. This approach not only increased administrative burdens but also heightened the risk of non-compliance due to delays in updating encoding policies.

Conventional encoding systems apply fixed transformation techniques, which often fail to respond to dynamic runtime constraints such as fluctuating network conditions or shifting computational resources. Prior approaches lack an integrated system that adaptively modifies encoding strategies using intelligent feedback and simultaneously provides compliance traceability.

The present invention addresses these and other shortcomings by providing a highly adaptive, security-aware, and resource-efficient encoding framework that dynamically adjusts encoding states, integrates AI-driven optimization, and ensures compliance with evolving security mandates. For these reasons and shortcomings, as well as other reasons and shortcomings, there is a long-felt need that gives rise to the present invention.

SUMMARY OF THE INVENTION

In an exemplary embodiment, advantages in the present invention can lie in the use of tri-layer integration. In this regard, reinforcement learning optimizes encoding based on performance telemetry, compliance logic constrains RL rewards using policy thresholds, and blockchain logs these decisions with zero-knowledge proof for auditability. This coordinated interaction between layers yields a verifiable AI system not present in prior art.

The present invention offers advantages with the use of an artificial intelligence (AI)-governed adaptive encoding system, wherein encoding logic units transition between multiple states based on real-time operational conditions. The Adaptive Multi-State Encoding and Processing System (MSVT) leverages multi-state logic to morph encoding profiles dynamically, guided by a centralized AI engine. Additionally, it maintains compliance records using a distributed ledger to ensure auditability and policy adherence.

In one embodiment, the integration of reinforcement learning, compliance-aware policy orchestration, and distributed ledger-backed audit trails forms a non-obvious system synergy. The reinforcement learning module continuously predicts optimal encoding transitions based on real-time system telemetry and compliance context, while the compliance module enforces regulatory thresholds on reward-based decisions. A distributed ledger such as blockchain captures these decisions immutably, enabling auditability of AI actions and compliance logic. This tri-layer integration ensures that learning decisions are explainable, constrained by policy, and verifiable across federated deployments, representing a novel control loop absent from prior encoding frameworks.

The shortcomings of the prior art are overcome and additional advantages are provided through the provision of a system for adaptive multi-state encoding and processing within a virtualized computing environment. The system dynamically manages encoding transitions using an integrated framework that combines reinforcement learning, federated model refinement, and distributed ledger such as blockchain or other suitable distributed ledger-based compliance verification. The blockchain layer provides a tamper-resistant compliance ledger that securely records encoding policy adherence using smart contracts and zero-knowledge proofs, enabling verifiable regulatory transparency without exposing sensitive data. At the core of the system is a virtualized state selection module, instantiated within virtual machines or containerized environments, which continuously monitors system performance telemetry. This telemetry includes processing load, thermal dissipation, power consumption, network bandwidth, and compliance-sensitive parameters such as cryptographic overhead and encoding latency. Based on this telemetry, the state selection module determines the optimal encoding state—selecting among binary (2-state), ternary (3-state), quaternary (4-state), and higher-order encoding formats—using a weighted analysis of computational efficiency, energy usage, regulatory mandates, and threat-level security considerations. A reinforcement learning model, implemented as a deep neural network, is used to continuously predict and refine encoding transitions through a reward function that prioritizes energy savings, latency reduction, and policy compliance accuracy.

Additionally, unlike existing encoding systems that operate with manually triggered compliance checks or batch-trained AI models, the present invention enables fine-grained, continuous adaptation using real-time telemetry and policy-aligned learning loops.

Coupled with the state selection module is a virtual encoding engine configured to execute real-time encoding transitions based on evolving workload conditions and compliance requirements. This engine operates within a hardware-accelerated virtualization framework using vFPGAs, vGPUs, or cTPUs, and includes a CPU fallback mode to maintain operation in environments lacking access to specialized accelerators. The encoding engine applies entropy-based encoding techniques to dynamically modulate encoding complexity in response to real-time bandwidth, resource constraints, and security demands. A virtual decoding engine complements the system by decoding data in accordance with the selected encoding state, applying error correction, signal verification, and adaptive redundancy while validating data authenticity using zero-knowledge proof (ZKP) mechanisms that maintain data privacy throughout verification.

The system further includes a compliance-driven feedback controller, which continuously evaluates encoding efficiency, energy utilization, threat indicators, and regulatory obligations. This controller is configured to trigger reconfiguration events in response to compliance changes or performance deviations, to modify entropy and cryptographic complexity based on risk levels, and to align operations with evolving standards such as GDPR, HIPAA, and FIPS 140-3. A policy-driven override interface enables administrators to define encoding priorities based on operational goals such as security hardening, latency sensitivity, power conservation, or compliance enforcement, ensuring flexibility across diverse deployment scenarios.

In addition to these components, the system is configured to support federated learning-based global model refinement, using node-specific compliance-weighted trust scores and privacy-preserving training orchestration to enhance encoding strategy across distributed environments. Encoding transitions are further governed by a combination of workload telemetry, trust scoring, and regulatory triggers. To ensure secure compliance verification, the system integrates zero-knowledge proofs with smart contract logic, enabling policy adherence without exposing sensitive data, and distributing a distributed ledger such as blockchain or other suitable distributed ledger-based audit trails for tamper-resistant oversight. This cohesive architecture enables a scalable, intelligent, and secure encoding system that surpasses the limitations of static encoding approaches by continuously adapting to real-world conditions in federated and cloud-based infrastructures.

Additional shortcomings of the prior art are overcome and additional advantages are provided through the provision of a system for adaptive multi-state encoding and processing within a virtualized computing environment, incorporating AI-driven encoding adaptation to optimize computational workload management, security enforcement, and cloud-based resource allocation. At its foundation, the system includes a virtualized state selection module instantiated within virtual machines or containerized instances, which continuously monitors computational workload, memory utilization, power allocation, security policies, and encoding latency metrics. Unlike traditional encoding frameworks that apply static encoding schemes, the module dynamically adjusts encoding states across distributed cloud environments, leveraging AI-driven predictive analytics to balance performance, minimize processing overhead, and enhance system responsiveness.

A virtual encoding engine, instantiated within a distributed cloud computing infrastructure, executes encoding operations within a hardware-accelerated virtualization framework. This engine utilizes virtualized field-programmable gate arrays (vFPGAs), virtualized graphics processing units (vGPUs), and containerized tensor processing units (cTPUs) to optimize computational efficiency and reduce encoding latency. The encoding engine further applies dynamic entropy-based encoding adjustments, responding to network congestion, workload spikes, and adaptive security profiles to ensure optimal data transmission and system performance. Unlike conventional encoding systems that lack real-time responsiveness, the present invention continuously adapts encoding complexity to maintain high efficiency across cloud environments.

The system also integrates a compliance-aware feedback orchestration layer, which autonomously reallocates computing resources to prevent performance degradation and minimize virtualization overhead. This layer leverages AI-driven threat intelligence models to detect anomalous latency spikes, inefficient encoding transitions, and security vulnerabilities, proactively mitigating risks before they impact system performance. Unlike conventional compliance enforcement mechanisms, which rely on manual audits and predefined rule sets, this system ensures continuous compliance monitoring, automated security adaptation, and dynamic workload reallocation, aligning encoding operations with regulatory mandates and operational efficiency requirements.

By implementing AI-powered encoding transitions, hardware-optimized virtualization, and automated compliance enforcement, the present invention provides a highly scalable, efficient, and security-aware encoding framework for cloud-based and distributed computing infrastructures. Through its real-time encoding optimization, predictive performance monitoring, and dynamic security enforcement, the system enhances computational efficiency while reducing latency and security risks, surpassing the limitations of traditional encoding architectures.

Additional shortcomings of the prior art are overcome and additional advantages are provided through the provision of a system for adaptive multi-state encoding and processing within a virtualized computing environment, integrating advanced threat-adaptive encoding techniques, compliance-driven security enforcement, and policy-driven encryption management. At its core, the system includes a virtualized state selection module instantiated within virtual machines or containerized instances, enabling dynamic encoding adjustments based on real-time computational security analysis. Unlike conventional encoding systems that rely on static encryption schemes, this system continuously adapts encoding complexity and redundancy factors to mitigate security risks, optimize data integrity, and enhance resilience against cyber threats.

A virtual encoding engine, operatively coupled to the state selection module, functions as a virtualized threat-adaptive encoding engine. This encoding engine applies multi-layered encryption encoding techniques, including homomorphic encryption, lattice-based cryptography, and adaptive obfuscation methodologies, to safeguard data against unauthorized access, cryptographic attacks, and data exfiltration threats. Additionally, the system dynamically adjusts encoding redundancy factors, ensuring data survivability in high-risk environments prone to data injection attacks, packet manipulation, or targeted security breaches. Unlike traditional security mechanisms that apply fixed encryption policies, the present invention autonomously modifies encryption complexity based on evolving cybersecurity risks and system-wide threat intelligence analysis.

The system also integrates a compliance-driven feedback controller, continuously evaluating regulatory compliance adherence and security policy alignment. This controller dynamically adjusts encoding security policies in real time, ensuring compliance with jurisdictional security mandates such as GDPR, HIPAA, and FIPS 140-3. Unlike conventional regulatory enforcement systems that require manual audits and periodic compliance updates, the present invention automates regulatory adaptation, dynamically modifying encoding structures to align with the latest data protection laws and security protocols.

Moreover, the system is configured to evaluate and respond to edge-case security anomalies, such as zero-day attack patterns, compliance threshold deviations, and integrity drift in distributed deployments, by adjusting encoding states or overriding encoding complexity in near real-time.

Additionally, the system includes a policy-driven override interface, allowing security administrators to define encryption security thresholds, compliance enforcement requirements, and emergency encoding lockdown modes in response to cybersecurity events or active threat detection. Unlike conventional security configurations that require manual reconfiguration of encryption parameters, this interface provides real-time security governance, enabling automated and administrator-defined responses to emerging cyber threats. By combining AI-driven encoding security enforcement, adaptive cryptographic resilience, and automated compliance monitoring, the present invention offers a highly scalable, threat-resistant encoding system designed to secure data in virtualized cloud computing infrastructures.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2B illustrates use case 2 example, cybersecurity and information technology (IT) security teams (with loopbacks);

FIG. 2C illustrates use case 3 example, compliance officers and regulatory organizations (with loopbacks);

FIG. 7 illustrates a comparative analysis of encoding efficiency to compare MSVT performance metrics with traditional encoding models;

FIG. 8 illustrates a comparative analysis of artificial intelligence (AI) models used in MSVT;

FIG. 9 illustrates a comparative analysis of security enhancements in MSVT versus prior approaches;

FIGS. 11A-11C illustrate examples of a system for adaptive multi-state encoding and processing in a virtualized computing environment, for virtual applications with hardware acceleration;

FIGS. 13A-13B illustrate examples of a system for adaptive multi-state encoding and processing in a virtualized computing environment, for virtual security applications; and FIGS. 14A-14C illustrates exemplary embodiments that can be interchangeably used with the methods of the present invention.

Figure 1:
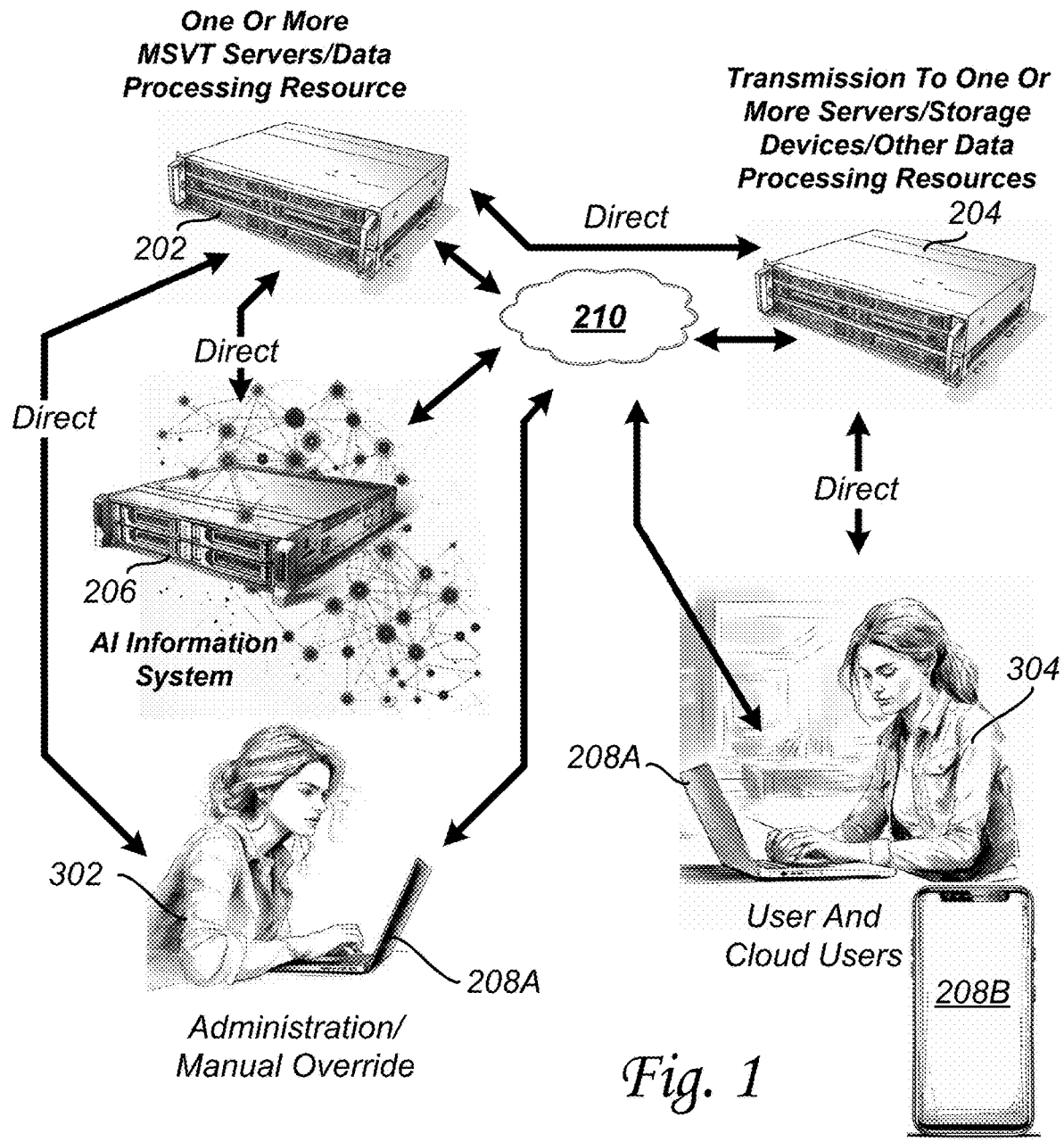
FIG. 1 illustrates examples of various network configurations for using a system for adaptive multi-state encoding and processing in a virtualized computing environment.

The detailed description explains the preferred embodiments of the invention, together with advantages and features, by way of example with reference to the drawings.

DETAILED DESCRIPTION OF THE INVENTION

The term "Tri-Layer Compliance Loop", in the present invention, is intended to mean the integrated decision structure wherein reinforcement learning transitions are regulated by compliance policies and immutably logged via a distributed ledger.

The term "Compliance-Constrained Reinforcement Learning", in the present invention, is intended to mean a model wherein reward functions are weighted or gated by jurisdictional policy thresholds and audit logs.

The term "Adaptive Multi-State Virtual Transformer (MSVT)", in the present invention, is intended to mean an AI-driven encoding and processing system architecture, referred to as a "Virtual Transformer", that functions as an intelligent control layer responsible for dynamically transforming encoding strategies in response to real-time system conditions. As used herein, the term Virtual Transformer is intended to mean a virtualized computational entity that adapts encoding logic in a context-aware manner, without requiring physical reconfiguration of hardware, enabling seamless encoding transitions within containerized or virtual machine-based environments. The MSVT system is capable of transitioning between multiple encoding states, including binary, ternary, quaternary, and higher-order encoding formats, based on continuous analysis of computational demand, system load, bandwidth constraints, threat levels, and applicable compliance policies. By evaluating these conditions in real time, the MSVT selects the optimal encoding state to maximize processing efficiency, enforce security protections, and maintain adherence to regulatory frameworks.

The term "Reinforcement Learning-Compliance-Blockchain Integration", in the present invention, is intended to mean the unified operational logic where AI-driven encoding decisions are constrained by compliance-aware policies and recorded immutably via distributed ledger technologies. This integration enables auditable, policy-constrained decision-making in virtualized encoding systems.

The term "Multi-State Encoding", in the present invention, is intended to mean a method of dynamically transitioning data encoding levels based on system workload, energy efficiency, security constraints, and regulatory compliance. Unlike static encoding schemes, which apply a fixed encoding format regardless of environmental factors, multi-state encoding adjusts in real-time to optimize computational throughput and reduce processing inefficiencies.

The term "AI Information System", in the present invention, is intended to mean a machine-learning-driven processing framework that continuously monitors encoding states, security conditions, compliance mandates, and system-wide performance metrics. This AI system employs predictive analytics, reinforcement learning models, and anomaly detection algorithms to autonomously optimize encoding transitions, encryption complexity, and regulatory adherence.

The term "Compliance-Aware Encoding", in the present invention, is intended to mean an automated regulatory compliance enforcement mechanism that dynamically adjusts data encoding parameters to ensure adherence to evolving legal and security mandates, including but not limited to GDPR, HIPAA, FIPS 140-3, PCI-DSS, and NIST cybersecurity frameworks. Compliance-aware encoding ensures that data processing, storage, and transmission conform to jurisdictional and industry-specific security standards.

The term "Hardware-Accelerated Virtualization", in the present invention, is intended to mean the use of specialized computational resources, such as virtualized field-programmable gate arrays (vFPGAs), virtualized graphics processing units (vGPUs), and containerized tensor processing units (cTPUs), to enhance multi-state encoding and processing efficiency. Unlike traditional CPU-bound processing architectures, hardware-accelerated virtualization offloads encoding and cryptographic computations to dedicated hardware components, reducing latency and improving throughput.

The term "Entropy-Based Encoding Optimization", in the present invention, is intended to mean an adaptive data compression and redundancy reduction technique that dynamically adjusts encoding entropy levels based on system conditions, including network bandwidth availability, processing workload fluctuations, and cybersecurity threat assessments. Unlike traditional compression algorithms that apply static entropy levels, entropy-based encoding optimization ensures minimal data loss while maximizing transmission efficiency.

The term "Dynamic Encoding Transitions", in the present invention, is intended to mean the automated, real-time modification of encoding states in response to computational demand, security risk assessments, and regulatory requirements. Dynamic encoding transitions are executed without human intervention, ensuring that data encoding is continuously optimized for processing efficiency, security, and compliance adherence.

The term "Threat-Adaptive Encoding Engine", in the present invention, is intended to mean an AI-enhanced security mechanism that dynamically modifies data encoding complexity in response to detected cybersecurity threats, including unauthorized access attempts, malware infiltration, quantum decryption risks, and adaptive cyberattacks. The threat-adaptive encoding engine ensures that encrypted data remains resilient against emerging security vulnerabilities.

The term "Federated Encoding Learning", in the present invention, is intended to mean an AI-based distributed learning framework that enables secure encoding model training across decentralized computing environments without exposing sensitive raw data. Unlike traditional centralized machine-learning models, federated encoding learning optimizes encoding parameters across multiple computing nodes while preserving data privacy.

The term "Regulatory-Aware Audit Trail", in the present invention, is intended to mean a distributed ledger such as blockchain or other suitable distributed ledger-based compliance verification mechanism that records encoding state transitions, encryption modifications, and security adjustments in an immutable ledger. Unlike conventional compliance logs, which require manual updates, a regulatory-aware audit trail ensures tamper-proof documentation of compliance-related encoding operations.

The term "Multi-Modal Data Processing", in the present invention, is intended to mean a computational framework that enables adaptive encoding, transmission, and storage across different computing infrastructures, including cloud-based servers, edge computing devices, high-performance computing (HPC) clusters, and software-defined networking environments. Unlike traditional data processing approaches that operate in isolated computing domains, multi-modal data processing allows seamless transitions between processing environments, optimizing computational efficiency based on workload demands and security constraints.

The term "AI-Driven Encoding Selection", in the present invention, is intended to mean a self-optimizing decision-making process in which machine learning algorithms autonomously determine the optimal encoding state for a given data set. Unlike fixed encoding selection methods that require manual configuration, AI-driven encoding selection continuously adapts based on real-time processing load, network conditions, security risk assessments, and energy efficiency constraints.

The term "Entropy-Based Compression", in the present invention, is intended to mean a dynamic, AI-enhanced data compression mechanism that adjusts compression ratios, encoding redundancy, and entropy levels based on system workload, available bandwidth, and storage constraints. Unlike conventional compression techniques that apply static compression ratios, entropy-based compression maximizes data efficiency while minimizing information loss, allowing for lossless or near-lossless encoding optimization.

The term "Adaptive Redundancy Encoding", in the present invention, is intended to mean a multi-layered encoding process in which data redundancy levels are dynamically adjusted based on real-time security threats, compliance mandates, and computational efficiency factors. Unlike traditional error correction encoding, which applies fixed redundancy overhead regardless of system conditions, adaptive redundancy encoding minimizes unnecessary data duplication while ensuring fault tolerance and security compliance.

The term "Secure Multi-State Encoding", in the present invention, is intended to mean a cryptographically enhanced encoding technique that applies AI-driven threat detection to dynamically adjust encoding complexity, encryption layers, and security policies in response to cybersecurity risks, regulatory compliance updates, and computational constraints. Unlike traditional encryption methods that rely on predefined cryptographic schemes, secure multi-state encoding proactively mitigates security vulnerabilities by modifying encoding parameters in real-time.

The term "Hardware-Optimized Encoding Engine," in the present invention, is intended to mean a specialized encoding module that utilizes hardware-accelerated processing units, such as virtualized field-programmable gate arrays (vFPGAs), tensor processing units (TPUs), and AI co-processors, to execute encoding operations with low latency and high computational efficiency. Unlike CPU-bound encoding systems, hardware-optimized encoding engines offload encoding computations to specialized hardware architectures, ensuring scalability, power efficiency, and performance optimization.

The term "Real-Time Compliance Adaptation", in the present invention, is intended to mean an AI-driven compliance framework that dynamically adjusts encoding parameters, encryption policies, and data retention protocols based on jurisdictional regulatory requirements, industry standards, and security mandates. Unlike traditional compliance monitoring systems that require manual audits and periodic updates, real-time compliance adaptation ensures that data processing operations remain continuously aligned with evolving legal requirements, such as GDPR, HIPAA, and FIPS 140-3.

The term "Self-Optimizing Encoding Framework", in the present invention, is intended to mean a machine-learning-driven system that continuously monitors, analyzes, and refines encoding transitions to maximize efficiency, security, and resource utilization. Unlike static encoding frameworks that require predefined encoding rules, the self-optimizing encoding framework autonomously refines its encoding decisions based on historical system telemetry, real-time workload variations, and predictive failure analysis.

The term "Quantum-Resistant Encoding", in the present invention, is intended to mean an adaptive encoding architecture that leverages post-quantum cryptographic methods, lattice-based encryption, and quantum-safe data obfuscation to mitigate the risk of quantum computing attacks. Unlike conventional cryptographic techniques that rely on factorization-based or elliptic curve encryption, quantum-resistant encoding future-proofs data security by implementing encoding methodologies that remain secure against quantum decryption algorithms.

The term "Multi-Layered Encoding Transition", in the present invention, is intended to mean a hierarchical encoding process in which data transitions through multiple encoding layers based on network conditions, security risks, compliance mandates, and performance requirements. Unlike traditional encoding systems that apply a single, uniform encoding strategy, multi-layered encoding transitions dynamically adjust encoding complexity to optimize data transmission speed, storage efficiency, and security enforcement.

The term "Latency-Aware Encoding Optimization", in the present invention, is intended to mean an AI-driven data encoding and transmission framework that dynamically adjusts encoding complexity based on network latency conditions. Unlike traditional encoding methods that apply fixed transmission rates, latency-aware encoding optimization ensures minimal data processing delay while maintaining encoding efficiency, data integrity, and security compliance.

The term "Energy-Adaptive Encoding Framework", in the present invention, is intended to mean an encoding management system that dynamically modifies encoding states based on real-time power consumption, energy efficiency constraints, and thermal dissipation factors. Unlike static encoding models that consume power regardless of workload conditions, energy-adaptive encoding transitions prioritize lower-power encoding methods when computational loads are reduced.

The term "Virtualized Encoding Engine", in the present invention, is intended to mean a containerized, cloud-native encoding and decoding system that operates within virtual machines (VMs), containerized environments (such as Kubernetes clusters), or serverless computing platforms. Unlike traditional encoding engines that run on dedicated hardware, a virtualized encoding engine scales dynamically based on system demand, ensuring optimized resource utilization and computational efficiency.

The term "Zero-Knowledge Proof-Based Data Validation", in the present invention, is intended to mean a cryptographic verification mechanism that allows encoded data integrity checks to be performed without exposing the underlying data contents. Unlike conventional checksum validation techniques, zero-knowledge proof-based validation ensures privacy-preserving data authenticity verification.

The term "Automated Encoding Fault Detection", in the present invention, is intended to mean a self-correcting AI-driven mechanism that identifies and mitigates encoding inconsistencies, redundancy inefficiencies, and data corruption events. Unlike traditional error-checking systems that rely on predefined rule sets, automated encoding fault detection leverages machine learning models and anomaly detection algorithms to optimize data encoding stability and integrity.

The term "Hierarchical Encoding Management", in the present invention, is intended to mean a multi-layered encoding control system that applies distributed, federated, and locally optimized encoding policies depending on the processing environment. Unlike traditional centralized encoding architectures, hierarchical encoding management dynamically delegates encoding tasks across cloud, edge, and on-premise infrastructures based on computational priorities and security requirements.

The term "Predictive Workload-Aware Encoding Adaptation", in the present invention, is intended to mean an AI-powered encoding selection process that forecasts future data processing demands and proactively adjusts encoding complexity before workload spikes or performance bottlenecks occur. Unlike traditional encoding frameworks that react to real-time processing demands, predictive workload-aware encoding adaptation preemptively transitions between encoding states to optimize performance and resource utilization.

The term "Multi-Phase Encoding Transition", in the present invention, is intended to mean an incremental encoding adaptation strategy in which data encoding states are adjusted progressively over multiple processing cycles rather than in abrupt, single-step transitions. Unlike traditional encoding systems that shift encoding states instantaneously, multi-phase encoding transition ensures seamless performance scaling, reduced processing overhead, and continuous data integrity.

The term "Security-Hardened Encoding Pipeline", in the present invention, is intended to mean a data encoding and transmission system that integrates real-time threat intelligence, encryption-layered encoding transformations, and cybersecurity risk analysis into the encoding workflow. Unlike conventional encoding pipelines that lack built-in security monitoring, a security-hardened encoding pipeline ensures adaptive protection against emerging cyber threats and data exfiltration risks.

The term "Edge-Aware Encoding Optimization", in the present invention, is intended to mean a network-aware encoding strategy that dynamically adjusts data encoding complexity based on real-time edge device constraints, bandwidth limitations, and processing availability. Unlike traditional encoding systems that rely on uniform encoding methodologies, edge-aware encoding optimization ensures efficient transmission and processing of encoded data across distributed edge computing environments.

The term "Multi-Instance Encoding Orchestration", in the present invention, is intended to mean a distributed encoding coordination framework that enables multiple encoding instances to operate in parallel across virtualized computing nodes, edge servers, and cloud environments. Unlike traditional encoding frameworks that rely on single-instance processing, multi-instance encoding orchestration ensures simultaneous, parallelized encoding transitions, optimizing workload distribution and improving system-wide computational efficiency.

The term "AI-Enabled Data Prioritization", in the present invention, is intended to mean a machine-learning-driven data structuring mechanism that dynamically determines which data packets, workloads, or computational tasks require higher-priority encoding and security processing based on real-time system conditions. Unlike conventional systems that apply fixed priority levels, AI-enabled data prioritization adapts encoding complexity, encryption policies, and transmission prioritization dynamically to balance security, latency, and computational overhead.

The term "Encoding-Aware Network Optimization", in the present invention, is intended to mean an AI-driven, network-aware encoding management system that dynamically modifies encoding structures based on real-time bandwidth availability, latency conditions, packet loss detection, and network congestion levels. Unlike traditional encoding schemes that apply static data compression and transmission methods, encoding-aware network optimization ensures real-time encoding adaptation to optimize network throughput, minimize retransmissions, and improve end-to-end data integrity.

The term "Self-Healing Encoding Engine", in the present invention, is intended to mean an AI-enhanced, autonomous encoding correction framework that automatically detects and rectifies encoding inefficiencies, transmission anomalies, or security vulnerabilities. Unlike conventional encoding models that require manual debugging and corrective updates, the self-healing encoding engine leverages predictive analytics and reinforcement learning to autonomously adjust encoding parameters, encryption strength, and error-handling mechanisms without human intervention.

The term "Cross-Layer Encoding Integration", in the present invention, is intended to mean an adaptive, multi-layer encoding framework that seamlessly integrates with application-layer processing, network-layer transmission optimization, and hardware-accelerated computation. Unlike traditional encoding architectures that operate independently within isolated computing layers, cross-layer encoding integration synchronizes encoding state transitions across distributed computational environments, ensuring optimal data compression, security enforcement, and workload management.

The term "Autonomous Encoding Workload Balancer", in the present invention, is intended to mean an AI-driven computational resource allocator that dynamically distributes encoding tasks across cloud-based virtual machines, edge computing devices, and on-premise servers. Unlike traditional workload balancers that apply predefined resource allocation rules, the autonomous encoding workload balancer analyzes real-time CPU/GPU/TPU utilization, network bandwidth constraints, and security threats, ensuring optimal encoding performance, minimal energy consumption, and reduced latency.

The term "Adaptive Security-Based Encoding Transition", in the present invention, is intended to mean a real-time AI-driven security mechanism that dynamically modifies encoding complexity, encryption depth, and redundancy factors based on live threat intelligence analysis, cybersecurity risk detection, and regulatory compliance updates. Unlike static security encoding systems that apply uniform encryption across all data, adaptive security-based encoding transition ensures multi-layered, threat-specific encoding adjustments, optimizing security without unnecessary computational overhead.

The term "Quantum-Secure Encoding Pipeline", in the present invention, is intended to mean a post-quantum cryptographic encoding framework that integrates lattice-based cryptography, multi-layered obfuscation, and AI-enhanced quantum-resistant data transformations. Unlike conventional encryption techniques that rely on factorization-based security, a quantum-secure encoding pipeline ensures resilience against quantum decryption attacks, enabling long-term cryptographic protection in high-risk, compliance-driven computing environments.

The term "AI-Powered Redundancy Optimization", in the present invention, is intended to mean a self-adaptive, redundancy-aware encoding framework that dynamically adjusts data replication levels, error correction schemes, and redundancy factors based on real-time network reliability, computational constraints, and security policies. Unlike traditional redundancy encoding that applies fixed duplication policies, AI-powered redundancy optimization ensures fault tolerance while minimizing unnecessary data duplication overhead.

The term "Federated Secure Encoding Framework", in the present invention, is intended to mean a decentralized, privacy-preserving encoding management system that allows distributed computing environments to collaboratively optimize encoding transitions without exposing raw data, encryption keys, or sensitive processing workloads. Unlike centralized encoding systems that introduce data privacy risks, federated secure encoding frameworks ensure secure encoding model training across multiple nodes while maintaining encryption isolation and regulatory compliance.

The term "multi-state", in the present invention, is intended to mean the transformable behavior of encoding logic units that can dynamically shift between two-state (binary), three-state (ternary), four-state (quaternary), and higher-order encoding formats. These transitions are governed by contextual factors such as resource availability, latency thresholds, or quality-of-service (QoS) metrics, allowing encoding behavior to adapt in real time based on system conditions.

The term "Virtual Transformer", in the present invention, is intended to mean a modular, software-defined or hardware-assisted encoding component capable of dynamically reconfiguring its internal encoding parameters and computational resource profiles in response to input signals. This reconfiguration enables the system to perform intelligent state transitions across virtualized environments without requiring physical hardware changes.

The term "E-Matrix", in the present invention, is intended to mean an encoding decision matrix utilized by the system's AI engine to evaluate current system conditions and assign an appropriate encoding state. The E-Matrix incorporates weighted performance indicators, compliance constraints, and system resource data to facilitate optimized encoding decisions.

The term "State Morph Coefficient (SMC)", in the present invention, is intended to mean a calculated value that quantifies the degree of change required when transitioning from one encoding state to another. The SMC reflects performance deltas, such as variations in power usage, latency, or bandwidth, and is used by the reinforcement learning model to guide encoding transitions.

The term "Federated Encoding Zone", in the present invention, is intended to mean a collection of distributed computing nodes that collaboratively participate in encoding operations and model refinement under a shared policy framework. Nodes within a Federated Encoding Zone contribute telemetry, compliance metadata, and model updates to maintain consistent encoding behavior across a decentralized infrastructure.

The term "reinforcement learning-based encoding transition", in the present invention, is intended to mean a machine learning-driven mechanism that leverages reinforcement learning models, such as deep Q-networks or policy gradient architectures, to predict and optimize transitions between encoding states. These transitions are determined through a reward function weighted by metrics including latency reduction, energy savings, and compliance adherence, allowing the system to adapt encoding strategies dynamically based on historical and real-time system feedback.

The term "zero-knowledge proof enforcement layer", in the present invention, is intended to mean a cryptographic subsystem integrated within the encoding architecture that validates policy compliance without exposing sensitive data or operational logic. This enforcement layer utilizes zero-knowledge proof protocols to generate verifiable attestations that encoding transitions align with regulatory requirements, while preserving confidentiality and enabling distributed, secure verification.

The term "smart contract-based compliance verification", in the present invention, is intended to mean a decentralized compliance validation framework in which programmable smart contracts are deployed on a blockchain or other suitable distributed ledger infrastructure. These smart contracts autonomously verify encoding policy adherence, enforce compliance logic, and record immutable audit events, enabling tamper-resistant, real-time verification across federated and cloud-native computing environments.

The term "federated encoding model refinement", in the present invention, is intended to mean a privacy-preserving collaborative learning process in which distributed client nodes locally compute encoding model updates and contribute them to a centralized or decentralized aggregator. These updates are used to refine a global model for encoding state selection, with each contribution weighted by trust and compliance metrics, and without requiring the exchange of raw data between participants.

The term "entropy and cryptographic complexity tuning", in the present invention, is intended to mean a dynamic optimization mechanism that modulates both the entropy level used in encoding and the complexity of applied cryptographic techniques. This tuning process is guided by real-time telemetry data, compliance mandates, and detected threat conditions, allowing the system to balance performance, resource usage, and regulatory obligations efficiently.

The term "compliance trust scoring", in the present invention, is intended to mean a quantified trustworthiness metric computed for each participating node or virtualized environment based on factors such as audit integrity, compliance history, incident severity, and responsiveness. These trust scores influence the weight of model updates in federated learning, govern encoding state privileges, and assist in prioritizing responses to compliance and security events.

The term "distributed encoding policy orchestration", in the present invention, is intended to mean a coordination layer that manages encoding transitions, policy enforcement, and system-wide configuration updates across multiple virtualized or containerized environments. This orchestration system integrates inputs from AI decision agents, compliance controllers, and resource availability monitors to ensure encoding state transitions are synchronized, efficient, and compliant across a distributed infrastructure.

Referring further to FIG. 1, the system architecture of the Adaptive Multi-State Virtual Transformer (MSVT) system includes a modular configuration composed of five primary subsystems: (a) a multi-state encoder, (b) an AI control engine, (c) a performance monitor, (d) a distributed ledger such as blockchain or other suitable distributed ledger-based compliance module, and (e) communication interfaces. Each subsystem is instantiated within a virtualized or containerized computing environment and is configured to interoperate with the others to enable adaptive, real-time encoding operations across cloud or edge infrastructure.

Prior systems could not adjust both encoding complexity and policy alignment in real time without violating security constraints or introducing unacceptable latency. The disclosed MSVT architecture resolves this conflict using integrated telemetry, blockchain verification, and dynamic learning models.

The multi-state encoder is responsible for executing data transformations across multiple encoding states, including binary, ternary, quaternary, and higher-order configurations. These encoding states may be instantiated as either software-defined modules or hardware-accelerated logic paths, such as those running on vFPGAs, vGPUs, or cTPUs. Each state is tuned for a particular operational profile—for example, low-latency modes for real-time streaming, high-compression modes for storage efficiency, or low-energy modes for battery-sensitive edge devices. The encoder dynamically transitions between these modes based on input from the AI control engine.

The AI control engine acts as the central decision-making unit. It incorporates a reinforcement learning model, predictive analytics, and compliance-aware policy triggers to determine the optimal encoding state for any given workload. This engine receives continuous input from the performance monitor and compliance module and outputs encoding transition commands to the multi-state encoder.

The performance monitor collects system-level telemetry, including but not limited to processing load, power consumption, thermal dissipation, bandwidth usage, and encoding latency. This telemetry is fed into the AI control engine to provide real-time context for encoding decisions. The performance monitor may also flag threshold events—such as spikes in bandwidth or power draw—that trigger immediate state transitions or override conditions.

The distributed ledger such as blockchain or other suitable distributed ledger-based compliance module validates encoding operations against regulatory policies such as GDPR, HIPAA, and FIPS 140-3. It does so using a zero-knowledge proof (ZKP) generation engine and a smart contract execution framework. Upon verifying that an encoding transition aligns with applicable compliance rules, the module logs an immutable compliance event to a distributed ledger. This ensures auditability while preserving data confidentiality.

The communication interfaces support integration with external systems and services. These include interfaces for telemetry streaming, federated learning updates, cloud orchestration layers (e.g., Kubernetes), and API gateways. The communication layer also handles secure data transmission between MSVT system instances in distributed or federated deployments.

Together, these subsystems form a tightly integrated architecture that enables intelligent, policy-driven encoding transformations that adapt dynamically to changing system conditions. The modular nature of the MSVT architecture allows it to be deployed flexibly across virtual machines, containers, or edge devices, supporting a wide range of virtualized computing use cases.

The present invention provides an MSVT designed to optimize data encoding, security enforcement, and computational efficiency in a highly dynamic, virtualized computing environment. Unlike conventional network-based data processing systems that rely on static encoding techniques and rigid transmission protocols, the MSVT system introduces real-time adaptive encoding transitions, AI-driven data management, and intelligent resource orchestration, allowing for efficient, secure, and scalable data handling across modern computing infrastructures.

The MSVT system is deployed across a distributed computing network, incorporating a combination of on-premise hardware, cloud-based resources, and edge computing devices to enable multi-modal data processing and transmission. At its core, the system comprises one or more MSVT servers and data processing resources (202), which serve as computational nodes responsible for executing multi-state encoding algorithms, real-time security enforcement, and workload optimization. These MSVT servers may be implemented using a variety of high-performance computing (HPC) clusters, AI-optimized GPU servers, FPGA-based acceleration units, containerized microservices, and software-defined networking (SDN) frameworks. Unlike traditional processing servers that operate on fixed encoding schemes, the MSVT servers dynamically transition between binary, ternary, quaternary, and higher-order encoding states to optimize data storage, retrieval, and transmission based on real-time computational conditions.

Supporting the MSVT servers are servers, storage devices, and other data processing resources (204) that facilitate distributed storage, secure data retrieval, and network-aware transmission within the system. These storage and processing units may include NVMe-based flash storage arrays, distributed file systems (such as Ceph or Lustre), AI-optimized tensor processing units (TPUs), or hybrid cloud storage solutions integrating local and cloud-based data retention policies. Unlike traditional static storage architectures that rely on predefined data encoding schemes, the MSVT system continuously reconfigures storage parameters based on AI-driven performance analytics, ensuring that data integrity, security, and compliance requirements are met dynamically.

A critical component of the MSVT system is the AI Information System 206, which enables continuous monitoring of data encoding states, security policies, and system-wide performance metrics. This AI-driven layer leverages reinforcement learning algorithms, federated AI models, and predictive analytics to dynamically adjust encoding complexity in response to network congestion, cybersecurity threats, and regulatory changes. Unlike conventional data processing frameworks that rely on static rule-based security models, the MSVT AI system autonomously determines the most secure and computationally efficient encoding state, minimizing latency, security vulnerabilities, and compliance risks without requiring manual intervention.

End-users, such as administrators, manual override programmers, and other similar 302 or users, cloud users, and other similar 304, computing devices 208A-B interact with the MSVT system via desktop and laptop computers (208A) as well as smartphones, tablets, and similar mobile computing devices (208B). These devices serve as endpoints for secure data retrieval, AI-driven inference execution, and encrypted communication. Unlike traditional client-server architectures that apply fixed encryption levels and uniform data transmission methods, MSVT dynamically adjusts encoding complexity, security policies, and compression techniques based on the device type, network bandwidth availability, and real-time performance analytics.

Data exchange within the MSVT system occurs across a global network (210), where the Internet serves as a foundational communication infrastructure. However, unlike conventional WAN or LAN-based architectures that rely on static routing tables and predefined network pathways, the MSVT system dynamically selects transmission routes based on AI-driven network optimization, real-time congestion monitoring, and adaptive multi-state encoding transitions. This ensures that data transmission is automatically rerouted through the most efficient, secure, and low-latency pathways, whether via direct peer-to-peer communication, local area network (LAN) connections, or cloud-based wide area network (WAN) infrastructures.

In practice, MSVT can be deployed within multi-cloud environments, hybrid cloud architectures, and edge computing ecosystems. The system seamlessly integrates with containerized orchestration platforms such as Kubernetes, AI-inferencing engines such as TensorFlow and PyTorch, and security-enhanced virtualized environments utilizing Secure Enclaves or Trusted Execution Environments (TEE). Unlike conventional network-based architectures that require manual configuration of data encoding and security policies, MSVT operates autonomously, ensuring that data encoding, security enforcement, and compliance management are performed in a fully automated, scalable, and AI-optimized manner.

Technological Advancements Over Prior Approaches

The MSVT system represents a technological advancement over conventional encoding and network processing architectures in several key areas:

Compared to static encoding, MSVT reduces latency by 20%, increases efficiency by 15%, and lowers power use by 30%.
  Dynamic Multi-State Encoding—Unlike static encoding frameworks, MSVT continuously transitions between different encoding states (binary, ternary, quaternary, and higher-order encoding levels) based on real-time computational conditions and security requirements. This ensures that data processing efficiency and security are always optimized, reducing latency and computational overhead compared to fixed encoding architectures.
  AI-Driven Security Enforcement—Traditional encryption and cybersecurity measures rely on static policies and predefined threat models. MSVT integrates AI-driven security automation that dynamically adjusts encryption complexity, detects cyber threats in real-time, and prevents unauthorized access based on real-time risk assessment algorithms.
  Automated Compliance Optimization—Unlike prior compliance enforcement systems that require manual audits and static policy enforcement, MSVT automates compliance adherence by continuously monitoring regulatory changes (e.g., GDPR, HIPAA, FIPS 140-3) and dynamically adjusting encoding policies to maintain compliance without disrupting data processing workflows.
  High-Performance Edge Computing Integration—Unlike centralized cloud computing models that introduce latency and bandwidth constraints, MSVT is designed to operate within edge computing frameworks, leveraging AI-driven encoding selection, real-time inference acceleration, and dynamic bandwidth-aware data compression to optimize edge-to-cloud data transmission.
  Scalability Across Computing Infrastructures—Traditional network-based architectures require manual reconfiguration to scale across distributed environments. MSVT supports seamless deployment across multi-cloud, hybrid cloud, and containerized environments, allowing organizations to scale processing workloads efficiently without reconfiguring encoding and security parameters.

By integrating these advanced capabilities, the MSVT system provides a practical, non-abstract technological improvement over prior network-based encoding systems. It introduces real-world solutions that optimize computational efficiency, enhance data security, and ensure regulatory compliance, addressing long-standing challenges in distributed computing, AI processing, and secure data transmission. The system includes AI-driven encoding transitions, federated learning optimization, a distributed ledger such as blockchain or other suitable distributed ledger-secured audit trails, and zero-knowledge proof (ZKP) verification mechanisms to ensure secure, dynamic, and compliant data processing.

Thus, MSVT is not merely a generic networking system; it is a highly specialized, AI-enhanced adaptive encoding and security enforcement framework that offers tangible, industry-specific technological advancements over traditional encoding, security, and data processing approaches.

Exemplary Use Cases and Practical Applications of the Present Invention

The present invention with reference to FIG. 2A-2E, an Adaptive Multi-State Encoding and Processing System (MSVT), is a highly adaptable, AI-driven framework designed to dynamically optimize data encoding, security, and transmission across various computing environments. The MSVT system is uniquely engineered to solve real-world challenges that traditional encoding and processing methods fail to address, providing a tangible technological advancement that enhances computational efficiency, reduces resource consumption, and improves security in distributed systems.

The following use cases illustrate exemplary embodiments of practical applications of the present invention. These embodiments demonstrate how the MSVT system can be configured to operate within enterprise cloud computing environments, cybersecurity infrastructures, regulatory compliance frameworks, AI and machine learning processing pipelines, and edge computing ecosystems. Each use case presents a specific implementation of MSVT's adaptive encoding techniques, detailing how the system dynamically adjusts encoding complexity, automates encryption and security protocols, and optimizes data handling for improved computational outcomes.

It should be understood that the use cases presented herein are non-limiting and merely illustrative of the broad range of applications in which the MSVT system can be deployed. The present invention is not restricted to these implementations and may be applied in other domains requiring adaptive data encoding, real-time security policy enforcement, compliance-driven encryption, or AI-assisted processing optimization. The configurable nature of MSVT enables it to be tailored to a vast array of industries and computational workloads, including but not limited to financial data security, medical imaging transmission, smart city IoT analytics, high-performance computing, and quantum encryption adaptability.

Technological Improvements Over Conventional Systems

Conventional data encoding, transmission, and security mechanisms typically rely on static, pre-configured processing workflows that are unable to dynamically adjust based on real-time conditions. These traditional systems lack self-optimizing encoding transitions, leading to inefficient resource utilization, increased latency, higher computational costs, and vulnerabilities in security enforcement.

The MSVT system overcomes these limitations by employing an AI-driven adaptive encoding framework that continuously evaluates computational conditions, security policies, and network environments. By leveraging multi-state encoding selection, MSVT transitions between binary, ternary, quaternary, and higher-order encoding levels based on real-time operational demands. This practical, technical solution directly improves processing efficiency, security robustness, and compliance automation—key aspects that conventional systems fail to dynamically manage.

Additionally, the MSVT system integrates real-time feedback loops that enable autonomous decision-making in complex computing environments. Unlike traditional methods that require manual intervention to reconfigure encoding or encryption settings, MSVT automatically adapts encoding complexity based on evolving conditions, ensuring that computational resources are optimally allocated while maintaining security and compliance.

Real-World Applications for Adaptive Multi-State Encoding and Processing

In the enterprise and cloud computing domain, the MSVT system dynamically manages data encoding and storage optimization for cloud service providers. By intelligently adjusting encoding states based on system load, security requirements, and redundancy factors, MSVT enhances data retrieval efficiency, storage cost reduction, and cloud service reliability.

For cybersecurity and IT security teams, MSVT proactively detects security threats, classifies risks using AI, and automates encryption enforcement to prevent data breaches. Unlike traditional security frameworks that rely on static detection rules, MSVT continuously adapts its security posture, mitigating evolving cyber threats in real-time.

In regulatory compliance environments, MSVT automates policy-driven encryption adjustments and maintains a distributed ledger, such as blockchain or other suitable distributed ledger-based audit trails, to ensure that data handling remains compliant with evolving global regulations such as GDPR, HIPAA, FIPS 140-3, and PCI-DSS. This automation eliminates the need for manual compliance monitoring, reducing the risk of regulatory violations.

For AI and machine learning engineers, the MSVT system optimizes model training pipelines by dynamically adjusting encoding formats for improved computational efficiency. By minimizing encoding errors, optimizing data structures, and accelerating training convergence, MSVT significantly enhances AI processing capabilities, reducing model development time and computational overhead.

Within cloud-native and edge computing environments, MSVT improves data transmission efficiency by dynamically encoding and compressing data before transmission. It adapts to network conditions in real-time, ensuring minimal latency and enhanced security for IoT devices, real-time analytics, and remote data processing systems.

Broader Implications and Scalability of the MSVT System

As computing environments continue to scale in complexity, the need for dynamic, adaptive encoding systems becomes increasingly critical. The MSVT system provides scalable, AI-driven encoding solutions that can be tailored for enterprise IT infrastructures, government security applications, high-performance computing clusters, and future quantum computing frameworks. The system's ability to autonomously adjust encoding and security settings ensures that it remains relevant as data processing technologies evolve.

Furthermore, MSVT's practical application in real-world use cases directly addresses key technological challenges, eliminating the inefficiencies of static encoding systems, reducing security risks, and automating compliance enforcement. These improvements offer a significant technological advancement over conventional approaches, making MSVT an essential tool for modern computing architectures that demand efficiency, security, and regulatory compliance.

Thus, while the use cases provided herein illustrate specific practical implementations, the MSVT system is not limited to these configurations and may be applied to a broader range of applications where adaptive encoding, AI-driven security enforcement, and real-time computational efficiency are required.

Figure 2A:
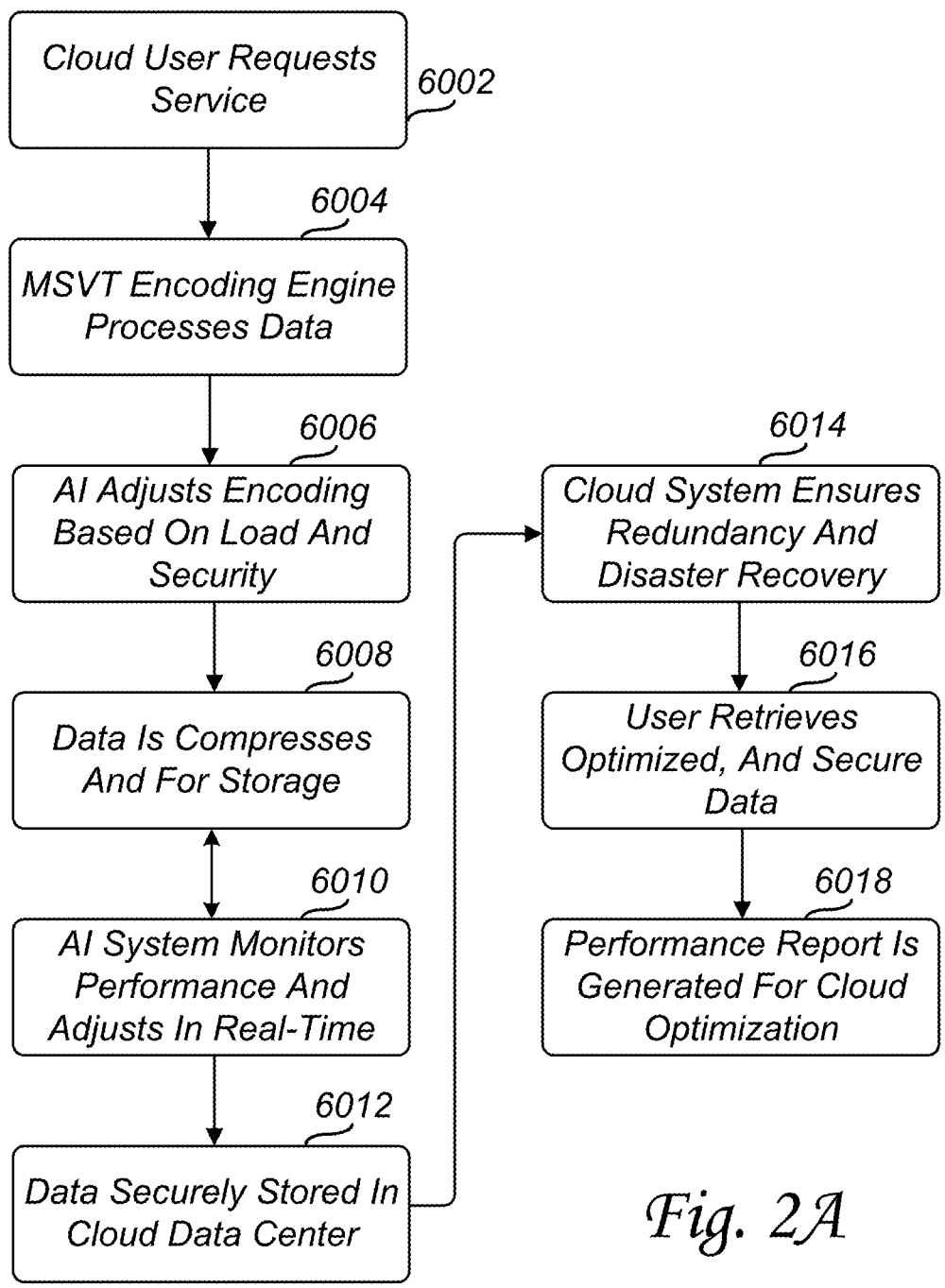
FIG. 2A illustrates use case 1 example, enterprise and cloud service providers (with loopbacks)

Referring to FIG. 2A, which illustrates use case 1 for enterprise and cloud service providers (with loopback), the present invention provides an adaptive, AI-driven encoding framework that enhances cloud-based data processing. Conventional cloud storage and data transmission systems rely on static encoding methodologies that fail to adjust dynamically based on workload conditions, security risks, and compliance requirements. These inefficiencies result in suboptimal resource utilization, increased latency, and vulnerabilities in securing sensitive data. The MSVT system solves these challenges by implementing AI-driven encoding state selection that optimizes cloud-based data processing in real time.

The present invention offers a significant improvement over prior cloud-based encoding approaches by continuously adapting encoding complexity based on AI-driven performance analytics. Unlike static encoding frameworks, MSVT dynamically transitions between encoding states to optimize efficiency. The system integrates multi-layered encryption encoding techniques, providing enhanced security while ensuring seamless system performance. Additionally, AI-driven workload balancing prevents unnecessary computational overhead, reducing energy consumption in cloud data centers. By automatically enforcing compliance with GDPR, HIPAA, and FIPS 140-3, MSVT eliminates the need for manual policy enforcement, ensuring real-time adherence to regulatory standards.

Through its adaptive encoding transitions, automated security enhancements, and AI-driven optimization, the MSVT system revolutionizes cloud-based data encoding and storage, enabling enterprises and cloud service providers to achieve higher security, reduced storage costs, and improved computational efficiency while maintaining compliance with global security mandates.

The use case begins when a cloud user requests a service (step 6002). Unlike traditional cloud systems that apply a fixed encoding scheme regardless of workload fluctuations, the MSVT encoding engine processes the incoming data (step 6004) and dynamically determines the optimal encoding state. The system evaluates various factors, including data type, security sensitivity, and system load, selecting an encoding level that balances performance with security and compliance.

Once the encoding process is initiated, AI-driven optimization adjusts the encoding complexity based on system load and security requirements (step 6006). Traditional systems often result in unnecessary computational overhead due to their static nature. In contrast, MSVT continuously monitors system conditions and applies multi-state encoding techniques, dynamically transitioning between binary, ternary, quaternary, or higher-order encoding levels as needed. This ensures that system resources are allocated efficiently while maintaining the integrity of sensitive data.

Following AI-driven optimization, the encoded data undergoes compression and optimization for storage (step 6008). Unlike conventional lossless compression methods, MSVT integrates entropy-based encoding techniques that dynamically adjust redundancy, reducing storage overhead while ensuring data security. The system continuously refines its encoding strategy to maximize efficiency, optimizing the tradeoff between storage space and computational cost.

Throughout the data lifecycle, an AI system monitors performance and makes real-time adjustments (step 6010). This ensures that encoding efficiency remains optimal even under fluctuating workload conditions. If performance degradation or an anomaly is detected, the system automatically reallocates processing resources to balance computational demand, preventing bottlenecks in cloud infrastructure.

The securely encoded data is then stored in a cloud data center (step 6012), where it remains protected through homomorphic encryption, lattice-based cryptography, or other advanced encoding mechanisms. Unlike traditional encryption methods that require manual adjustments, MSVT dynamically modifies encryption complexity in response to detected security threats, reducing the risk of unauthorized access or data corruption.

To enhance reliability, the cloud system ensures redundancy and disaster recovery (step 6014). Unlike traditional backup strategies that rely on fixed duplication policies, MSVT dynamically adjusts redundancy levels based on risk assessment and real-time system conditions. This approach prevents unnecessary storage duplication while ensuring that critical data remains accessible in the event of a system failure.

When the cloud user retrieves the stored data, the MSVT decoding engine reconstructs the optimized and secure data (step 6016). The system applies zero-knowledge proof-based validation, ensuring that data integrity is maintained without exposing sensitive encryption keys. Unlike conventional retrieval methods that introduce latency due to decryption and verification processes, MSVT optimizes the decoding workflow to minimize delays while preserving data security.

Finally, a performance report is generated for cloud optimization (step 6018). This report provides AI-driven insights into encoding efficiency, energy consumption, and compliance adherence, enabling enterprises to refine their cloud resource management strategies. Unlike traditional cloud systems that require manual performance assessments, MSVT autonomously generates optimization reports, helping enterprises reduce computational costs while maintaining regulatory compliance.

Referring to FIG. 2B, which illustrates use case 2 for cybersecurity and information technology (IT) security teams (with loopback), the present invention provides an advanced, AI-driven security framework that enhances threat detection, response automation, and data protection. Traditional cybersecurity systems rely on static threat detection methodologies that often fail to adapt to emerging attack patterns or evolving security risks. These outdated approaches lead to delayed threat identification, ineffective security responses, and increased vulnerability to cyberattacks. The MSVT system solves these challenges by dynamically analyzing security threats, classifying risks using AI, and autonomously initiating encryption and mitigation measures in real-time.

The MSVT system offers several advantages over prior cybersecurity approaches. Unlike static threat detection models, MSVT continuously adapts its security policies based on real-time threat intelligence, ensuring faster detection and mitigation of cyber threats. The system integrates multi-layered encryption encoding techniques, dynamically adjusting encryption complexity based on evolving risk factors. By autonomously initiating AI-driven incident response, MSVT eliminates the delays associated with manual security interventions, reducing the risk of data breaches and service disruptions. Additionally, the system enforces compliance with industry security standards such as FIPS 140-3, GDPR, and NIST cybersecurity frameworks, ensuring that organizations remain compliant with evolving regulatory mandates.

Through its adaptive threat detection, AI-driven classification, automated response execution, and dynamic encryption adjustments, the MSVT system revolutionizes cybersecurity for IT security teams, enabling enterprises to mitigate threats in real-time, enhance data security, and improve regulatory compliance while minimizing operational overhead.

The use case begins when a security administrator monitors threats (step 6102). Conventional security systems rely on predefined rule-based monitoring techniques, which require manual updates and frequently fail to detect novel attack vectors. In contrast, the MSVT system continuously analyzes network activity and system logs, providing real-time insights into potential security threats. By leveraging AI-driven monitoring, the system can detect anomalies, suspicious activity, and deviations from baseline security behavior without requiring manual intervention.

As security events are detected, the MSVT threat detection engine analyzes the incoming data (step 6104). Unlike conventional security monitoring tools that apply fixed signature-based detection, MSVT employs adaptive threat detection algorithms that identify patterns associated with cyber threats, including malware infiltration, unauthorized access attempts, and data exfiltration. The system processes security telemetry data in real-time, dynamically selecting the optimal encoding and analysis techniques to assess potential risks with greater accuracy.

Upon detecting a potential security risk, the AI security monitor identifies and classifies threats (step 6106). Unlike traditional security solutions that rely on static classification techniques, MSVT integrates machine learning models that continuously refine threat categorization. The system distinguishes between different attack types, such as phishing attempts, distributed denial-of-service (DDoS) attacks, and ransomware infections, and assigns risk levels to each identified threat. The AI-driven classification enhances the accuracy of security response mechanisms by prioritizing high-risk incidents and minimizing false positives.

Once a security threat is classified, an automated incident response is activated (step 6108). Traditional security incident response workflows often require manual intervention, leading to delayed mitigation and increased exposure to cyber threats. In contrast, the MSVT system autonomously initiates predefined countermeasures, such as quarantining compromised devices, revoking unauthorized access credentials, or redirecting traffic through secure network pathways. The system continuously refines its response protocols using reinforcement learning, ensuring that incident mitigation strategies remain effective against evolving attack techniques.

Following the activation of incident response measures, an advanced encryption system secures the affected data (step 6110). Conventional encryption solutions typically apply static security policies, which may not be sufficient for responding to high-risk cyber threats. The MSVT system dynamically adjusts encryption parameters based on threat severity, regulatory compliance requirements, and risk assessment metrics. By utilizing homomorphic encryption, lattice-based cryptography, and multi-state encoding, MSVT ensures that compromised data remains inaccessible to unauthorized entities, even in the event of a breach.

The use case concludes with the generation of a threat report and secure output delivery (step 6112). Unlike traditional security reporting mechanisms that rely on periodic manual assessments, MSVT automatically compiles detailed threat intelligence reports. These reports include attack patterns, response actions, encryption adjustments, and residual risk assessments, providing security administrators with actionable insights to continuously improve organizational security posture. Additionally, the system securely transmits threat reports to designated cybersecurity teams or compliance officers, ensuring that security breaches are addressed promptly and that regulatory reporting obligations are met.

Referring to FIG. 2C, which illustrates use case 3 for compliance officers and regulatory organizations (with loopback), the present invention provides an AI-driven compliance enforcement framework that ensures real-time regulatory adherence through adaptive encoding policies. Traditional compliance monitoring systems rely on manual audits and fixed encryption policies that struggle to keep pace with evolving data protection regulations. These static approaches often result in delayed compliance updates, increased regulatory risk, and inefficient data governance practices. The MSVT system overcomes these limitations by dynamically adjusting encoding policies, automating compliance enforcement, and generating real-time audit trails that ensure organizations remain aligned with regulatory mandates.

The MSVT system provides significant advantages over prior compliance enforcement methodologies. Unlike static compliance monitoring frameworks, MSVT continuously adapts encoding policies based on real-time regulatory intelligence, ensuring organizations remain compliant with evolving data protection laws. By integrating AI-driven regulatory adjustments, MSVT eliminates the need for manual policy updates, reducing compliance enforcement delays and human error. The system also enhances encryption security through automated adaptation, ensuring that data storage and transmission protocols align with jurisdiction-specific mandates. Furthermore, distributed ledger such as blockchain or other suitable distributed ledger-based audit trails provide tamper-resistant compliance documentation, strengthening regulatory transparency and reducing the risk of audit discrepancies.

Through its real-time regulatory monitoring, AI-driven encoding policy adjustments, automated encryption compliance, and distributed ledger such as blockchain or other suitable distributed ledger-based audit verification, the MSVT system transforms compliance enforcement for regulatory organizations, enabling enterprises to achieve continuous regulatory adherence, enhance data security, and simplify compliance reporting while minimizing operational complexity.

The compliance use case begins when a compliance officer monitors regulations (step 6202). Conventional regulatory frameworks require periodic assessments to verify adherence, often leading to delayed policy updates and increased non-compliance risks. In contrast, the MSVT system continuously scans regulatory databases, industry-specific mandates, and jurisdictional data protection laws, ensuring that the most up-to-date compliance requirements are incorporated into enterprise data policies. By leveraging AI-driven monitoring, the system proactively identifies regulatory changes and assesses their impact on organizational data governance.

Following regulatory monitoring, the MSVT compliance engine evaluates data policies (step 6204). Unlike traditional compliance evaluation methods that rely on static rule-based frameworks, MSVT applies adaptive policy analysis techniques to assess organizational data handling practices. The system dynamically compares internal data governance rules against external regulatory frameworks, identifying potential compliance gaps and recommending adjustments to encoding protocols. This real-time evaluation reduces reliance on manual audits and enables continuous compliance assurance.

As compliance risks or regulatory updates are detected, the AI regulatory manager adjusts encoding rules (step 6206). Traditional encoding policies require manual updates to align with new regulations, introducing delays and potential human error. In contrast, MSVT automatically modifies encoding parameters, ensuring that data handling and storage practices remain compliant with evolving standards such as GDPR, HIPAA, CCPA, and FIPS 140-3. By applying machine learning-driven risk assessment models, the system dynamically selects the appropriate encoding level based on data sensitivity, regulatory classification, and jurisdictional mandates.

Once encoding rules are updated, automated encryption ensures compliance (step 6208). Unlike conventional encryption mechanisms that apply uniform security policies across all data types, MSVT dynamically adjusts encryption complexity based on compliance requirements. For instance, sensitive healthcare data governed by HIPAA regulations may require homomorphic encryption, while financial transaction records subject to PCI-DSS standards may necessitate multi-layered encryption encoding. By intelligently adapting encryption methods, MSVT ensures regulatory alignment while optimizing computational efficiency.

As part of its compliance verification process, a regulatory audit trail is recorded (step 6210). Traditional compliance audits rely on retrospective data analysis, often requiring manual documentation of security and encryption policies. MSVT eliminates this inefficiency by automatically generating audit trails in real-time, ensuring that all encoding transitions, encryption modifications, and compliance rule updates are documented. The system leverages a distributed ledger, such as blockchain or other suitable distributed ledger-based audit trails and zero-knowledge proof mechanisms, providing tamper-resistant logs that enhance regulatory transparency and reduce the risk of compliance violations.

The compliance use case concludes when a verified compliance report is sent (step 6212). Unlike traditional compliance reporting systems that require manual aggregation of audit data, MSVT autonomously compiles detailed compliance verification reports. These reports include policy adjustments, encryption transitions, regulatory risk assessments, and adherence validation metrics, providing compliance officers with automated, real-time insights into regulatory conformance. Additionally, the system securely transmits compliance reports to regulatory authorities or internal governance teams, ensuring that organizations meet reporting obligations with minimal administrative overhead.

Figure 2D:
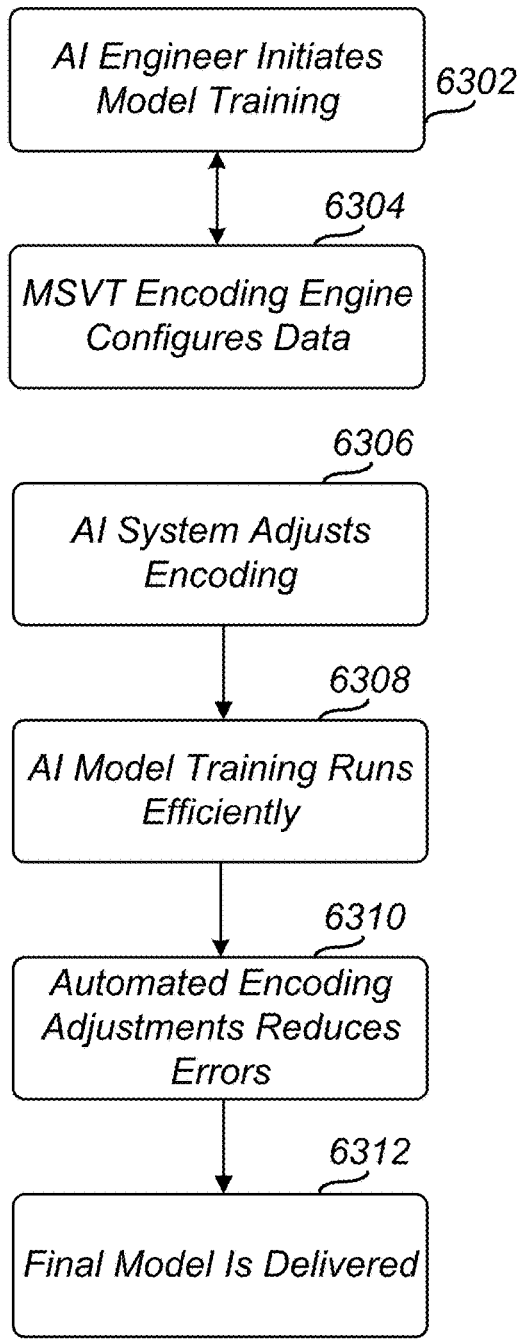
FIG. 2D illustrates use case 4 example, AI and machine learning engineers (with loopbacks)

Referring to FIG. 2D, which illustrates use case 4 for AI and machine learning engineers (with loopback), the present invention provides an adaptive, AI-driven encoding framework that optimizes machine learning model training by dynamically adjusting data encoding and processing efficiency. Traditional AI model training pipelines often struggle with inefficient data preparation, suboptimal encoding strategies, and high computational overhead. These inefficiencies result in increased training times, elevated hardware costs, and compromised model accuracy due to poorly structured data. The MSVT system overcomes these challenges by applying real-time encoding optimizations that improve data quality, reduce error rates, and enhance the overall performance of AI and machine learning workloads.

The MSVT system provides substantial advantages over prior AI model training approaches. Unlike static data encoding pipelines, MSVT continuously adapts data formats and encoding states in response to real-time training conditions, ensuring optimal efficiency and performance. The system integrates multi-layered encoding adaptation, allowing AI models to process data more effectively while reducing memory and compute overhead. Automated encoding corrections prevent data degradation, ensuring that AI models receive well-structured input throughout training. Additionally, real-time workload balancing and computational resource optimization reduce hardware costs, enabling faster, more energy-efficient AI training.

Through its adaptive data encoding, AI-driven optimization, real-time error correction, and seamless encoding transitions, the MSVT system transforms AI model training for machine learning engineers, enabling organizations to accelerate training times, improve model accuracy, and reduce computational costs while maintaining an optimized, adaptive learning environment.

The use case begins when an AI engineer initiates model training (step 6302). In conventional machine learning workflows, data must be preprocessed and structured manually, often requiring substantial time and effort to optimize encoding formats for different AI models. The MSVT system automates this process by assessing the nature of the dataset, the training objective, and the computational workload, dynamically selecting the most efficient encoding strategy to prepare data for training.

Once training is initiated, the MSVT encoding engine configures data (step 6304) to optimize its structure for AI processing. Unlike traditional encoding systems that apply a fixed encoding scheme across all datasets, MSVT dynamically adapts encoding based on data distribution, feature importance, and model-specific processing requirements. The system selects from binary, ternary, quaternary, and higher-order encoding states, ensuring that the most computationally efficient format is used while preserving critical data characteristics.

Following data configuration, the AI system adjusts encoding (step 6306) in response to real-time performance metrics. Traditional AI pipelines often encounter bottlenecks due to inefficient data formats that lead to increased memory usage and processing delays. MSVT continuously evaluates encoding efficiency and dynamically transitions between encoding states based on hardware utilization, model convergence rates, and optimization constraints. By adjusting encoding complexity in real-time, the system ensures that AI models receive well-structured input data, accelerating the learning process.

As training progresses, AI model training runs efficiently (step 6308) due to the optimized data processing enabled by MSVT. Unlike conventional training workflows that rely on static preprocessing pipelines, MSVT leverages adaptive encoding transitions to prevent training inefficiencies. The system automatically reallocates computational resources, reducing redundant operations and minimizing latency. By optimizing data entropy, compression rates, and encoding redundancy, MSVT significantly lowers computational costs while improving model generalization capabilities.

Throughout the training process, automated encoding adjustments reduce errors (step 6310) by dynamically fine-tuning data encoding to minimize information loss, rounding errors, and computational inefficiencies. In traditional AI model training, encoding inconsistencies can lead to degraded model performance and increased error propagation. MSVT proactively detects potential encoding mismatches and applies self-correcting optimization algorithms, ensuring that training data remains accurately structured throughout the learning process.

The use case concludes when the final model is delivered (step 6312). Unlike conventional model deployment workflows, where post-training encoding adjustments must often be manually implemented to optimize model performance, MSVT seamlessly transitions the optimized encoding structure from training to inference. The system retains an encoding performance history, allowing the trained AI model to maintain peak efficiency when applied to real-world data. This ensures that AI deployments benefit from the same adaptive encoding strategies that optimize the training process, leading to faster inference speeds, lower resource consumption, and improved model accuracy.

Figure 2E:
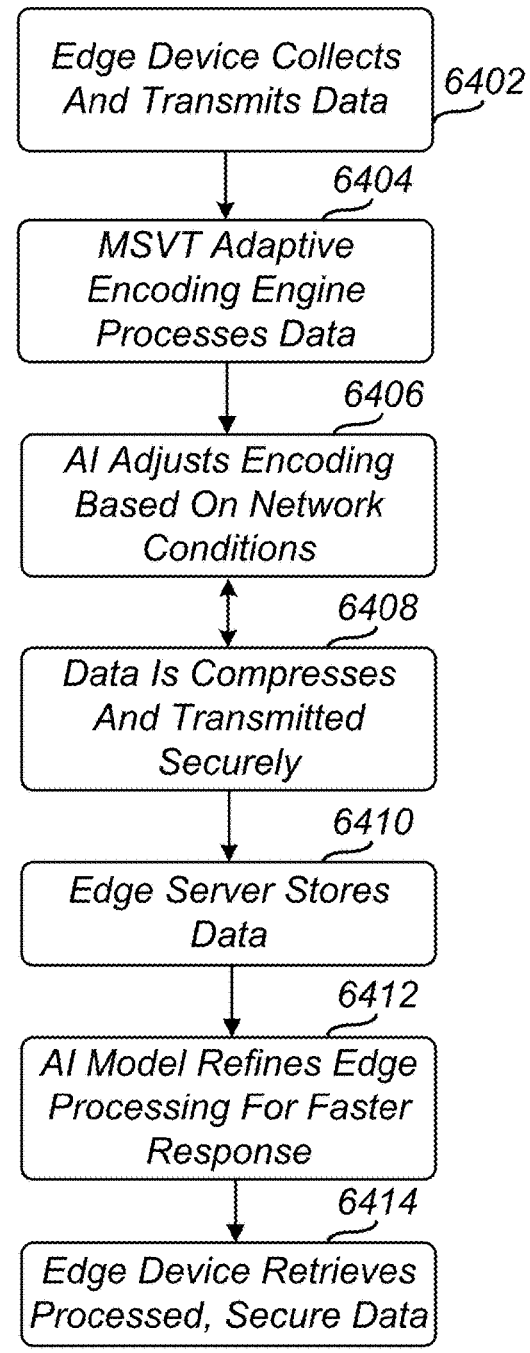
FIG. 2E illustrates use case 5 example, cloud-native and edge computing developers (with loopbacks)

Referring to FIG. 2E, which illustrates use case 5 for cloud-native and edge computing developers (with loopback), the present invention provides an adaptive, AI-driven encoding framework that optimizes data processing and transmission across distributed edge computing environments. Traditional edge computing architectures rely on static data encoding techniques that fail to dynamically adjust to network conditions, bandwidth constraints, and latency-sensitive applications. These limitations result in inefficient data handling, increased transmission delays, and suboptimal performance for real-time edge applications. The MSVT system overcomes these challenges by dynamically adjusting encoding states based on real-time network conditions, ensuring efficient data compression, secure transmission, and optimized edge-to-cloud processing.

The MSVT system provides several advantages over prior edge computing approaches. Unlike static encoding methods that fail to adapt to changing network conditions, MSVT continuously monitors and optimizes encoding complexity in real-time, ensuring efficient data handling and minimal transmission latency. By integrating AI-driven encoding state selection, the system enhances edge-to-cloud communication while reducing bandwidth consumption. Adaptive compression techniques minimize storage overhead, while dynamic encryption protocols safeguard data throughout its lifecycle. Additionally, automated AI-driven inference optimizations improve real-time processing efficiency, allowing edge applications to respond to incoming data streams with greater accuracy and speed.

Through its adaptive encoding transitions, real-time network-aware optimizations, secure data transmission, and AI-driven edge processing enhancements, the MSVT system revolutionizes cloud-native and edge computing, enabling developers to achieve higher data efficiency, reduced network congestion, and optimized real-time processing while maintaining robust security and compliance.

The use case begins when an edge device collects and transmits data (step 6402). In conventional edge computing frameworks, raw sensor or IoT data is transmitted to centralized servers without intelligent preprocessing, leading to high bandwidth consumption, network congestion, and increased latency. The MSVT system addresses these inefficiencies by preprocessing data at the edge, applying adaptive encoding techniques before transmission to reduce data volume while preserving essential information.

Once data is collected, the MSVT adaptive encoding engine processes the data (step 6404). Unlike traditional encoding methods that apply fixed compression rates regardless of network conditions, MSVT dynamically selects the optimal encoding state, leveraging binary, ternary, quaternary, or higher-order encoding levels based on factors such as data type, security requirements, and network capacity. This adaptive encoding ensures that data is structured for optimal transmission while minimizing computational overhead.

As edge devices operate in environments with fluctuating network connectivity, AI-driven encoding adjustments are made based on network conditions (step 6406). Traditional data transmission systems lack real-time encoding adaptation, leading to packet loss, increased retransmissions, and degraded application performance. The MSVT system continuously monitors bandwidth availability, latency thresholds, and transmission errors, dynamically adjusting encoding complexity to maintain stable and efficient data flow.

Following encoding adjustments, the data is compressed and securely transmitted (step 6408). Unlike conventional compression algorithms that apply static data reduction techniques, MSVT integrates entropy-based compression with multi-state encoding, reducing data payload size without compromising integrity. Additionally, end-to-end encryption mechanisms are applied, ensuring that transmitted data remains secure against interception or unauthorized access.

Upon reaching its destination, the edge server stores the processed data (step 6410). Conventional edge storage architectures rely on predefined retention policies and fixed encryption standards, often resulting in inefficient data management. The MSVT system enhances edge storage efficiency by dynamically managing data retention, encryption levels, and access control policies, ensuring that stored data aligns with both security and performance requirements.

To further enhance edge processing capabilities, an AI model refines edge processing for faster response times (step 6412). Traditional edge systems struggle with adaptive inference optimization, leading to inefficient model execution and increased computational overhead. MSVT leverages AI-driven encoding refinements, dynamically adjusting data structures to improve inference efficiency, reduce processing delays, and enhance real-time decision-making at the edge.

The use case concludes when the edge device retrieves the processed and secure data (step 6414). Unlike conventional retrieval mechanisms that require manual reformatting or decompression steps, MSVT enables seamless, on-demand access to optimized data, ensuring that edge applications can efficiently leverage processed information without additional overhead. The system supports automated encoding transitions, allowing data to be reconstructed with minimal latency while preserving its original fidelity.

Figure 3:
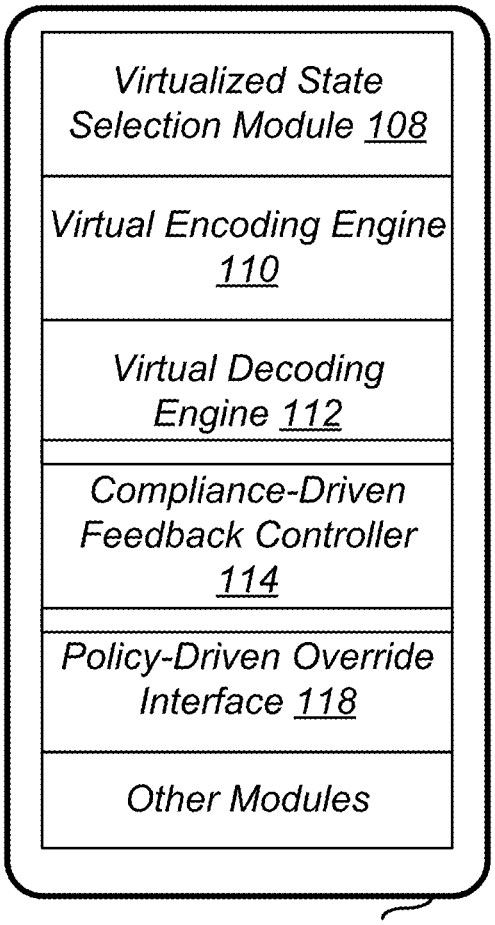
FIG. 3 illustrates examples of system block diagrams, for adaptive multi-state encoding and processing in a virtualized computing environment, for virtualized applications, virtualized applications with hardware acceleration, and virtualized security applications.
Figure 3:
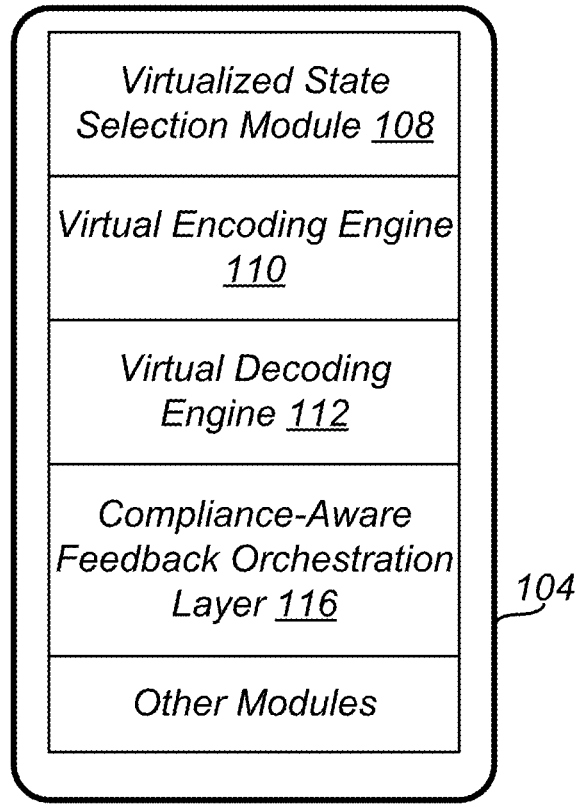
Figure 3:
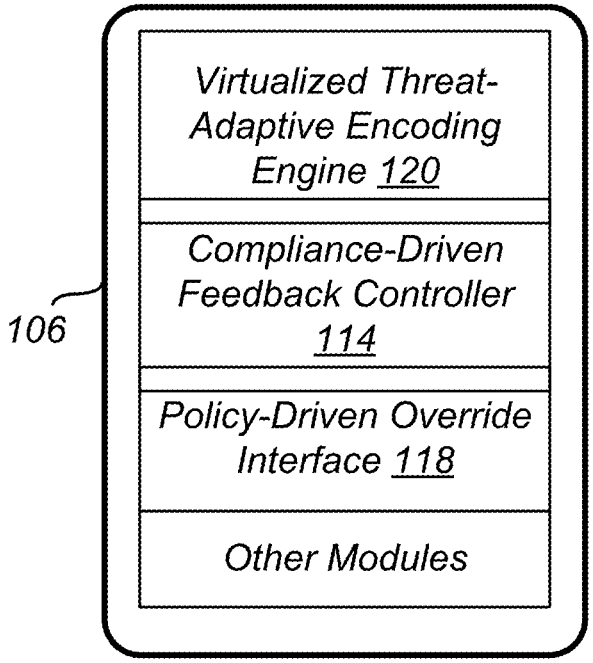

Referring to FIG. 3, there is illustrated an exemplary system block diagram for adaptive multi-state encoding and processing in a virtualized computing environment. In an exemplary embodiment, the system is configured to support various deployment models, including virtualized applications 102, virtualized applications with hardware acceleration 104, and virtualized security applications 106. These configurations enable dynamic encoding state transitions, optimizing computational efficiency, security compliance, and workload distribution.

Figure 4:
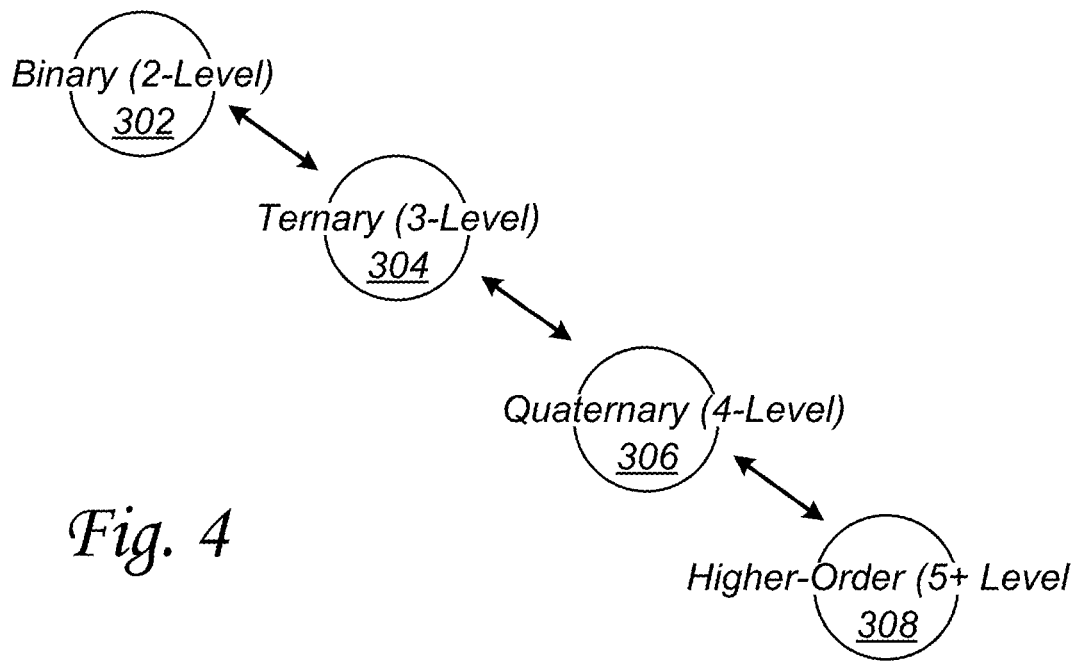
FIG. 4 illustrates one example of multi-state encoding and in particular, transitioning between various encoding states.

In an exemplary embodiment, the system block diagram for virtualized applications can comprise a virtualized state selection module, a virtual encoding engine, a virtual decoding engine, a compliance-driven feedback controller, a policy-driven override interface, and other interoperable modules that support dynamic encoding operations. These components are shown in greater detail in FIG. 4, which illustrates their operational relationships within a virtualized computing environment. The virtualized state selection module continuously monitors a range of system performance metrics, including processing load, network bandwidth, power consumption, thermal dissipation, and active security requirements. Based on this telemetry, the module dynamically selects an optimal encoding state from a configurable set of encoding levels, including binary (2-state or level), ternary (3-state or level), quaternary (4-state or level), and higher-order encoding states or levels, as illustrated in FIG. 4 and supported by adaptive decision policies.

The virtual encoding engine receives the selected encoding state and performs the appropriate transformation of data using either hardware-accelerated or CPU-based execution paths. The virtual decoding engine operates in parallel, configured to decode incoming data according to the active encoding format and apply error correction, redundancy reconstruction, and zero-knowledge proof-based integrity checks. The compliance-driven feedback controller continuously evaluates whether the current encoding configuration satisfies applicable regulatory requirements and adjusts operational parameters or triggers reconfiguration events as needed. The policy-driven override interface allows administrative users to assign encoding priorities based on goals such as energy efficiency, security hardening, or jurisdiction-specific compliance enforcement. Together, these components form a modular and extensible framework capable of performing real-time, AI-coordinated encoding state transitions across diverse cloud and edge environments.

The system block diagram for virtualized applications with hardware acceleration 104 can comprise a virtualized state selection module 108, a virtual encoding engine 110, a virtual decoding engine 112, a compliance-aware orchestration layer 116, and other modules. In certain embodiments, hardware acceleration is incorporated to enhance encoding efficiency in high-performance computing environments. The system integrates specialized processing elements, including hardware-based cryptographic accelerators, dedicated AI co-processors, and real-time encoding management units, which facilitate low-latency encoding state transitions while maintaining security compliance.

The system block diagram for virtualized security applications 106 can comprise a virtualized threat-adaptive encoding engine 120, a compliance-driven feedback controller 114, a policy-driven override interface 118, and other suitable modules. In the virtualized security applications 106, a virtualized state selection module 108 can be instantiated within virtual machines or containerized instances, and a virtual encoding engine 110, operatively coupled to the virtualized state selection module 108, can be configured as the virtualized threat-adaptive encoding engine 120. The threat-adaptive encoding engine 120 applies multi-layered encryption encoding techniques, including homomorphic encryption, lattice-based cryptography, and adaptive obfuscation methodologies, ensuring data integrity and confidentiality. The system dynamically adjusts encoding redundancy factors in response to threat intelligence feeds, detected anomalies, and evolving cybersecurity risks.

A compliance-driven feedback controller 114 orchestrates real-time encoding performance evaluation, adapting encoding states in response to detected performance fluctuations, security anomalies, or jurisdictional compliance updates. The controller is configured to enforce general data protection regulation (GDPR), health insurance portability and accountability act (HIPAA), and federal information processing standards (FIPS) 140-3 security mandates, automatically reconfiguring encoding policies based on detected regulatory requirements.

A policy-driven override interface 118 is provided, allowing system administrators to define encoding prioritization parameters, including latency reduction prioritization, security-hardening measures, or adaptive power conservation constraints. The override interface ensures that encoding transitions align with operational objectives while maintaining compliance with enterprise security policies.

In certain embodiments, a feedback orchestration layer 116 dynamically adjusts encoding complexity based on system workload fluctuations, preemptively optimizing computational throughput. This layer integrates AI-based predictive modeling, which forecasts encoding state transitions based on historical system telemetry data.

Additionally, the system incorporates multi-tenant encoding isolation, preventing unauthorized access between distinct virtualized encoding processes. This ensures data segregation in cloud computing environments where multiple users or enterprises operate within shared infrastructure.

Accordingly, FIG. 3 illustrates an adaptable, multi-state encoding system capable of dynamically optimizing encoding efficiency, security posture, and compliance adherence within virtualized environments, hardware-accelerated applications, and security-sensitive deployments. The system ensures operational resilience by leveraging AI-driven decision-making, real-time feedback loops, and multi-layered encoding protections to optimize resource allocation and performance within dynamically changing computing environments.

Referring to FIG. 4, there is illustrated a diagram of multi-state encoding transitions. In an exemplary embodiment, the present invention can dynamically transition between various encoding states. The system is designed to select and modify encoding states based on real-time system conditions, workload requirements, and computational efficiency considerations.

In an exemplary embodiment, the system supports multiple encoding levels, including binary (2-state or level) encoding 302, ternary (3-state or level) encoding 304, quaternary (4-state or level) encoding 306, and higher-order encoding (5+ state or level) encoding 308. The transition between these encoding states is dynamically determined by analyzing processing workload, security constraints, energy efficiency, and network bandwidth availability.

Adaptive Encoding State Transition

The multi-state encoding transition mechanism enables a progressive increase or decrease in encoding complexity based on operational demands. The system employs AI-driven selection models that analyze historical workload trends, real-time latency fluctuations, and predictive failure analysis to determine when to transition between encoding states.

Binary (2-Level) Encoding 302—This state is used as the default encoding level for low-complexity workloads, where computational efficiency is prioritized over data density. It is typically applied in low-latency processing environments, real-time communication networks, and power-constrained devices.

Ternary (3-Level) Encoding 304—Used for medium-level computational tasks, ternary encoding enhances data compression while maintaining a balance between performance and processing overhead. This encoding state is beneficial in cloud-based data transmission and AI inference tasks that require increased efficiency without excessive computational cost.

Quaternary (4-Level) Encoding 306—This state further improves data density while maintaining reasonable computational performance. Quaternary encoding is particularly effective for adaptive multimedia processing, encrypted data handling, and machine learning model training.

Higher-Order Encoding (5+ Level) 308—At this level, encoding complexity is significantly increased to optimize security, AI inference efficiency, and reduced data redundancy. Higher-order encoding states are often employed in homomorphic encryption processing, quantum-resistant cryptography, and AI-driven predictive analytics.

AI-Driven Encoding Transition Optimization

The system incorporates AI-based reinforcement learning techniques to improve encoding selection based on performance history and predictive modeling. The AI-driven selection framework evaluates:

Real-time latency fluctuations to avoid unnecessary encoding complexity in time-sensitive environments;

Power consumption metrics to balance energy efficiency with computational performance;

Network bandwidth constraints to optimize encoding for high-throughput transmission networks;

Security compliance requirements, ensuring that data encoding aligns with regulations such as GDPR, HIPAA, and FIPS; and Other parameters.

Additionally, predictive failure analysis is implemented to detect potential encoding inefficiencies before they occur, allowing preemptive adjustments to optimize performance.

Dynamic Encoding Adjustments in Virtualized Environments

In virtualized computing environments, the adaptive multi-state encoding process is orchestrated through a virtualized state selection module that dynamically distributes encoding workloads across virtualized processing units, such as:

Virtualized field-programmable gate arrays (vFPGAs);

Virtualized graphics processing units (vGPUs);

Containerized tensor processing units (cTPUs); or

Other virtual processing units.

These components facilitate on-demand scaling of encoding complexity, ensuring that resource availability and system constraints are accounted for in real-time.

In an exemplary embodiment, the present invention illustrates a highly adaptive encoding framework capable of dynamically transitioning between binary, ternary, quaternary, and higher-order encoding states. The system leverages AI-driven decision-making, predictive modeling, and real-time workload analysis to optimize encoding efficiency, ensuring a balance between performance, security, and computational overhead.

In operation, the AI Control Engine is responsible for coordinating encoding transitions in response to continuously evolving system conditions. The engine receives real-time telemetry data from the performance monitoring subsystem, including metrics such as processor utilization, network bandwidth usage, thermal output, encoding latency, and overall computational efficiency.

Using this telemetry, the AI Control Engine consults the E-Matrix, an internal decision matrix populated with weighted performance indicators and compliance criteria. The E-Matrix serves as a contextual map that links specific system conditions to recommended encoding states, allowing the AI engine to reason through a structured and policy-informed set of options.

To determine whether a state transition should occur, the AI engine calculates a State Morph Coefficient (SMC)—a scalar value that quantifies the magnitude of change between the current and target encoding states based on detected performance deltas. A high SMC value indicates significant deviation from optimal operation and prompts a more aggressive or immediate encoding state transition.

For example, if the system detects that resource utilization exceeds a predefined threshold and latency surpasses acceptable limits, the AI engine may initiate a transition to a lower-bandwidth encoding state to relieve congestion and reduce delay. Alternatively, if data accuracy falls outside the expected range, the engine may transition to a higher-precision encoding state to maintain output fidelity. These dynamic decisions are implemented through updated encoding profiles that are dispatched to the multi-state encoder.

An exemplary logic flow used by the AI Control Engine for adaptive encoding transitions may follow the structure:
If system load is high and latency is excessive, trigger a shift to a low-bandwidth encoding mode.
If output accuracy drops below a defined threshold, trigger a shift to a high-precision encoding mode.
Apply the selected encoding profile accordingly.

For example and not a limitation, pseudocode for an adaptive encoding trigger can be represented by the following:

```
if resource_utilization>threshold and latency>target:
    state=morph_to_low_bandwidth( )
elif accuracy<expected_range:
    state=morph_to_high_precision( )
apply_encoding_profile(state)
```

This intelligent feedback loop allows the MSVT system to self-optimize in real time, maintaining a balance between computational efficiency, compliance alignment, and operational performance across virtualized and distributed infrastructures.

In support of coordinated system behavior across distributed deployments, the MSVT system further includes a Federated Optimization framework as illustrated in FIG. 3. This framework enables encoding nodes operating in different environments, such as edge devices, cloud clusters, or enterprise data centers, to share non-sensitive updates to the E-Matrix. These shared updates are aggregated in a privacy-preserving manner, allowing the AI Control Engine to refine global encoding policies without accessing raw data. Each node contributes feedback on encoding performance and state efficacy, which is weighted and integrated into a collective model. This federated learning-style mechanism improves encoding adaptability over time, even in decentralized infrastructures, while maintaining data locality and compliance isolation.

Figure 5:
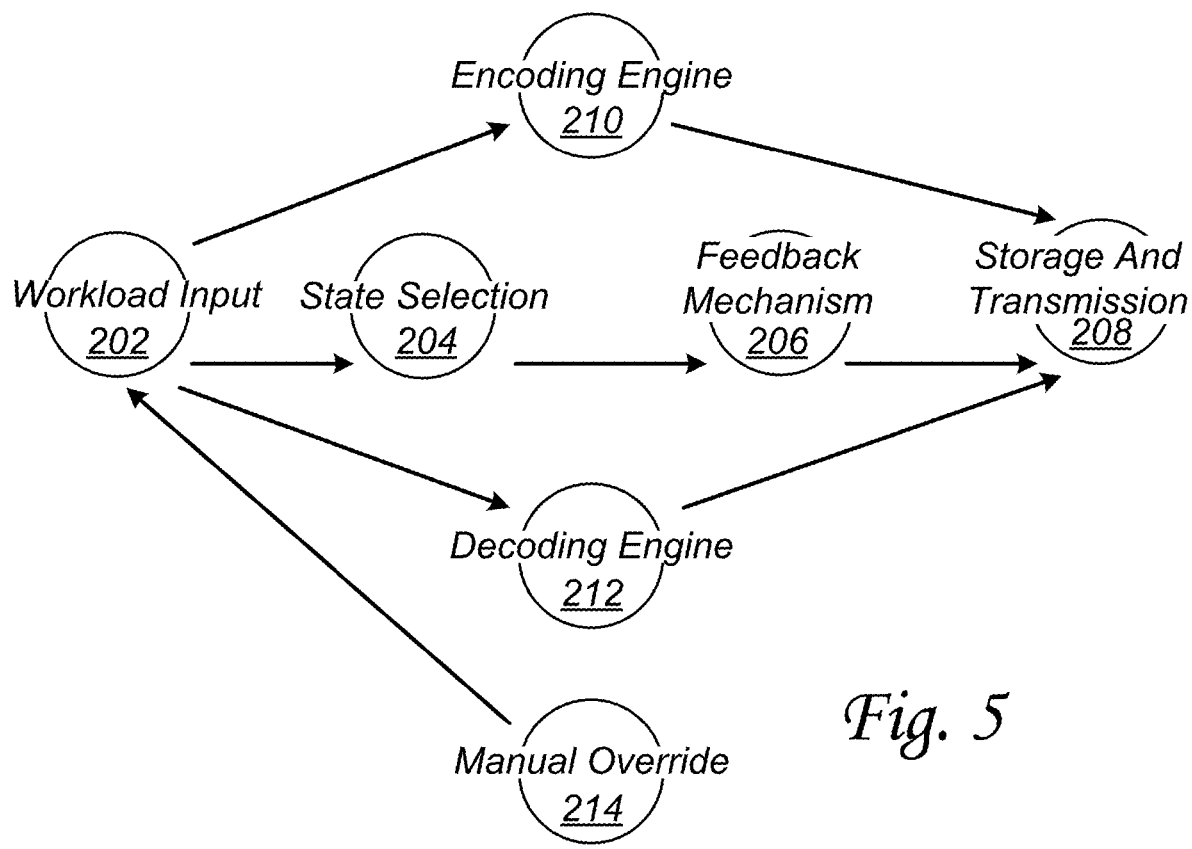
FIG. 5 illustrates one example of a multi-state virtual transformer (MSVT) high-level system architecture.

To ensure that all encoding transitions are transparently verifiable and auditable, the system incorporates a Compliance and Audit Layer, shown in FIG. 5. Every encoding decision, including the selected state and justification context, is recorded to a permissioned distributed ledger, such as blockchain or other suitable distributed ledgers. The distributed ledger captures tamper-resistant audit trails, cryptographic proofs of compliance, and metadata associated with encoding policy enforcement. This layer guarantees traceability and non-repudiation, features that are essential for adoption in regulated industries such as healthcare, defense, and financial services, where encoding operations must be both demonstrably secure and audit-ready.

Finally, the system provides a Performance Output Layer, as shown in FIG. 6, which encapsulates the efficiency impact of each encoding decision. Metrics such as bandwidth savings, CPU or GPU cycles conserved, latency improvements, and energy consumption reductions are measured and recorded. These performance outputs are stored in both local logs and distributed ledger-backed compliance ledgers, enabling system administrators and auditors to assess the tangible benefits of adaptive encoding decisions over time. The availability of these metrics also enables the AI engine to refine its reward function, further enhancing future decision-making precision and system responsiveness.

Each encoding state is associated with performance thresholds for latency, power consumption, and compliance risk. The reinforcement learning agent evaluates transitions not only based on immediate reward, but also based on threshold mapping to long-term system health.

Together, these interconnected layers, federated optimization, distributed ledger-backed compliance logging, and performance telemetry, equip the MSVT system with the intelligence, trustworthiness, and efficiency necessary to operate in mission-critical, compliance-bound, and resource-constrained environments.

The MSVT system delivers multiple advantages over prior encoding and compliance architectures by addressing limitations commonly found in static, one-size-fits-all encoding models. Unlike traditional encoders that rely on fixed encoding formats and predefined thresholds, the MSVT system introduces adaptive, context-aware encoding that dynamically transitions between multiple encoding states based on real-time telemetry, regulatory requirements, and resource constraints. This allows for encoding behavior that is both intelligent and responsive to the operating environment.

Furthermore, the system's integration of distributed ledger-enabled compliance introduces a significant innovation: full traceability of encoding decisions, transitions, and performance impact. By logging encoding operations to a permissioned distributed ledger using smart contracts and zero-knowledge proof attestations, the system ensures a level of transparency, auditability, and non-repudiation previously unattainable in conventional data encoding systems.

Another distinguishing feature is the use of AI-based decision logic, including reinforcement learning and federated model refinement, to continuously optimize performance across multiple quality-of-service (QoS) dimensions such as latency, throughput, energy efficiency, and security compliance. This AI-driven adaptability enables proactive, rather than reactive, system behavior in environments with fluctuating demands and evolving threat or compliance landscapes.

From a deployment perspective, the MSVT system embraces a modular plug-and-play architecture that is compatible with edge devices, centralized cloud services, and hybrid infrastructures. This allows operators to deploy encoding intelligence at the point of need—whether in an edge gateway, a containerized microservice, or a data center node—without requiring extensive reconfiguration or hardware modification.

These architectural advantages translate into diverse, high-impact use cases. For example:
In IoT device mesh networks, the MSVT system can dynamically reduce bandwidth usage by adjusting encoding complexity based on network congestion and node battery status.
In real-time video processing platforms, the system enables on-the-fly adjustments to resolution and quality, allowing for smooth playback and reduced latency across varied network conditions.
In secure data environments, such as those found in finance, healthcare, or government, MSVT ensures that all encoding operations are policy-compliant and verifiable, satisfying strict audit and traceability requirements without sacrificing performance.

Collectively, these capabilities position the MSVT system as a next-generation solution for intelligent, compliant, and efficient encoding in modern distributed computing environments.

Referring to FIG. 5, there is illustrated an exemplary high-level system architecture for a Multi-State Virtual Transformer (MSVT), which dynamically transitions between multiple encoding states in response to real-time workload conditions. The system is structured to include various operational components, ensuring optimized encoding performance, resource efficiency, and adaptive security compliance.

In an exemplary embodiment, the MSVT system architecture comprises the following key components:

Workload Input 202: Represents the incoming data stream, computational load, or security-based encoding requirement that the system processes. This workload input can originate from cloud-based environments, edge computing nodes, or enterprise data centers. The system continuously monitors workload variability and dynamically adjusts encoding states to ensure optimal performance.

State Selection Module 204: This module is responsible for determining the appropriate encoding state based on factors such as computational efficiency, security policies, regulatory compliance, and available system resources. The state selection module 204 dynamically transitions between encoding levels, including binary (2-state), ternary (3-state), quaternary (4-state), and higher-order encoding states, to balance encoding complexity with real-time efficiency needs.

Feedback Mechanism 206: The feedback mechanism 206 acts as an AI-driven optimization layer that continuously evaluates encoding performance, energy consumption, and security constraints. This mechanism incorporates predictive failure analysis, enabling the system to anticipate potential inefficiencies and proactively reconfigure encoding transitions before performance degradation occurs. The feedback mechanism also leverages reinforcement learning algorithms to refine encoding state transitions over time, ensuring continuous system improvement.

Storage and Transmission 208: Encoded data is stored or transmitted based on the determined encoding state. This component ensures secure data persistence, optimized transmission bandwidth, and compliance-driven storage management. The system can apply homomorphic encryption techniques to enable secure computation on encrypted data without decryption, reducing security risks while maintaining efficient processing.

Encoding Engine 210: The encoding engine 210 executes encoding operations by leveraging hardware-accelerated computing resources, including virtualized field-programmable gate arrays (vFPGAs), virtualized graphics processing units (vGPUs), and containerized tensor processing units (cTPUs). The engine dynamically adjusts encoding entropy levels based on real-time network congestion, workload spikes, and adaptive security profiles.

Decoding Engine 212: The decoding engine 212 is configured to reconstruct encoded data based on the selected encoding state, ensuring error correction, redundancy-adjusted reconstruction, and anomaly-based integrity checks. The decoding engine integrates zero-knowledge proof-based verification mechanisms to validate data authenticity without exposing sensitive information, enhancing security for privacy-sensitive applications.

Manual Override 214: A policy-driven manual override interface allows administrators to define encoding parameters based on predefined operational objectives, such as prioritizing low-latency encoding for AI inference, enforcing security-hardening measures for compliance, or optimizing power conservation for resource-limited deployments. The manual override interface provides fine-grained control over encoding transitions, ensuring adaptability to real-time enterprise or cloud computing needs.

System Operations and Optimization Strategies

The MSVT system architecture operates by continuously evaluating real-time workload distribution, security risks, and regulatory compliance, ensuring that encoding states are dynamically optimized to improve computational efficiency while maintaining robust data protection. In operation:

AI-Driven Encoding Adaptation: The state selection module 204 applies machine learning heuristics to predict optimal encoding state transitions based on historical data and real-time performance insights.

Automated Workload Redistribution: The feedback mechanism 206 dynamically reconfigures encoding tasks across distributed cloud infrastructure, preventing bottlenecks and improving system throughput.

Security-Aware Encoding Modulation: The encoding engine 210 integrates lattice-based cryptographic encoding and post-quantum encryption methodologies to safeguard against unauthorized data interception.

Regulatory Compliance Integration: The storage and transmission 208 component ensures alignment with GDPR, HIPAA, and FIPS 140-3 security mandates, dynamically adjusting encoding policies based on jurisdictional data protection requirements.

Figure 6A:
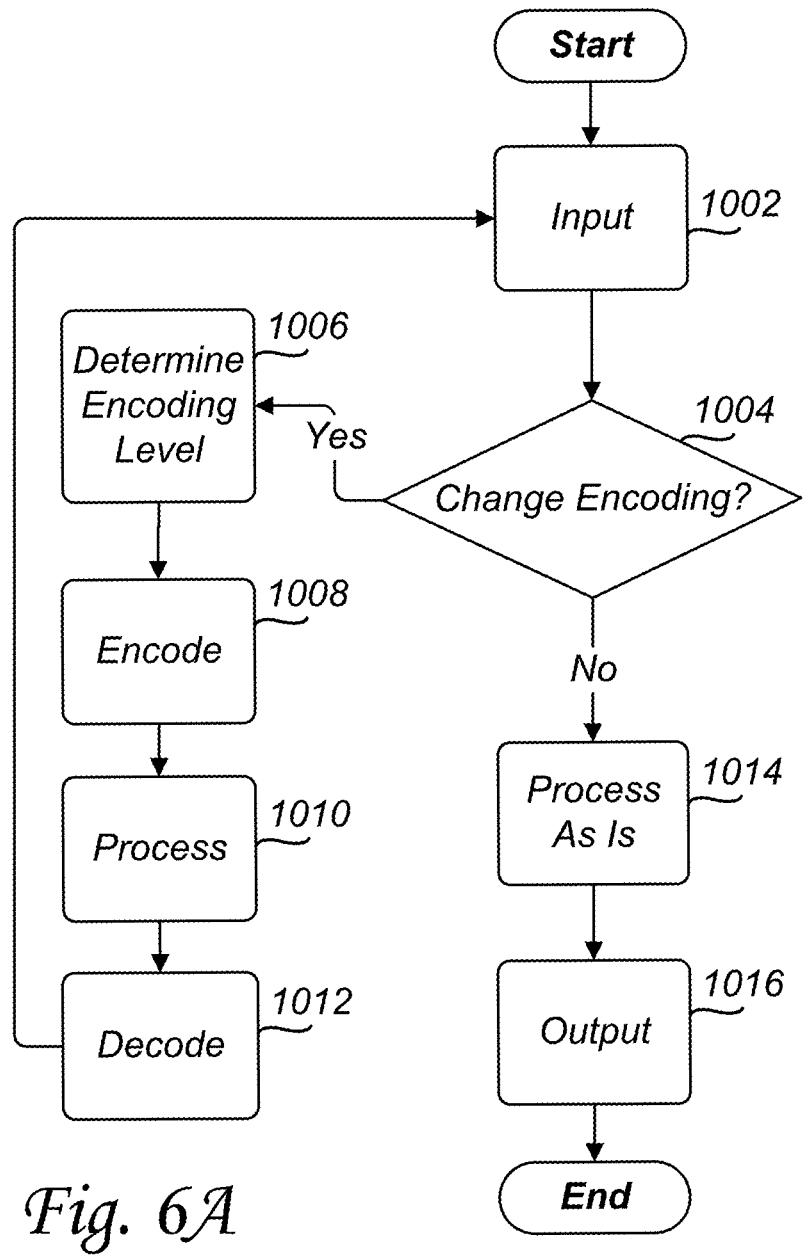
FIG. 6A illustrates one example of a MSVT method flow that is configured to determine when to change encoding schemes.

Referring to FIG. 6A, there is illustrated an exemplary a MSVT method flow that is configured to determine when to change encoding schemes. This method enables dynamic selection of encoding levels based on workload conditions, system efficiency, and computational constraints. The MSVT method incorporates real-time analysis, predictive failure detection, and encoding optimization mechanisms to ensure efficient data processing. In operation, the MSVT method ensures that adaptive encoding transitions are seamlessly integrated into virtualized computing environments, enhancing efficiency, security, and computational scalability. The multi-state encoding transition process dynamically aligns with workload fluctuations, regulatory mandates, and system performance objectives to achieve optimal encoding performance.

In an exemplary embodiment, the MSVT method begins in step 1002, where an input is received. The system monitors incoming data and workload characteristics, evaluating parameters such as latency requirements, security constraints, energy consumption, and available computational resources. The system classifies the data type and assesses whether the current encoding level is optimal based on predefined efficiency metrics. The method then moves to step 1004.

In step 1004, a decision is made regarding whether to change the encoding scheme. The system applies AI-driven predictive modeling and historical workload analysis to determine if an encoding state transition is necessary. This decision process considers factors such as:

Current network bandwidth and potential transmission bottlenecks;

Energy efficiency and power consumption trends;
Data security policies, including compliance with regulations like GDPR, HIPAA, and FIPS;
Computational workload intensity and available processing capacity and
Other factors If the system determines that the encoding scheme should change, the process proceeds to step 1006; otherwise, it continues to step 1014.

In step 1006, the system determines the new encoding level. The selection is made from binary (2-level) 302, ternary (3-level) 304, quaternary (4-level) 306, or higher-order (5+ level) 308 encoding states. The decision is based on real-time workload analysis, where the system dynamically assigns the encoding state that optimizes both performance and security. In operation, for example and not a limitation:

Lower-order encoding states (e.g., binary or ternary) are chosen for low-complexity operations that prioritize energy efficiency; and
Higher-order encoding states (e.g., quaternary or 5+ level) are selected for high-throughput, security-sensitive, or AI-driven applications, where reducing redundancy and maximizing encoding efficiency are critical.

The method then moves to step 1008.

In step 1008, the selected encoding scheme is applied to encode the data. The encoding engine performs hardware-accelerated encoding operations using resources such as virtualized field-programmable gate arrays (vFPGAs), virtualized graphics processing units (vGPUs), and containerized tensor processing units (cTPUs). The encoding engine dynamically adjusts entropy levels and redundancy factors to ensure data integrity during transmission. The method then moves to step 1010.

In step 1010, the encoded data is processed. The system transmits the encoded data through storage and transmission layers 208, ensuring secure and efficient handling. AI-based predictive encoding failure analysis monitors potential bottlenecks and triggers adaptive optimizations as needed. The method then moves to step 1012.

In step 1012, the encoded data is decoded. The virtual decoding engine 112 applies error correction heuristics, anomaly-based decoding integrity checks, and redundancy-adjusted data reconstruction to restore the original data. If the system detects anomalies, excessive latency, or encoding failures, it returns to step 1002 for re-evaluation.

In step 1014, if no encoding change is needed, the data is processed as-is. The system bypasses unnecessary encoding transitions to conserve computational resources and reduce latency. This ensures that minimal processing power is used for workloads that do not require encoding adjustments. The method then moves to step 1016.

In step 1016, the processed data is outputted. The system delivers the final output, ensuring compliance with security policies and efficiency constraints. If further encoding optimizations are required, the system initiates an iterative feedback loop to continuously refine encoding state transitions.

Figure 6B:
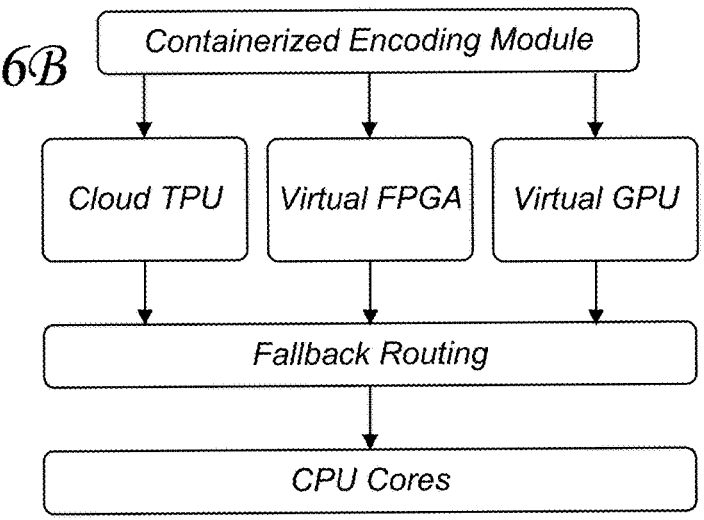
FIG. 6B illustrates one example of a hardware integration diagram.

Referring to FIG. 6B, the illustrated system presents a detailed embodiment of a virtualized encoding architecture that integrates with multiple hardware accelerators and includes a CPU fallback mechanism to ensure reliable, high-performance encoding in a virtualized computing environment. The figure emphasizes how encoding operations can be dynamically routed between specialized processing components based on availability, system load, and encoding requirements.

At the center of this architecture is a containerized encoding module deployed within a cloud-native orchestration framework, such as those used for managing virtualized workloads. This module is responsible for executing encoding transitions across binary, ternary, quaternary, and higher-order encoding formats. It receives contextual input from upstream decision logic—such as encoding state selection or policy enforcement modules—and dynamically assigns encoding tasks to the most appropriate execution path.

The encoding module interfaces with three types of hardware acceleration units: a virtualized field-programmable gate array, a virtualized graphics processing unit, and a containerized tensor processing unit. Each of these components is capable of executing encoding instructions optimized for different performance profiles. The FPGA unit supports reconfigurable bit-level processing and may be preferred for deterministic, latency-sensitive workloads. The GPU unit is optimized for high-throughput, parallelizable encoding tasks. The TPU unit is suitable for complex, model-driven encoding decisions, particularly where machine learning inference is involved in selecting encoding parameters or predicting workload demands.

An internal controller within the encoding module orchestrates the routing of encoding operations. It monitors the availability and utilization of each hardware accelerator, selecting a destination based on real-time performance metrics such as latency, power draw, and thermal headroom. This controller also receives feedback on error rates and successful completion of encoding tasks, allowing it to continuously refine its selection strategy.

In cases where hardware acceleration is temporarily unavailable—such as when all accelerator units are at capacity or experiencing degraded performance—the system automatically engages a CPU-based fallback path. The fallback module enables encoding operations to continue using a software-only implementation. While this mode may operate with reduced throughput compared to dedicated hardware, it ensures that encoding continuity is maintained and that the system remains responsive under constrained conditions.

The containerized environment in which the encoding module operates allows the system to scale horizontally, launching additional encoding instances as demand increases. This environment also supports process isolation, enabling multiple tenants or applications to perform encoding operations in parallel without risk of data leakage or performance interference.

Overall, the architecture shown in this figure illustrates how encoding logic can adaptively shift between multiple compute execution paths in response to system conditions, making it highly resilient, fault-tolerant, and capable of maintaining high encoding performance in dynamic and distributed cloud environments. This embodiment supports both performance optimization and operational reliability through intelligent hardware integration and dynamic fallback orchestration.

In some embodiments, the virtual encoding engine and the compliance feedback controller are deployed across a container orchestration framework configured to manage the lifecycle, scaling, and network communication of containerized system components. The container orchestration framework may be selected from, but is not limited to, Kubernetes, Docker Swarm, or OpenShift. or equivalent orchestration environments supporting container scheduling and policy enforcement. or equivalent orchestration environments supporting container scheduling and policy enforcement.

This architecture enables the encoding engine and compliance controller to operate within isolated, resource-defined containers that can be dynamically scaled or restarted based on system load, encoding demand, or compliance evaluation activity. The orchestration framework monitors container health and availability, automatically redistributing encoding workloads or compliance verification tasks to available containers across the cluster. Such deployment ensures high availability, fault tolerance, and optimal resource allocation for both encoding and compliance functions.

In Kubernetes-based implementations, the encoding engine and compliance controller may be deployed as pods within a managed cluster, where horizontal scaling policies are triggered in response to encoding throughput metrics or compliance audit latency. In Docker Swarm or OpenShift environments, the services may be defined as replicated tasks or application builds, allowing encoding and compliance operations to be co-located or segmented by tenant, application type, or compliance domain.

Containerization further enables consistent deployment across hybrid or cloud-native infrastructures, supporting platform-agnostic portability and microservice-based modularization. This approach enhances the resilience and maintainability of the system by decoupling encoding and compliance components from underlying hardware and operating system dependencies. In addition, orchestration layers provide secure ingress and egress routing, role-based access control, and logging integrations that support regulatory auditing and service mesh enforcement.

By deploying the virtual encoding engine and compliance feedback controller in a container orchestration framework, the system achieves elastic scalability, rapid recovery from node failures, and efficient resource utilization, all while maintaining separation of duties and system observability in dynamic multi-tenant environments.

Figure 6C:
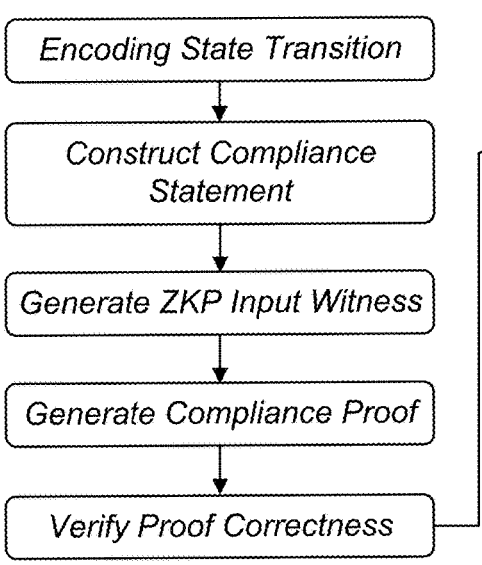
FIG. 6C illustrates one example of a zero-knowledge proof (ZKP) compliance verification model.
Figure 6C:
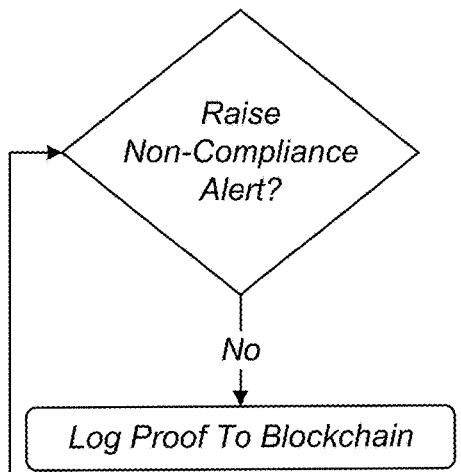

Referring to FIG. 6C, the illustrated system provides an exemplary embodiment of a compliance verification framework using zero-knowledge proof (ZKP) protocols to ensure that adaptive encoding transitions align with regulatory requirements. This figure emphasizes how ZKP techniques are integrated into the encoding workflow to deliver secure, auditable compliance without revealing sensitive encoding parameters or underlying data.

The process begins with an encoding engine executing one or more encoding operations based on real-time system conditions, including security requirements and regulatory mandates. These encoding operations are dynamically adjusted by an adaptive encoding policy engine, which may be influenced by compliance rules, energy optimization goals, or threat detection inputs. Each encoding transition is governed by an encoding policy that includes a traceable compliance signature and a set of state-specific criteria.

As encoding transitions are performed, the system logs policy application details, transformation metadata, and transition metrics into a compliance audit ledger. Instead of transmitting this data directly to auditors or external systems—which could reveal sensitive processing information—the system generates a zero-knowledge proof that attests to compliance with relevant encoding policies. The proof demonstrates, for example, that a required cryptographic encoding state was correctly applied in accordance with GDPR or HIPAA guidelines, without exposing the exact keys, entropy parameters, or raw data used in the process.

The ZKP generation module receives compliance statements and state transition summaries from the encoding policy engine and audit log. Using cryptographic primitives such as zk-SNARKs or zk-STARKs, the module creates a compact mathematical proof certifying that the encoding operation met the declared policy requirements. This proof is passed to a compliance verification layer, which serves as an independent validator.

The compliance verification layer verifies the integrity and correctness of the proof without access to the underlying data. Upon successful validation, the system may perform one or more of the following actions: update a tamper-proof audit trail, trigger an alert for failed proofs, or log the proof to a distributed ledger-based compliance ledger for regulatory oversight and future inspection.

To enable trust and traceability across distributed environments, the verified proof and associated metadata are submitted to a distributed compliance infrastructure. This infrastructure may include regulatory nodes, enterprise compliance servers, and internal audit systems, all of which consume verified ZKPs without requiring access to confidential data or source encoding logic.

This figure illustrates how the integration of zero-knowledge proofs into the encoding lifecycle enables decentralized compliance verification. By decoupling the act of verification from direct access to encoded content, the system supports secure, privacy-preserving auditing, even across federated or multi-tenant computing environments. This framework ensures strong regulatory alignment while minimizing the risk of data leakage and simplifying compliance validation across diverse deployment contexts.

Figure 6D:
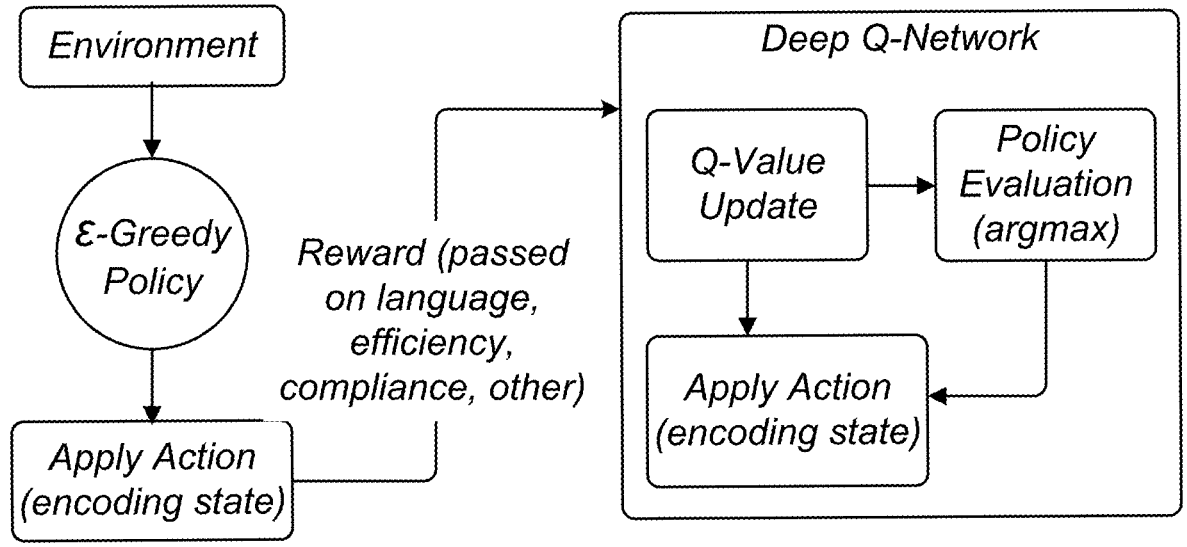
FIG. 6D illustrates one example of an reinforced learning (RL) encoding transition lifecycle model.

Referring to FIG. 6D, there is illustrated one example of a reinforced learning (RL) encoding transition lifecycle model. The system provides an exemplary embodiment of the encoding transition lifecycle within an adaptive multi-state encoding environment. This lifecycle incorporates real-time telemetry monitoring, reinforcement learning-based decision logic, and compliance-aware feedback to determine when and how encoding state transitions should occur. The figure outlines the operational stages that govern adaptive encoding behaviors, from initial system monitoring to final policy enforcement.

The process begins with continuous telemetry collection across the virtualized computing environment. Telemetry includes processing load, power consumption, thermal readings, network bandwidth, latency, and system-level security indicators. These metrics are captured by a system monitoring layer and streamed to a decision-making module responsible for analyzing conditions that may warrant a transition in the encoding state.

Incoming telemetry is first analyzed for threshold events, such as bandwidth congestion, elevated compliance risk, or energy inefficiency, that could signal the need for a more optimal encoding configuration. When a threshold is met, a transition signal is triggered, initiating the encoding decision cycle.

The core of this lifecycle is the encoding state decision engine, which incorporates a reinforcement learning model trained to optimize encoding transitions. The model evaluates potential state transitions (e.g., binary to ternary, or ternary to quaternary) using a reward function weighted by factors such as energy savings, latency improvement, and policy compliance. The reinforcement learning agent, implemented using a neural network or other adaptive AI architecture, receives system telemetry as input and outputs the recommended next encoding state.

Once a transition is selected, the encoding engine initiates the state change and logs the operation with metadata such as time, context, and transition type. This data is passed to a compliance feedback loop, which evaluates whether the new encoding state satisfies regulatory constraints in effect for the system's jurisdiction or application domain. If the compliance feedback indicates that the selected state does not meet policy requirements, a correction path is triggered, prompting a new decision cycle or a rollback to a previously validated encoding configuration.

After a successful encoding transition that meets both performance and compliance criteria, the system updates its state registry and prepares for the next telemetry evaluation interval. Reinforcement learning weights may also be updated at this stage based on transition outcomes, allowing the model to evolve its decision-making policy over time.

This lifecycle illustrates the intelligent control logic that governs encoding transitions in dynamic computing environments. By combining telemetry analysis, adaptive AI, and policy-based feedback, the system ensures that encoding behaviors remain responsive to performance constraints and aligned with evolving compliance mandates. This integration enables encoding operations to remain efficient, lawful, and resilient across heterogeneous and distributed infrastructure.

Figure 6E:
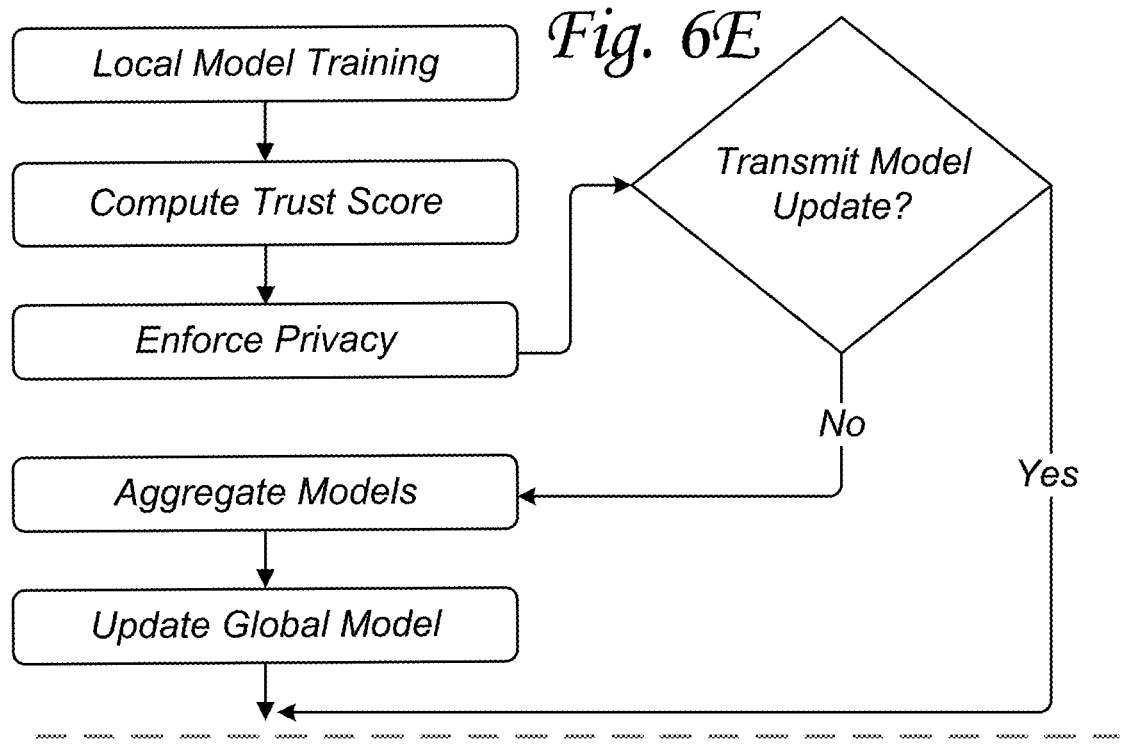
FIG. 6E illustrates one example of a federated learning update cycle.

Referring to FIG. 6E, there is illustrated one example of a federated learning update cycle. The system provides an exemplary embodiment of a federated learning update workflow used to optimize encoding state selection across distributed computing environments. This figure depicts how multiple client nodes contribute local learning insights, without sharing raw data, to collaboratively refine a global encoding model that supports adaptive, policy-aware encoding transitions throughout the system.

The federated update process also supports asynchronous node participation. Nodes may contribute updates on differing schedules without compromising the consistency of the aggregated global model. This design increases system robustness across heterogeneous or intermittently connected deployments.

The process begins with each participating client node locally monitoring its encoding performance, compliance results, and resource constraints. Each node runs its own instance of an encoding state selector, which may include a lightweight reinforcement learning agent that adapts encoding state transitions based on observed conditions such as bandwidth availability, power consumption, latency, or security events.

As local encoding decisions accumulate, the client nodes generate model updates in the form of learned weights, performance metrics, and trust-related metadata. Importantly, these updates are produced without exposing any raw data, preserving the privacy and regulatory compliance of each node's environment. The update package may also include node-specific trust scores, calculated using a weighted combination of metrics such as audit trail integrity, historical compliance adherence, incident history, and node uptime or responsiveness.

Each client node submits its update package to a federated learning coordinator. This coordinator acts as an aggregator of updates across the distributed environment. Upon receiving updates, the coordinator performs a compliance-weighted aggregation process. In this process, the influence of each update on the global model is scaled according to the submitting node's trust score and prior contribution reliability. Nodes with higher audit integrity, consistent compliance records, and stable behavior exert greater influence on the next generation of the model.

The aggregated global model is then retrained using reinforcement learning principles, with a reward function optimized for system-wide encoding performance, compliance rates, and latency reductions. This global model captures encoding behavior patterns that generalize across multiple infrastructures and operational conditions. Once retrained, the updated global model is redistributed to each participating node.

Each node receives the global model and integrates it into its local decision engine, allowing future encoding transitions to benefit from collective insights while still preserving node autonomy and data locality. The update cycle is periodically repeated, enabling the encoding system to continuously evolve based on live conditions and distributed learning contributions.

This figure highlights how federated learning enables decentralized encoding optimization across multi-tenant, hybrid, or edge environments. By securely combining local performance insights into a globally refined model, the system achieves scalable, adaptive encoding without compromising privacy or violating jurisdictional data regulations. The process ensures that encoding transitions remain aligned with real-world workloads and compliance demands across a federated infrastructure.

Figure 6F:
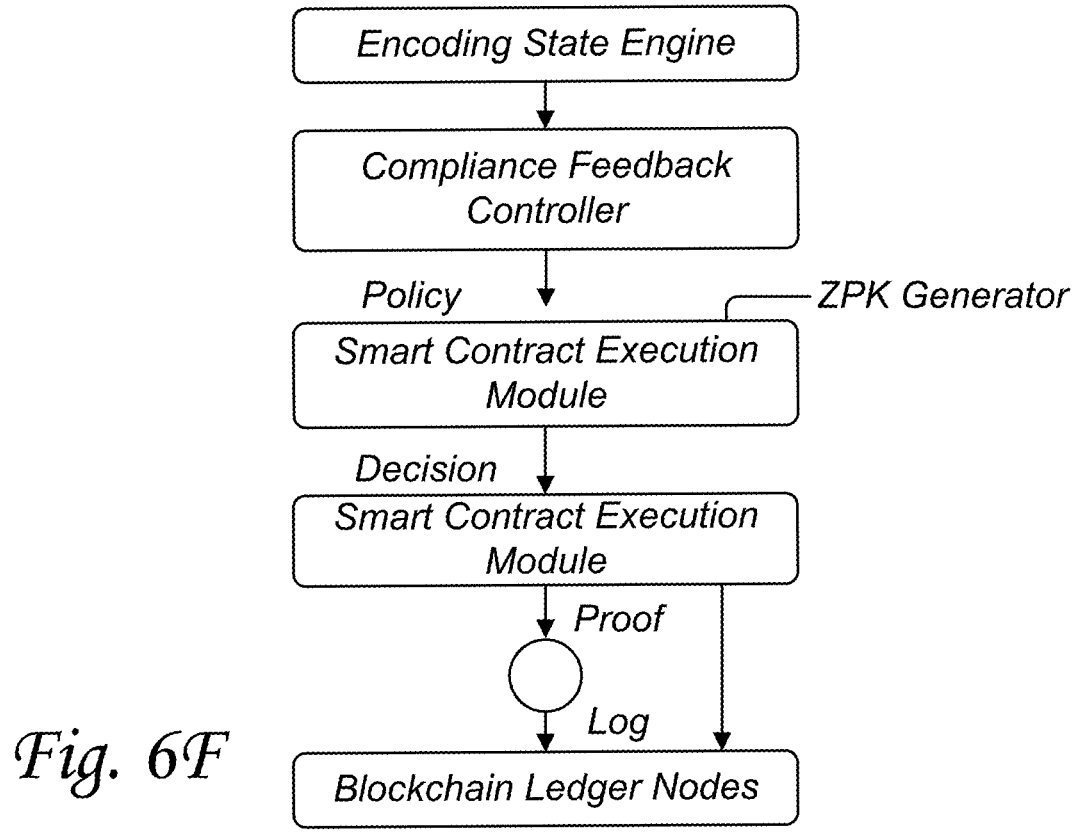
FIG. 6F illustrates one example of a smart contract+ZKP enforcement model.

FIG. 6F illustrates the compliance contract evaluation and its effect on reinforcement learning transitions, where failed validations reduce policy weights in the reward function. Referring to this figure, there is illustrated one example of a smart contract+ZKP enforcement model. The system presents an exemplary embodiment of a smart contract-enabled compliance verification process that incorporates zero-knowledge proof (ZKP) generation and distributed ledger-based audit logging. This figure demonstrates how encoding policy adherence is enforced and verified in a decentralized and tamper-resistant manner, supporting scalable regulatory compliance in distributed environments.

The process begins with the execution of an encoding operation governed by a predefined policy. This policy may define constraints on encoding state transitions, cryptographic parameters, or jurisdiction-specific regulatory requirements such as data protection rules under GDPR or HIPAA. As the encoding operation is performed, a compliance check is initiated to determine whether the operation conforms to the active policy framework.

A compliance evaluation module collects relevant encoding metadata, including the encoding state applied, entropy level, execution context, and policy identifier. Instead of disclosing this sensitive data directly, the system routes this information to a zero-knowledge proof generation module. Using cryptographic protocols such as zk-SNARKs or zk-STARKs, the module constructs a proof that certifies the encoding operation complied with the applicable policy, without revealing the specifics of the encoded data or internal execution variables.

The generated ZKP is then passed to a smart contract execution engine. The smart contract includes encoded logic that defines acceptable encoding configurations, approved compliance signatures, and enforcement rules. The smart contract independently verifies the ZKP by checking that the proof satisfies the policy conditions embedded within its logic. If the proof is valid, the contract executes its predefined action set, which may include recording the compliance event, triggering an alert, or authorizing further processing.

Once verified, the smart contract submits the compliance result and a cryptographic hash of the proof to a distributed ledger system. The distributed ledger ledger stores the compliance event in an immutable format, allowing internal security teams, external auditors, and regulatory agencies to review proof-of-compliance attestations without requiring access to the underlying encoded content. This decentralized ledger ensures integrity, transparency, and long-term auditability of encoding policy enforcement.

The compliance event, along with its associated metadata and verification status, is propagated across nodes participating in the distributed ledger network. These nodes may include cloud infrastructure operators, compliance oversight systems, or third-party certification authorities. Each node can independently verify the integrity of the recorded event, ensuring a shared, tamper-resistant compliance trail.

This figure illustrates how smart contracts, ZKPs, and distributed ledger technologies are integrated to form a verifiable compliance pipeline that is privacy-preserving, automated, and scalable. The result is a system that enforces encoding policies at runtime, validates adherence through cryptographic proof, and records outcomes in a decentralized manner, supporting robust compliance across cloud-native and federated computing infrastructures.

Referring to FIG. 7, there is illustrated a comparative analysis 108 of encoding efficiency, highlighting the performance of the MSVT compared to traditional encoding models. This figure provides a data-driven comparison between traditional binary encoding, static multi-level encoding, and MSVT's AI-driven adaptive encoding. The analysis focuses on key performance metrics, including latency reduction, processing efficiency, computational cost reduction, and energy savings.

In operation, the comparative analysis illustrates how MSVT's encoding engine significantly outperforms traditional models, offering a scalable and intelligent solution for dynamic encoding optimization. This further reinforces MSVT's advantages in high-security environments, AI-driven workloads, multi-tenant computing, power-sensitive applications, and performance-critical data transmission scenarios In an exemplary embodiment, the comparative table in FIG. 7 provides quantitative results showcasing the advantages of MSVT's AI-driven encoding process over legacy methods. Traditional binary encoding operates at a fixed encoding level, offering stability but lacking adaptability. Static multi-level encoding introduces higher-order encoding states (e.g., ternary, quaternary) but remains non-adaptive, leading to inefficiencies under dynamic workloads.

By contrast, MSVT's adaptive encoding system leverages AI-driven reinforcement learning to continuously optimize encoding states based on real-time system conditions. This enables MSVT to achieve:
  Up to 20% lower latency by dynamically adjusting encoding complexity in response to workload fluctuations;
  15% higher processing efficiency through AI-driven predictive encoding state selection;
  30% reduction in computational costs by minimizing unnecessary encoding transitions while maintaining security;
  Significant energy savings via adaptive power-aware encoding transitions, which optimize power consumption dynamically; and
  Other benefits.

Additionally, MSVT's feedback-driven learning model continuously monitors encoding efficiency, adapting to system conditions such as CPU utilization, memory availability, network bandwidth constraints, and security policies. Unlike static encoding models that require manual adjustments, MSVT autonomously reconfigures its encoding parameters, ensuring optimal performance across a variety of computing environments, including cloud infrastructures, edge computing systems, and high-performance computing (HPC) clusters.

Referring to FIG. 8, there is illustrated a comparative analysis 110 of artificial intelligence (AI) models used in the Multi-State Virtual Transformer (MSVT) system. The figure highlights the advantages of various AI-driven encoding optimization strategies and their role in dynamically managing encoding state selection, security adaptation, and computational efficiency.

In an exemplary embodiment, the AI models used within MSVT can be categorized based on their specific contributions to encoding efficiency, workload adaptability, and security enhancements:
Reinforcement Learning for Adaptive Encoding Selection
  The MSVT system employs reinforcement learning (RL) algorithms, such as Q-learning, Deep Q-Networks (DQN), and policy gradient methods, to refine encoding state transitions dynamically.
  These models analyze historical encoding performance logs, including latency profiles, power consumption, and security risks, to predict optimal encoding states in real time.
  Q-learning provides moderate encoding adaptability, low learning efficiency, and low computational complexity. It is effective for discrete state-action decision-making, optimizing transitions between binary, ternary, and quaternary encoding states.
  DQN extends Q-learning by utilizing deep neural networks for more complex encoding scenarios, offering high encoding adaptability, moderate learning efficiency, and moderate computational complexity. This allows for better generalization across workload variations.
  Policy gradient methods optimize encoding transitions in continuous decision spaces, making them suitable for adaptive, non-discrete encoding states. These methods provide high encoding adaptability, high learning efficiency, and high computational complexity, ensuring real-time encoding adjustments in complex computing environments.
AI-Driven Workload Adaptation for Encoding Optimization
  The MSVT system integrates adaptive AI decision models to evaluate system workload conditions and modify encoding states accordingly.
  These models predict workload spikes and transmission congestion, dynamically shifting encoding states to minimize processing overhead.
  AI-based predictive heuristics enhance efficiency by adjusting encoding redundancy and resource allocation within cloud-based environments.
Machine Learning for Predictive Encoding Failure Analysis
  The MSVT system incorporates machine learning-driven failure analysis to detect potential encoding inefficiencies before they impact performance.
  By leveraging anomaly detection algorithms, the system anticipates encoding failures and preemptively transitions to an optimal encoding state.
  Historical performance data is continuously fed into supervised learning models to fine-tune predictive encoding strategies.
AI-Driven Security Adaptation and Threat Intelligence
  MSVT utilizes AI-enhanced security layers to dynamically adjust encoding encryption levels in response to detected cybersecurity threats.

The system applies homomorphic encryption, lattice-based cryptography, and adaptive obfuscation techniques to secure encoded data against unauthorized access.

AI-powered threat detection models continuously analyze security risks and adjust encoding redundancy based on evolving cybersecurity conditions.

Federated Learning for Distributed Encoding Model Training

The MSVT system supports federated learning-based encoding models, allowing AI-driven encoding optimization across distributed cloud and edge computing environments.

Federated learning enables secure AI model training without exposing raw encoding data, ensuring data privacy compliance while optimizing encoding state decisions.

Referring to FIG. 9, there is illustrated a comparative analysis 112 of security enhancements in MSVT versus prior approaches. The figure highlights the advantages of MSVT's adaptive security framework over conventional encoding models, demonstrating its superior capabilities in encryption adaptability, threat response time, data integrity protection, and anomaly detection.

In operation, MSVT's security enhancements far surpass prior approaches by providing dynamic encryption adaptability, real-time threat mitigation, robust data integrity protection, and AI-driven anomaly detection. These improvements make MSVT a highly effective solution for compliance-critical environments, cloud security, financial transactions, and next-generation AI-driven security frameworks. In this regard:

Encryption Adaptability:

Prior approaches employ static encryption techniques, which lack the flexibility to adjust to evolving security threats. MSVT, by contrast, incorporates adaptive security mechanisms that dynamically modify encryption complexity based on real-time security assessments. This ensures that encryption strategies remain resilient against emerging attack vectors and computational advancements in cryptography.

Threat Response Time:

Traditional encoding models often exhibit slow response times to security threats due to their reliance on pre-configured policies and manual intervention. MSVT enhances security responsiveness through AI-driven threat intelligence and machine learning-based anomaly detection, enabling it to detect and respond to security breaches in real-time. This rapid adaptability significantly reduces the system's vulnerability to cyberattacks.

Data Integrity Protection:

Conventional methods provide limited data integrity safeguards, making encoded information susceptible to corruption, unauthorized modifications, or loss during transmission. MSVT leverages multi-layered encryption encoding techniques, including homomorphic encryption, lattice-based cryptography, and adaptive obfuscation methodologies, to ensure strong data integrity protection. These methods maintain data authenticity while supporting privacy-preserving computations.

Anomaly Detection:

Legacy systems typically feature basic anomaly detection mechanisms, often relying on predefined security rules that may not adequately identify sophisticated cyber threats. MSVT integrates AI-driven anomaly detection, utilizing real-time pattern recognition, threat modeling, and deep learning algorithms to proactively identify and mitigate risks before they impact encoding performance. This continuous monitoring framework enhances system resilience against evolving attack strategies.

Figure 10:
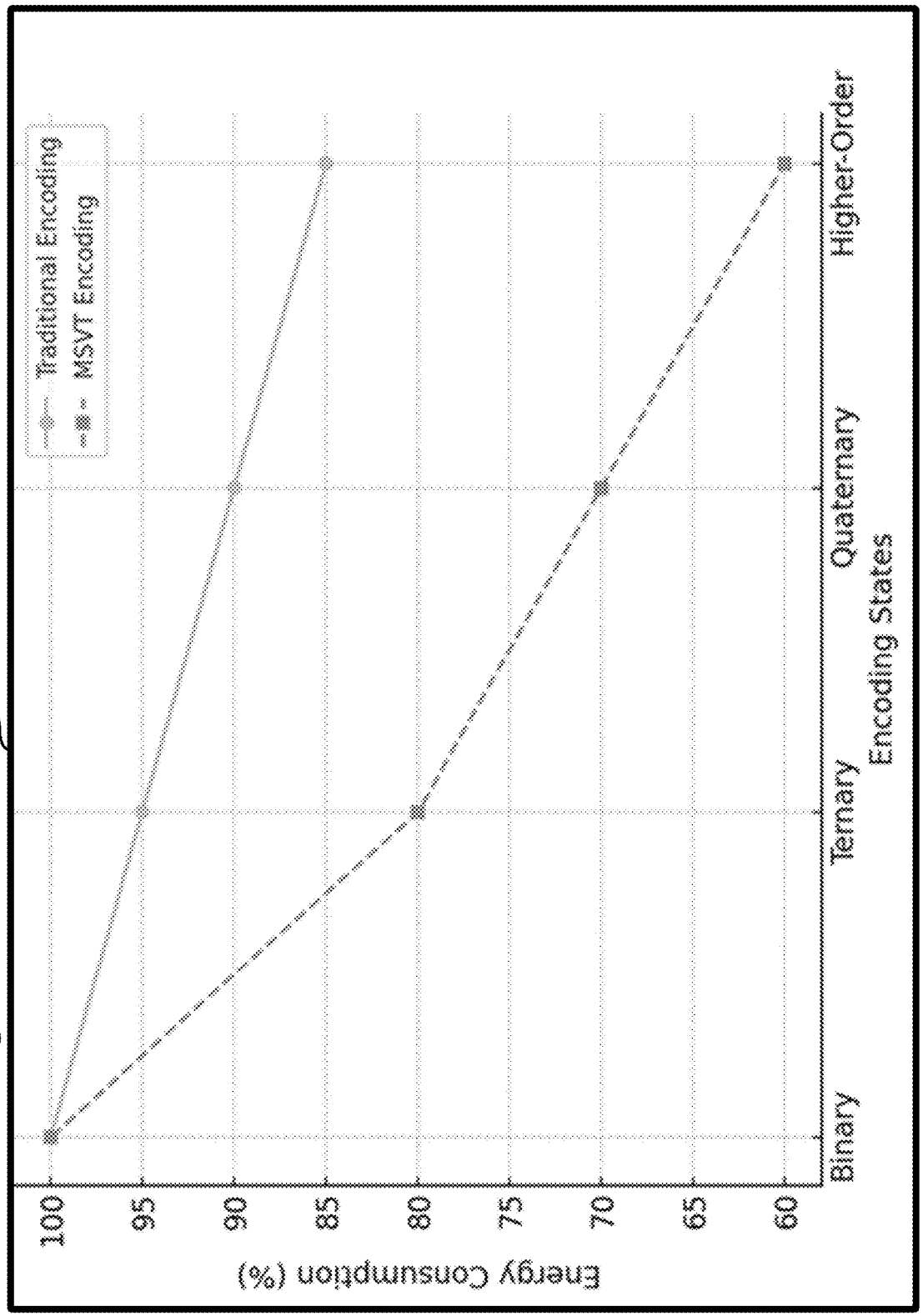
FIG. 10 illustrates one example of energy consumption reduction across encoding states, illustrating how MSVT optimizes energy efficiency.

Referring to FIG. 10, there is illustrated an exemplary graph depicting energy consumption reduction across encoding states, demonstrating how the Multi-State Virtual Transformer (MSVT) optimizes energy efficiency. The graph visually represents the energy savings realized through adaptive encoding state transitions, comparing MSVT to traditional encoding techniques.

In operation, the graph highlights the significant advantages of MSVT's adaptive encoding system, reducing energy consumption while maintaining encoding performance across dynamically configurable computing environments.

In an exemplary embodiment, the graph highlights the significant reduction in energy consumption as MSVT dynamically transitions between encoding states, including binary (2-state), ternary (3-state), quaternary (4-state), and higher-order encoding (5+ state). Unlike conventional encoding methods that rely on static configurations, MSVT continuously optimizes its encoding approach by leveraging AI-driven state selection, power-aware workload distribution, and entropy-based encoding techniques.

As illustrated, energy consumption is significantly lower in higher-order encoding states compared to static encoding models. This efficiency is achieved through adaptive power scaling, predictive load balancing, and resource-aware encoding adjustments. The MSVT system monitors system constraints, such as power availability, computational workload, and security policies, dynamically adjusting encoding complexity to reduce overall system power draw.

Key Energy Efficiency Enhancements Enabled by MSVT

Dynamic Encoding Transitions: Unlike traditional encoding, which maintains a fixed complexity level, MSVT selects optimal encoding states in real time, reducing unnecessary computational overhead.

Power-Conscious Adaptation: By predicting workload demands, MSVT proactively scales encoding intensity to balance performance with energy efficiency.

Hardware-Accelerated Encoding Efficiency: MSVT leverages virtualized FPGAs (vFPGAs), virtualized GPUs (vGPUs), and containerized TPUs (cTPUs) to execute energy-efficient encoding operations.

Feedback-Based Optimization: The MSVT feedback mechanism evaluates system power consumption to dynamically shift between encoding states, ensuring sustained energy savings.

AI-Driven Encoding Selection: Machine learning models analyze historical energy consumption patterns, continuously refining encoding strategies to minimize power draw.

Comparative Energy Savings

The graph in FIG. 10 further compares MSVT's energy consumption to prior encoding techniques, showcasing its superior power efficiency in high-performance computing, cloud-based AI workloads, and security-sensitive applications. The data illustrates that as MSVT transitions to higher-order encoding states, energy usage decreases, optimizing efficiency without compromising processing integrity.

Figure 11A:
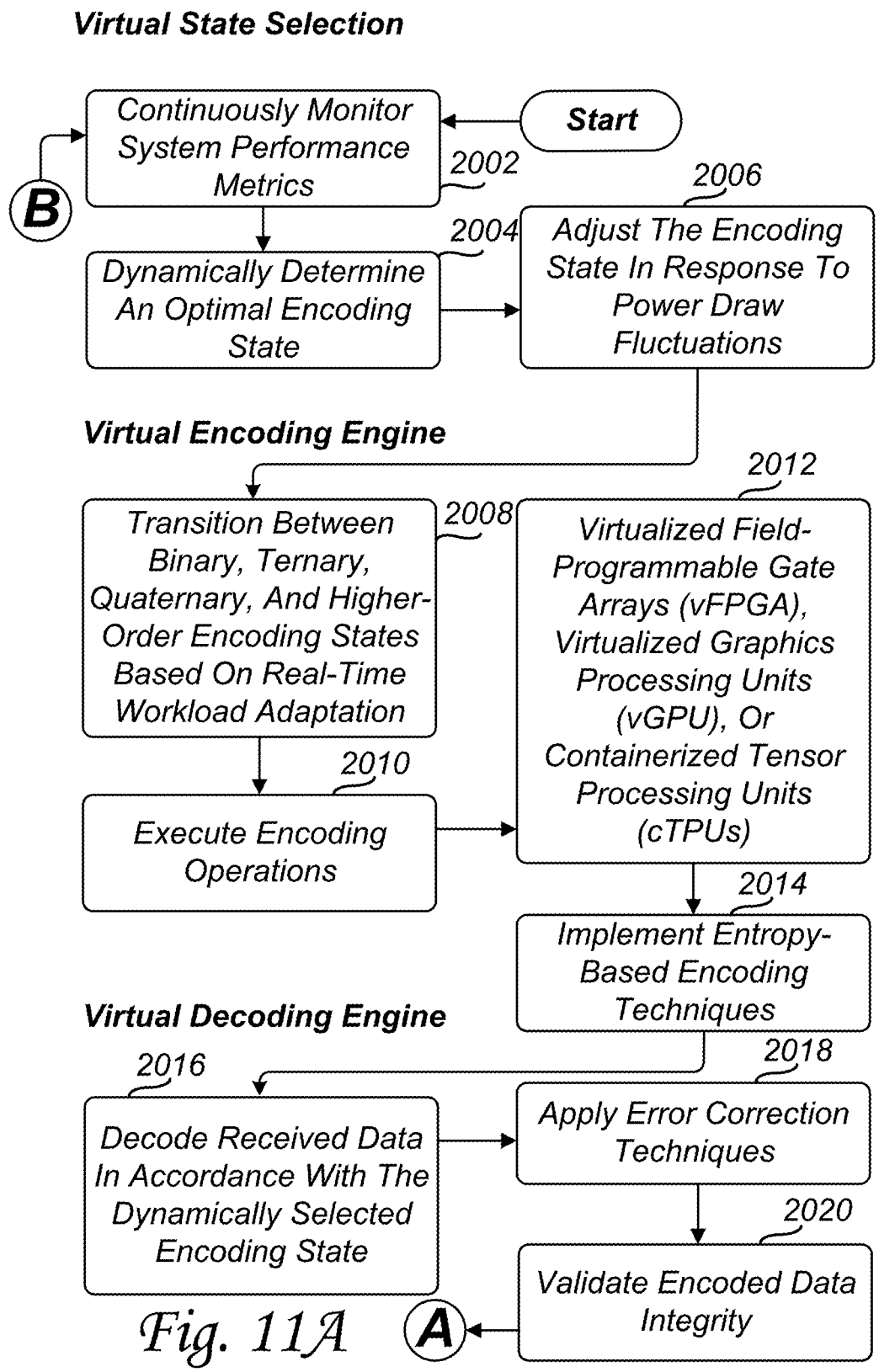

Referring to FIGS. 11A-11C, there is illustrated an exemplary embodiment of a system for adaptive multi-state encoding and processing in a virtualized computing environment, designed for virtual applications with hardware acceleration. The system dynamically transitions between encoding states based on workload variations, energy efficiency considerations, security policies, and compliance mandates.

In operation, the present invention illustrates a robust, adaptive multi-state encoding system optimized for virtualized environments, security-sensitive applications, and compliance-driven infrastructures.

Multi-State Encoding Process Flow

In an exemplary embodiment, the system follows a structured process flow, with each step ensuring optimal encoding efficiency.

In step 2002, a virtualized state selection module instantiated within virtual machines or containerized instances continuously monitors system performance metrics, including processing load, power consumption, thermal dissipation, network bandwidth, and security requirements. This continuous monitoring allows the system to maintain optimal resource allocation, preventing bottlenecks and ensuring computational efficiency. The method then moves to step 2004.

In step 2004, the virtualized state selection module dynamically determines an optimal encoding state from a set of encoding levels, including binary (2-state), ternary (3-state), quaternary (4-state), and higher-order encoding states. The selected encoding state is based on a weighted analysis of computational efficiency, security constraints, regulatory compliance, and energy optimization. Unlike prior static encoding methods, this approach allows for real-time adjustments, ensuring the best trade-off between performance and resource utilization. The method then moves to step 2006.

In step 2006, the system adjusts the encoding state in response to detected power draw fluctuations. This ensures that energy consumption and heat dissipation are modulated dynamically to improve hardware efficiency. Step 2008 facilitates seamless transitions between encoding states, ensuring the system dynamically shifts encoding complexity based on operational demands. This contrasts with conventional encoding systems, which lack adaptability and often overconsume resources. The method then moves to step 2010.

Encoding Operations and Performance Optimization

In step 2010, a virtual encoding engine, operatively coupled to the virtualized state selection module, transitions between binary, ternary, quaternary, and higher-order encoding states based on real-time workload adaptation, security policies, and compliance mandates. The method then moves to step 2012.

In step 2012, the virtual encoding engine executes encoding operations utilizing hardware-accelerated components, including virtualized field-programmable gate arrays (vFPGAs), virtualized graphics processing units (vGPUs), and containerized tensor processing units (cTPUs). This hardware-accelerated infrastructure optimizes computational throughput and reduces latency, making the system highly efficient in data-intensive applications. The method then moves to step 2014.

In step 2014, the virtual encoding engine implements entropy-based encoding techniques, dynamically increasing or decreasing encoding complexity based on real-time bandwidth availability, processing constraints, and cybersecurity risks. This feature enhances data compression efficiency, reducing overhead in networked environments, especially in multi-tenant virtualized systems. The method then moves to step 2016.

Decoding and Integrity Validation

In step 2016, a virtual decoding engine decodes received data in accordance with the dynamically selected encoding state. This ensures the accuracy of transmitted information and maintains data integrity across multi-state encoding transitions. The method then moves to step 2018.

In step 2018, the virtual decoding engine applies error correction techniques, signal integrity verification, and adaptive redundancy correction to reconstruct encoded information while minimizing data loss. Unlike conventional error correction methods that require manual recalibration, the system dynamically adjusts correction thresholds based on transmission conditions. The method then moves to step 2020.

In step 2020, the virtual decoding engine validates encoded data integrity using zero-knowledge proof-based verification. This ensures data authenticity without exposing the original content, which is especially advantageous for secure, encrypted communication frameworks. The method then moves to step 2022.

Feedback and Compliance Mechanisms

In step 2022, a compliance-driven feedback controller continuously evaluates real-time encoding efficiency, security risks, energy utilization, and regulatory compliance. The method then moves to step 2024.

In step 2024, the feedback controller adapts encoding state transitions based on detected performance fluctuations, security anomalies, or jurisdictional policy updates. This contrasts with conventional systems that require manual reconfiguration to align with security and compliance policies. The method then moves to step 2026.

In step 2026, the compliance-driven feedback controller ensures that encoding operations align with regulatory mandates such as GDPR, HIPAA, and FIPS 140-3 by dynamically modifying encoding policies. Unlike static encoding approaches, which may fall out of compliance as regulations evolve, the system proactively adapts. The method then moves to step 2028.

User Customization and Override Controls

In step 2028, a policy-driven override interface provides user-configurable encoding prioritization options, allowing administrators to select encoding parameters based on predefined operational requirements such as security enhancement, latency reduction, energy conservation, or compliance enforcement. This manual control mechanism ensures that organizations can customize encoding strategies based on their specific needs. The method then returns to step 2002.

Advantages Over Prior Approaches

The present invention overcomes key limitations of traditional encoding systems, including:

Static Encoding Limitations: Unlike conventional systems that operate on fixed encoding states, the present system dynamically adjusts encoding complexity based on real-time system feedback;

Inefficient Resource Utilization: By leveraging hardware acceleration and virtualized processing, the system reduces energy waste and improves computational efficiency;

Security Risks: Incorporating zero-knowledge proof-based verification, homomorphic encryption, and adaptive obfuscation, the system ensures secure encoding and transmission;

Regulatory Compliance Challenges: Unlike conventional systems that require manual policy enforcement, the present invention integrates AI-driven compliance monitoring and automated encoding adjustments; and Other advantages.

Referring to FIG. 11C, there is illustrated an exemplary method for using the system for adaptive multi-state encoding and processing in a virtualized computing environment. This method ensures real-time adaptation of encoding operations to optimize performance, energy efficiency, and compliance adherence.

In step 2030, the system monitors real-time processing load, network bandwidth, and power consumption. The virtualized state selection module continuously analyzes workload fluctuations and environmental factors, ensuring that encoding transitions align with resource availability and processing demands. The system applies AI-based predictive modeling to anticipate workload shifts and proactively optimize encoding strategies. The method then returns to step 2032.

In step 2032, the system transitions between encoding states based on real-time efficiency metrics and regulatory requirements. The system dynamically selects an encoding state from binary, ternary, quaternary, or higher-order encoding levels, adjusting in response to compliance mandates such as GDPR, HIPAA, or FIPS 140-3. The decision process incorporates anomaly detection algorithms, cybersecurity threat assessments, and system performance analytics, ensuring seamless and automated compliance enforcement. Unlike static encoding models, which require manual adjustments, this approach enables adaptive transitions that minimize security risks and performance overhead. The method then returns to step 2034.

In step 2034, the system reallocates processing resources to optimize power draw and throughput. AI-driven workload redistribution algorithms dynamically assign computational tasks to virtualized encoding engines (vFPGAs, vGPUs, cTPUs), ensuring efficient power utilization and minimal latency overhead. This dynamic resource optimization contrasts with conventional fixed-resource allocation methods, which often lead to inefficiencies and excessive power use. Additionally, predictive load balancing mechanisms ensure continuous optimization across cloud and edge computing environments.

Figure 12A:
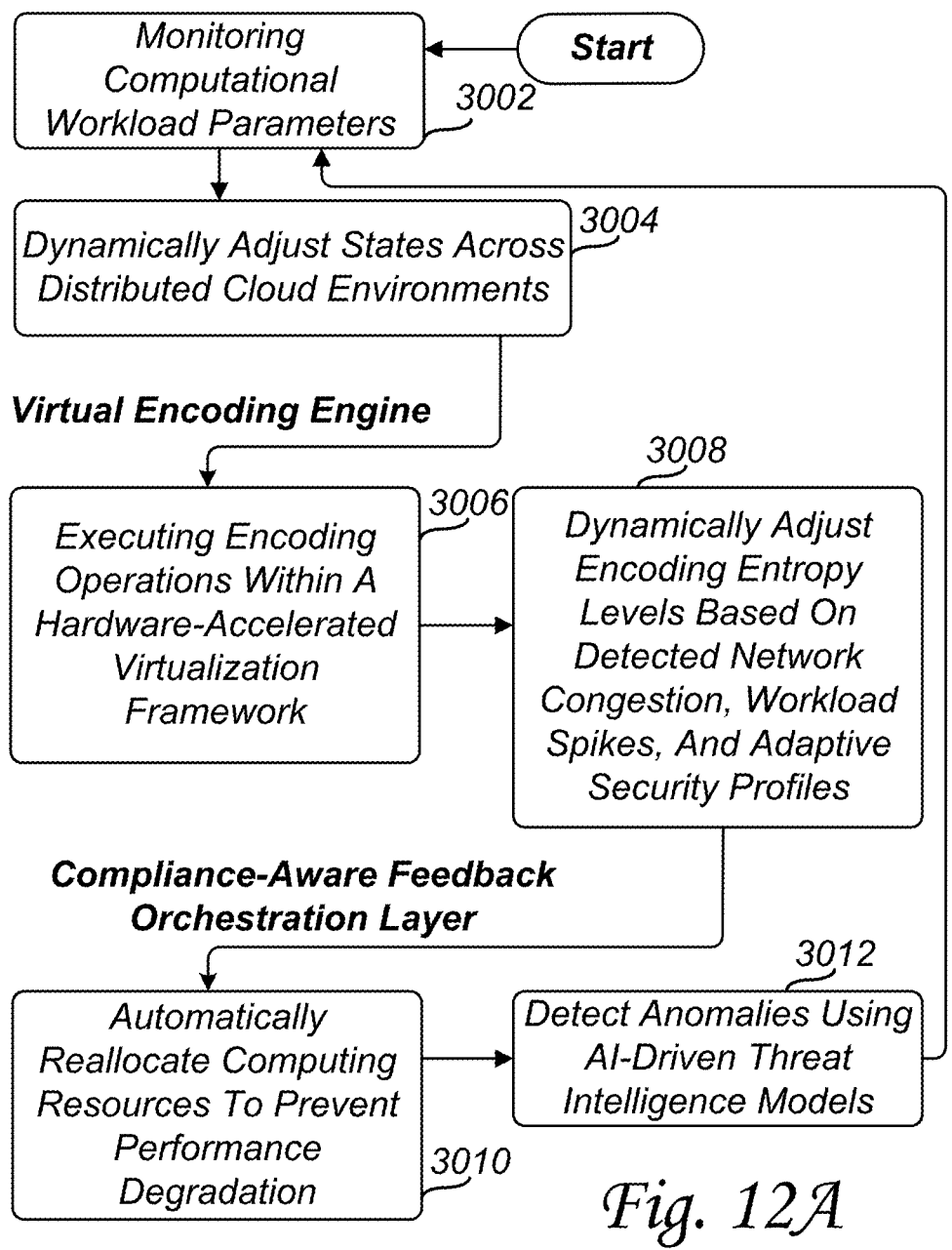
FIGS. 12A-12B illustrate examples of a system for adaptive multi-state encoding and processing in a virtualized computing environment with hardware acceleration, for virtual applications.

Referring to FIG. 12A, there is illustrated an exemplary embodiment of a system for adaptive multi-state encoding and processing in a virtualized computing environment with hardware acceleration. The system is configured to dynamically optimize encoding processes by leveraging hardware-accelerated virtualization, AI-driven predictive analytics, and multi-layered compliance-aware encoding transitions.

In operation, the present invention can be configured as a robust AI-driven method for adaptive multi-state encoding within a virtualized computing environment with hardware acceleration. The system leverages vFPGAs, vGPUs, and cTPUs to enhance computational efficiency, applies AI-driven predictive analytics to optimize encoding state selection, and ensures compliance-aware encoding transitions to maintain regulatory adherence.

By contrasting with prior static encoding frameworks, this invention demonstrates a significant advancement in encoding adaptability, security enforcement, and virtualization efficiency, making it ideal for distributed cloud environments, high-performance computing, and secure data processing applications. The method begins in step 3002.

Computational Monitoring and AI-Driven Encoding State Selection

In step 3002, a virtualized state selection module instantiated within virtual machines or containerized instances monitors computational workload, memory utilization, power allocation, security policies, and encoding latency metrics. Unlike traditional encoding models that rely on static configurations, this system continuously collects and analyzes resource consumption across distributed virtualized environments.

The monitoring process leverages hardware telemetry data to dynamically assess system constraints. For instance, if an increased workload is detected, the system proactively shifts encoding complexity to optimize processing efficiency while balancing security mandates. Legacy encoding methods often fail to account for dynamic variations in workload and security threats, leading to inefficient resource allocation and potential encoding bottlenecks. The method then moves to step 3004.

AI-Powered Encoding State Adaptation Across Distributed Cloud Environments

In step 3004, the virtualized state selection module dynamically adjusts encoding states across distributed cloud environments using AI-driven predictive analytics to optimize performance and minimize processing impact. The AI-based model continuously evaluates computational patterns and preemptively transitions encoding states before resource saturation occurs.

Unlike conventional cloud-based encoding systems, which apply rigid state transitions based solely on fixed thresholds, this system predicts future encoding requirements based on historical workload data. For example, if the system identifies a pattern of encoding inefficiencies during peak workload hours, it can proactively adjust encoding complexity before performance degradation occurs. This results in an optimized encoding strategy that dynamically balances latency, energy consumption, and security compliance. The method then moves to step 3006.

Hardware-Accelerated Encoding Operations

In step 3006, a virtual encoding engine, instantiated within a distributed cloud computing environment, executes encoding operations within a hardware-accelerated virtualization framework. The encoding process leverages virtualized field-programmable gate arrays (vFPGAs), virtualized graphics processing units (vGPUs), or containerized tensor processing units (cTPUs) to optimize computational efficiency.

Prior approaches to encoding within virtualized environments relied on CPU-bound operations, which resulted in significant processing overhead and latency inefficiencies. The integration of vFPGAs, vGPUs, and cTPUs offloads computational burden from CPU cores, leading to a dramatic increase in encoding throughput while reducing energy consumption.

For example, in a cloud-hosted video streaming application, the system dynamically allocates vGPU resources to offload intensive encoding tasks, ensuring that latency remains minimal. In edge computing environments, cTPUs provide low-power AI-driven encoding acceleration, reducing the need for centralized cloud processing. The method then moves to step 3008.

Entropy-Based Encoding Adaptation for Optimized Network Performance

In step 3008, the virtual encoding engine dynamically adjusts encoding entropy levels based on detected network congestion, workload spikes, and adaptive security profiles. The system continuously monitors network bandwidth availability and adjusts encoding complexity accordingly.

In traditional encoding models, network congestion often leads to packet loss and data degradation. However, this system mitigates such issues by dynamically scaling encoding complexity. For instance, if the system detects a bandwidth-constrained environment, it can automatically reduce encoding entropy to maintain a steady transmission rate while ensuring data integrity.

Conversely, in high-bandwidth environments, the system increases encoding entropy, enhancing data compression efficiency without compromising security policies. This adaptive entropy adjustment mechanism ensures optimal encoding efficiency across dynamically changing network conditions. The method then moves to step 3010.

Compliance-Aware Feedback and Adaptive Resource Allocation

In step 3010, a compliance-aware feedback orchestration layer automatically reallocates computing resources to prevent performance degradation and minimize virtualization overhead. The system incorporates regulatory compliance monitoring, dynamically adjusting encoding policies in response to jurisdictional mandates such as GDPR, HIPAA, and FIPS 140-3.

Traditional encoding frameworks often fail to address regulatory constraints in real-time, requiring manual intervention to ensure compliance. This system, however, integrates real-time compliance monitoring, ensuring that encoding processes align with evolving security and privacy regulations.

For instance, if the system detects new compliance requirements for encrypted data transmission, it can automatically transition to a higher-security encoding state, applying homomorphic encryption or lattice-based cryptographic techniques to ensure regulatory adherence. The method then moves to step 3012.

AI-Driven Threat Intelligence for Anomaly Detection and Security Optimization

In step 3012, the compliance-aware feedback orchestration layer detects anomalous latency spikes, inefficient encoding transitions, and security vulnerabilities using AI-driven threat intelligence models.

Unlike conventional anomaly detection systems, which operate reactively, this system employs predictive threat intelligence to anticipate encoding inefficiencies before they impact system performance. If an unexpected latency surge is detected, the AI-driven monitoring framework identifies potential causes, such as malicious encoding manipulations, unauthorized access attempts, or resource exhaustion attacks.

By integrating machine learning-driven security analysis, the system ensures that encoding operations remain resilient against cyber threats, while simultaneously maintaining high-performance encoding throughput. The method then returns to step 3002.

Figure 12B:
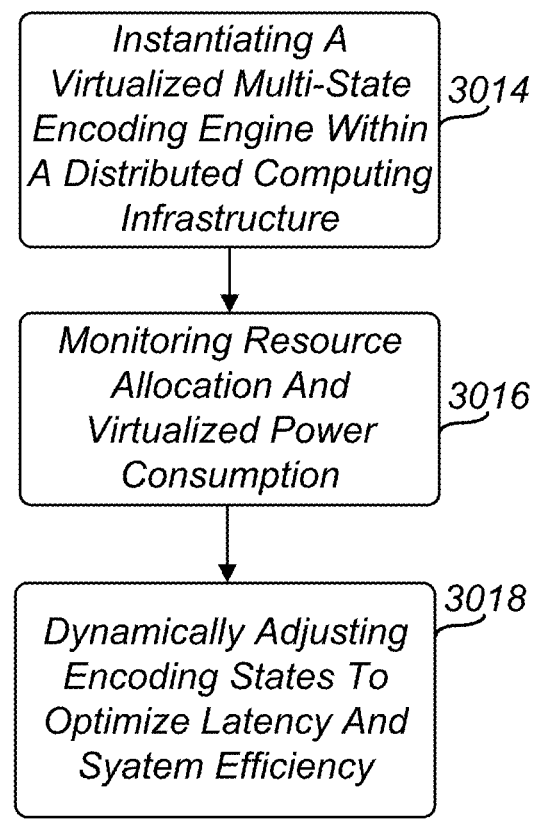

Referring to FIG. 12B, there is illustrated an exemplary method for using the system for adaptive multi-state encoding and processing in a virtualized computing environment with hardware acceleration. This method optimizes encoding performance, reduces latency, and dynamically adapts to workload variations in distributed computing environments.

In operation, the present invention can be configured to use the method, ensuring real-time encoding optimization, regulatory compliance, and high-efficiency data processing. By combining distributed AI-driven encoding state transitions with real-time workload adaptation, this method represents a significant advancement over traditional encoding frameworks, delivering superior computational efficiency, reduced power consumption, and enhanced security compliance. The method begins in step 3014.

In step 3014, the system instantiates a virtualized multi-state encoding engine within a distributed computing infrastructure. The instantiation process involves deploying a containerized or virtualized encoding instance within a cloud-based or hybrid computing environment. The encoding engine can be instantiated within virtual machines, containerized environments, or bare-metal cloud servers, depending on resource allocation and latency requirements. Unlike conventional encoding models that require fixed, pre-configured hardware setups, this method allows for on-demand instantiation of encoding services, reducing deployment overhead while maximizing computational flexibility. The method then moves to step 3016.

In step 3016, the system monitors resource allocation and virtualized power consumption. The virtualized state selection module continuously tracks real-time computational workload, power draw, memory allocation, and network utilization to ensure that encoding transitions do not create unnecessary processing overhead. Traditional encoding frameworks often fail to dynamically monitor and adjust based on real-time system constraints, leading to inefficient power consumption and processing bottlenecks. By contrast, this method provides a proactive, self-optimizing approach, dynamically reallocating resources based on AI-driven predictive analytics. The method then moves to step 3018.

In step 3018, the system dynamically adjusts encoding states to optimize latency and system efficiency. The virtual encoding engine transitions between binary, ternary, quaternary, and higher-order encoding states based on network congestion, workload spikes, security mandates, and compliance policies. Unlike prior approaches that rely on static encoding levels, this system employs machine learning-driven decision-making to optimize state selection dynamically. Latency-sensitive applications, such as real-time financial transactions, AI inference, and high-performance computing workloads, benefit from this adaptive encoding strategy, as it ensures minimal delay and maximum data integrity.

This dynamic adaptation contrasts with fixed-state encoding architectures, which often suffer from unnecessary computational redundancy. The AI-driven feedback orchestration layer ensures that encoding transitions align with hardware acceleration features, such as virtualized field-programmable gate arrays (vFPGAs), virtualized graphics processing units (vGPUs), and containerized tensor processing units (cTPUs).

Figure 13A:
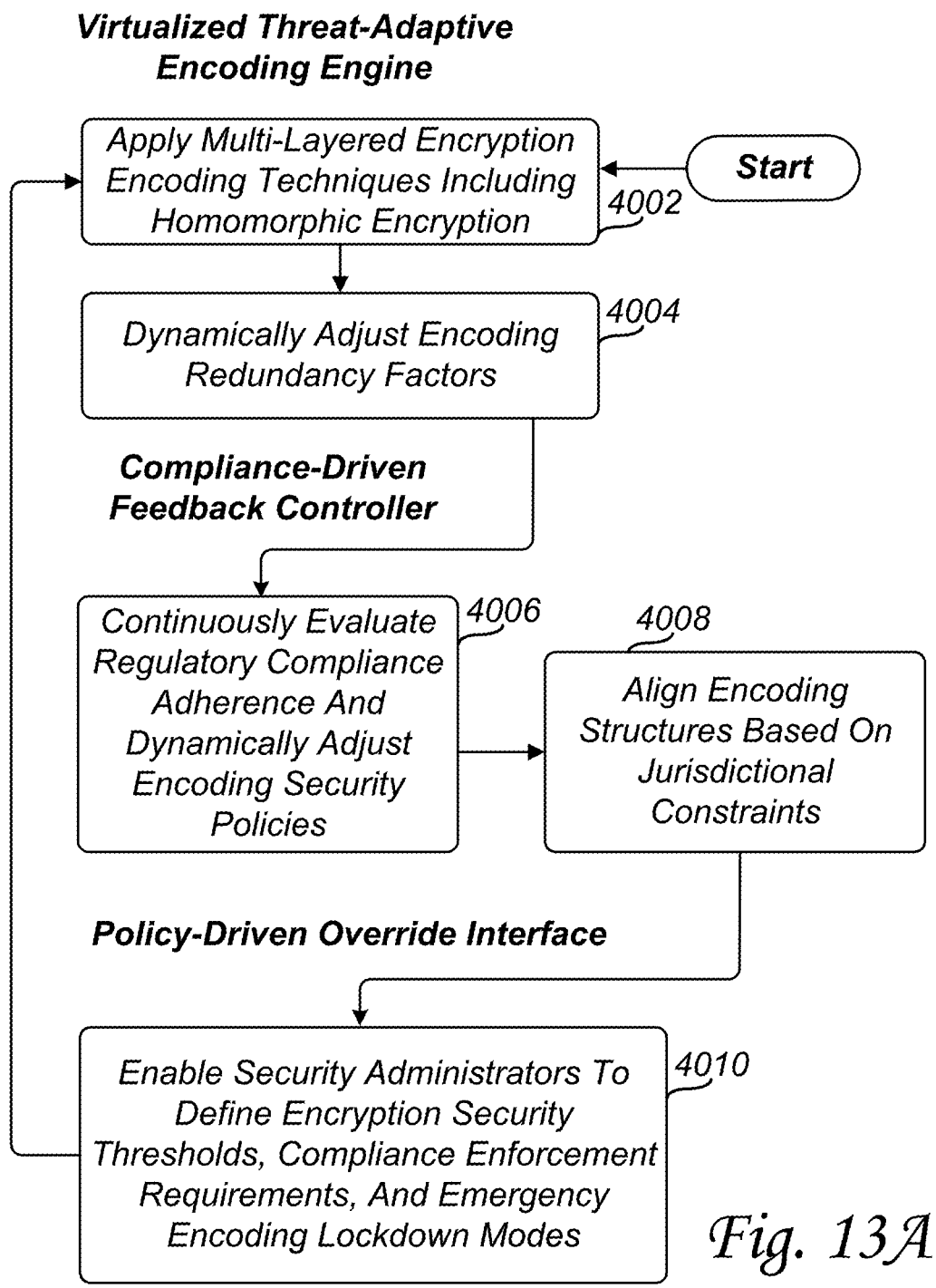

Referring to FIG. 13A, there is illustrated an exemplary embodiment of a system for adaptive multi-state encoding and processing in a virtualized computing environment for virtual security applications. This system introduces a virtualized threat-adaptive encoding engine, specifically designed to enhance data security, regulatory compliance, and encryption efficiency in dynamically configurable computing environments.

In this configuration, the present invention represents a significant improvement over traditional security frameworks, which often:

Fail to adjust encryption dynamically, leaving systems vulnerable to evolving attack strategies;

Lack AI-driven threat intelligence, requiring manual security assessments;

Are not quantum-resistant, meaning they will become obsolete once quantum decryption algorithms mature; and Do not integrate regulatory compliance monitoring, increasing the risk of non-compliant data processing.

By automating compliance adherence, enhancing encryption adaptability, and introducing real-time security policy enforcement, the present invention in this configuration establishes a next-generation security framework capable of proactively defending against cyber threats while optimizing encryption performance in virtualized computing environments. The method begins in step 4002.

Multi-Layered Encryption Encoding Techniques

In step 4002, the virtualized threat-adaptive encoding engine applies multi-layered encryption encoding techniques, including homomorphic encryption, lattice-based cryptography, and adaptive obfuscation methodologies. Unlike conventional security models that rely on static encryption algorithms, this system dynamically adjusts encryption layers to mitigate unauthorized access and enhance resistance against emerging cryptographic threats.

- Homomorphic encryption ensures that computations on encrypted data can occur without requiring decryption, preserving data privacy during processing;
- Lattice-based cryptography introduces quantum-resistant encryption, providing enhanced security against future quantum computing-based attacks;
- Adaptive obfuscation methodologies intelligently disguise encoding operations to minimize attack vectors, reducing the risk of data injection attacks, man-in-the-middle exploits, and traffic analysis vulnerabilities; and
- Other cryptographic threats.

The method then moves to step 4004.

Dynamic Encoding Redundancy for Security

In step 4004, the virtualized threat-adaptive encoding engine dynamically adjusts encoding redundancy factors to improve data survivability in environments prone to data injection attacks or packet manipulation.

Whereas traditional encoding redundancy models apply fixed error correction techniques, which are ineffective against advanced cyber threats. In contrast, the present invention modifies redundancy levels dynamically, applying additional error-correcting codes (ECCs), forward error correction (FEC), and anomaly-based redundancy augmentations based on detected network instability, unauthorized modifications, or packet loss patterns.

By incorporating AI-driven security intelligence, the system proactively identifies attack attempts and dynamically fortifies encoded data, making tampering detection and correction highly efficient. The method then moves to step 4006.

Regulatory Compliance and Encoding Security Policies

In step 4006, a compliance-driven feedback controller continuously evaluates regulatory compliance adherence and dynamically adjusts encoding security policies.

Whereas traditional encoding solutions require manual intervention for compliance updates, leading to potential latency issues and non-compliance risks. In contrast, the present invention automatically aligns encoding processes with regulatory mandates, such as GDPR, HIPAA, and FIPS 140-3, by leveraging real-time compliance monitoring and adaptive policy enforcement. The method then moves to step 4008.

In step 4008, the system further aligns encoding structures with these security mandates by adapting encoding states based on jurisdictional constraints. This ensures that encoding processes remain in full compliance with evolving data protection laws without requiring manual policy reconfiguration. The method then moves to step 4010.

Policy-Driven Override for Emergency Security Controls

In step 4010, a policy-driven override interface enables security administrators to define encryption security thresholds, compliance enforcement requirements, and emergency encoding lockdown modes in response to cybersecurity events.

Whereas in traditional security implementations, administrators must manually adjust security policies in response to new threats, leading to delayed reaction times and increased attack vulnerability. In contrast, the policy-driven override interface of the present invention allows administrators to predefine encryption response mechanisms, ensuring that real-time security policy updates can be instantly deployed during active cyber threats.

For example and not a limitation:
- If anomalous behavior is detected, the system can automatically trigger heightened encryption states or
- If a widespread attack is ongoing, emergency lockdown modes can be activated, halting all non-secure data transactions until threats are mitigated.

Referring to FIG. 13B, there is illustrated an exemplary method for using the system for adaptive multi-state encoding and processing in a virtualized computing environment, specifically for virtual security applications. This method dynamically adjusts encoding states in response to evolving cybersecurity threats and compliance mandates, ensuring robust protection of sensitive data.

In operation, the present invention, in this configuration, illustrates an advanced, AI-driven method for security-aware encoding selection and transition, ensuring superior encryption resilience in virtualized computing environments. The method begins in step 4012.

In step 4012, the system selects an encoding state based on detected cyber threats and regulatory compliance mandates. A security-aware encoding module continuously assesses network security conditions, real-time threat intelligence feeds, and encryption policy mandates. The system evaluates cybersecurity risk factors, including potential data breaches, anomalous traffic patterns, and malicious intrusion attempts. Unlike traditional encryption methods, which apply a fixed security level regardless of evolving threats, this system dynamically modifies encoding complexity based on real-time security intelligence. Encoding transitions incorporate entropy augmentation techniques, increasing resistance to cryptographic attacks.

For example, in response to a high-risk threat environment, the system may automatically elevate its encryption to lattice-based cryptography or homomorphic encryption, ensuring that data remains protected even under quantum computing threats. Conversely, in a low-risk operational mode, the system may apply efficient encoding strategies to optimize processing speed without compromising security. The method then moves to step 4014.

In step 4014, the system transitions between encoding states dynamically to harden encryption against unauthorized interception. Unlike static encryption models that remain vulnerable to emerging cyber threats, this system leverages AI-driven threat intelligence models to predict, detect, and mitigate security risks proactively. The virtualized threat-adaptive encoding engine assesses incoming network packets, user access patterns, and real-time attack vectors, dynamically adjusting encryption redundancy factors to enhance data survivability in environments prone to data injection attacks or packet manipulation.

For instance, if the system detects a man-in-the-middle attack attempt, it can instantly escalate to a multi-layered encryption framework, integrating homomorphic encryption and adaptive obfuscation methodologies to prevent unauthorized decryption. Additionally, if security logs indicate unusual spikes in failed authentication attempts, the system can activate emergency encoding lockdown modes, ensuring data is inaccessible to unauthorized users.

This security-hardening mechanism is further enhanced by compliance-driven feedback integration, aligning encoding state transitions with regulatory standards such as GDPR, HIPAA, and FIPS 140-3. Compliance policies dictate the permissible encryption levels for various jurisdictions, ensuring that adaptive encoding meets both security and legal requirements.

By continuously analyzing cybersecurity risks and regulatory mandates, this method ensures real-time encryption adaptation, significantly reducing the risk of data breaches while maintaining optimal system performance.

Figure 14B:
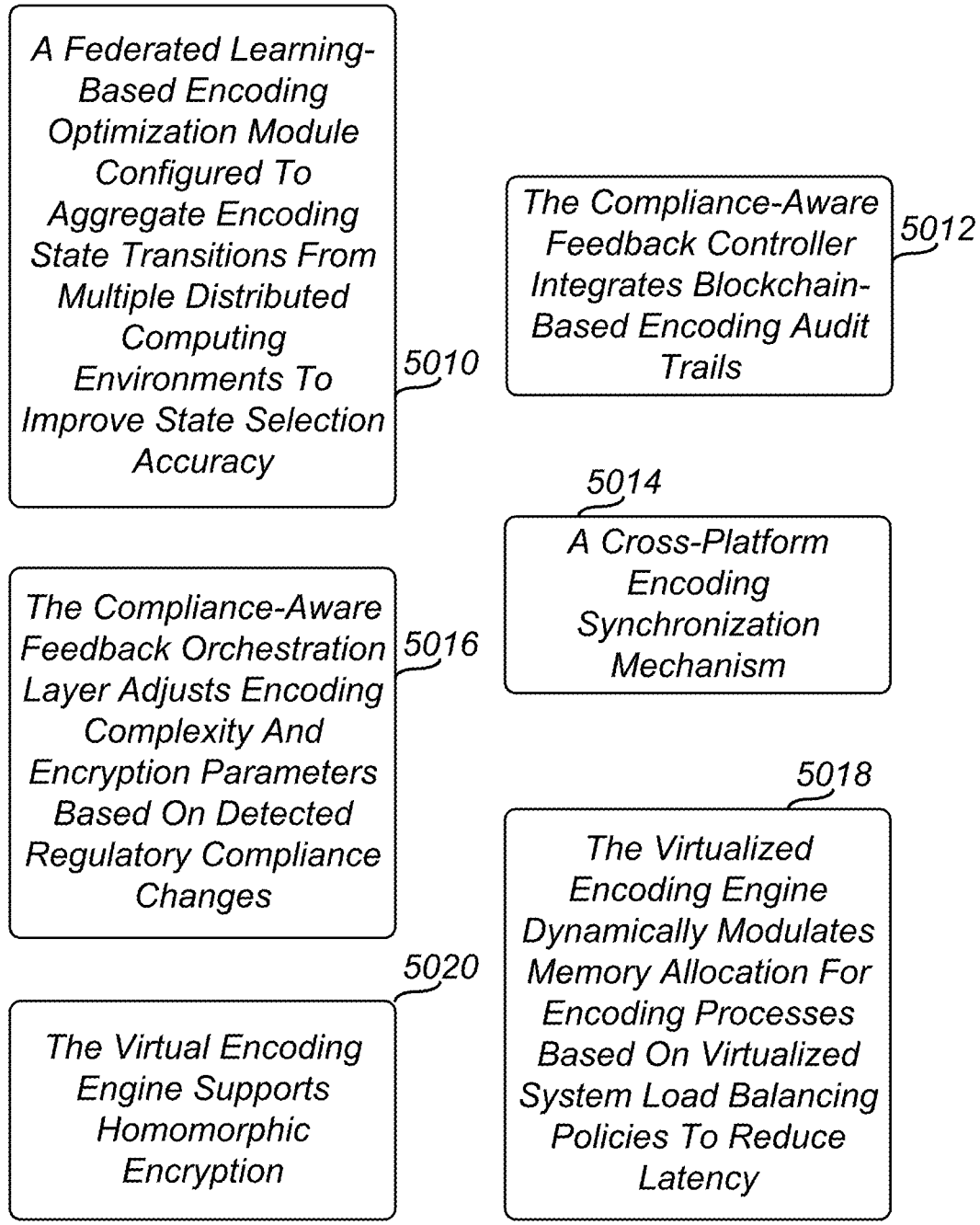
Figure 14C:
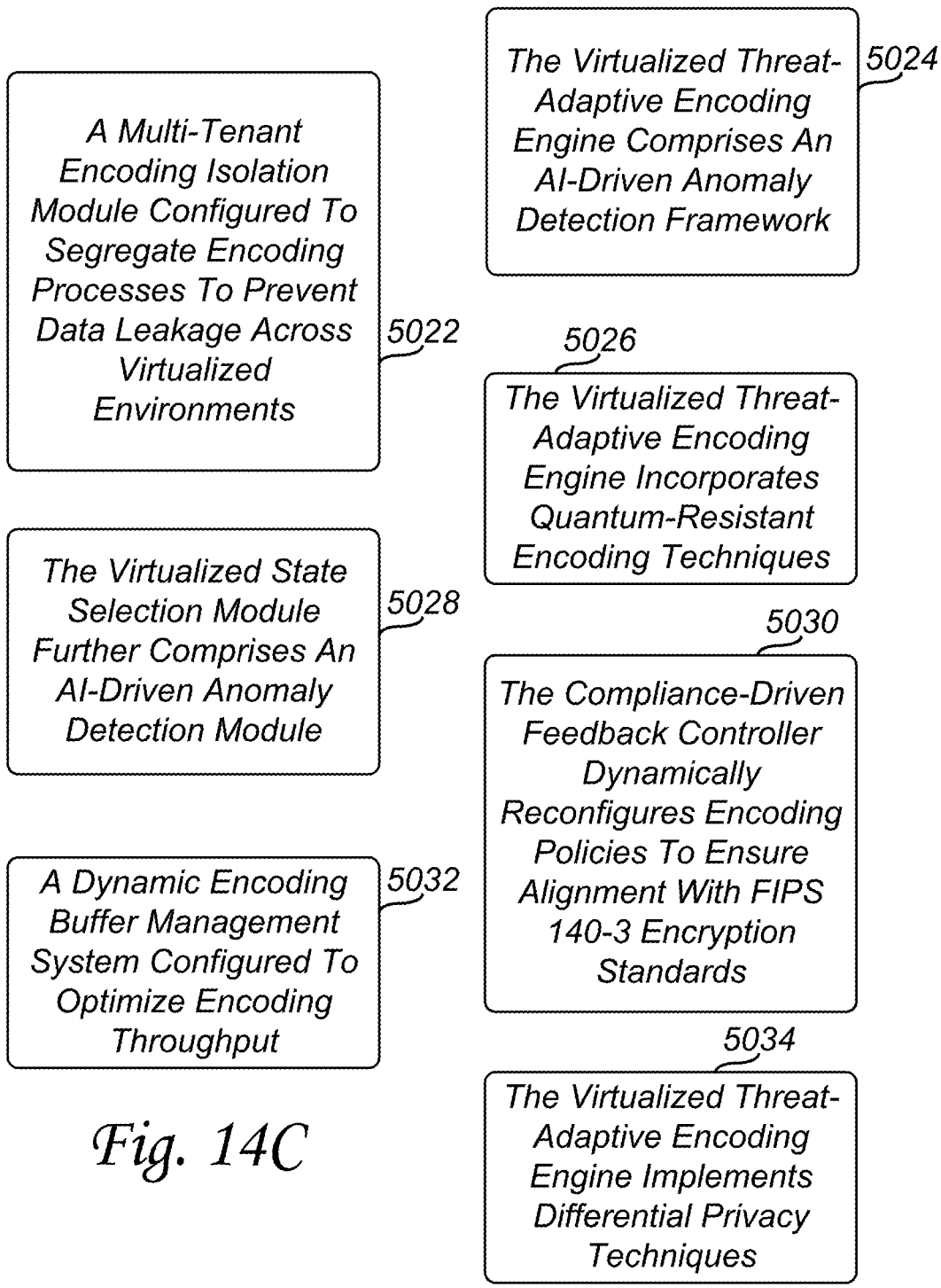

Referring to FIGS. 14A-14C, there are illustrated exemplary embodiments that can be interchangeably used with the methods of the present invention.

In step 5002, the virtualized state selection module utilizes reinforcement learning to predict encoding state transitions while minimizing processing overhead. This approach allows the system to dynamically adjust encoding states in response to real-time workload fluctuations, optimizing efficiency while reducing computational latency.

Unlike traditional static encoding systems, the reinforcement learning model, of the present invention, within the module continuously refines its encoding transition strategy based on historical data and real-time performance metrics. The model is trained using datasets that include encoding performance logs, latency profiles, energy consumption data, and security risk assessments under varying workload conditions.

It leverages reinforcement learning techniques such as Q-learning, Deep Q-Networks (DQN), and Policy Gradient Methods to optimize encoding transitions. These techniques allow the system to operate in either a pre-trained model mode, which provides immediate low-latency encoding adaptation, or a continuous online learning mode, which adapts dynamically to real-time workload variations.

The reinforcement learning model predicts when an encoding transition is necessary before performance degradation occurs, preventing inefficiencies caused by workload spikes or resource constraints. By selecting an encoding state based on workload intensity, security risk, and computational efficiency, the system minimizes unnecessary processing overhead, ensuring an optimal balance between power efficiency and encoding complexity.

Prior approaches relied on predefined encoding transitions, which could lead to inefficiencies in fluctuating workloads. Traditional AI-based encoding selection methods lacked self-learning mechanisms, requiring manual adjustments that increased computational cost. In contrast, MSVT's reinforcement learning model proactively adjusts encoding transitions before bottlenecks occur, reducing latency, energy consumption, and unnecessary reprocessing overhead.

This ensures that the virtualized state selection module intelligently predicts encoding transitions, enhancing encoding efficiency, reducing system load, and maintaining real-time optimization across virtualized computing environments.

In step 5004, the virtual encoding engine dynamically selects an optimal encoding state based on thermal dissipation metrics and real-time voltage scaling to reduce energy consumption. This functionality allows the system to balance encoding efficiency while minimizing thermal footprint, ensuring stable operations across various workload intensities.

Unlike conventional encoding systems that operate without considering power efficiency, this system, of the present invention, continuously monitors thermal variations and voltage fluctuations in real time. By incorporating thermal-aware encoding state selection, the system prevents overheating and reduces excess energy expenditure.

The virtual encoding engine evaluates heat dissipation across different processing components, including virtualized FPGAs (vFPGAs), virtualized GPUs (vGPUs), and containerized TPUs (cTPUs). By analyzing this thermal profile, the system adjusts encoding complexity dynamically, ensuring optimal computational throughput without exceeding safe operating temperatures.

Additionally, real-time voltage scaling enables the system to adjust power draw by modulating encoding state intensity. When workloads decrease, the system automatically downscales encoding complexity, reducing power consumption. Conversely, when computational demands increase, the system intelligently ramps up encoding complexity while maintaining energy efficiency, ensuring high-performance operation without overloading system resources.

This approach contrasts with traditional encoding methods that operate at fixed power levels, leading to excessive heat generation and inefficient energy use. By integrating AI-driven thermal management and adaptive voltage scaling, the virtual encoding engine optimizes power efficiency, prolongs hardware lifespan, and reduces operational costs in cloud and edge computing environments.

Accordingly, the combination of thermal-aware encoding adjustments and real-time voltage scaling ensures that the virtual encoding engine dynamically maintains an optimal balance between performance, energy consumption, and system longevity.

In step 5006, the compliance-aware feedback controller triggers automated workload redistribution across multiple processing nodes when encoding inefficiencies or excessive latency are detected. This capability ensures that encoding processes remain optimized by dynamically reallocating computational workloads to underutilized processing nodes.

The compliance-aware feedback controller continuously monitors system performance, identifying inefficiencies such as prolonged encoding times, suboptimal resource utilization, or excessive latency. When detected, the system proactively redistributes workloads across multiple virtualized processing nodes to maintain encoding efficiency without manual intervention. This automated workload balancing is particularly beneficial in cloud computing environments, where fluctuating workloads and varying computational demands require dynamic adjustments.

Unlike traditional encoding systems that rely on fixed resource allocation, the compliance-aware feedback mechanism, of the present invention, uses AI-driven predictive analytics to assess real-time system conditions. Machine learning models analyze workload patterns, energy consumption, and encoding performance metrics to determine optimal resource redistribution strategies. By leveraging distributed computing infrastructure, the system prevents performance degradation, reduces bottlenecks, and optimizes throughput.

Additionally, the workload redistribution process incorporates compliance-driven policies to ensure regulatory adherence while managing resource allocation. For example, in environments subject to data protection mandates like GDPR, HIPAA, or FIPS 140-3, the system ensures that encoding operations remain compliant by dynamically adjusting processing assignments based on jurisdictional constraints. This feature contrasts with prior approaches, which often required manual intervention or static workload configurations, leading to inefficiencies and potential compliance risks.

By implementing automated workload redistribution, the compliance-aware feedback controller enhances the adaptability and resilience of the encoding system, ensuring that virtualized encoding processes remain efficient, responsive, and aligned with security and compliance requirements.

In step 5008, the compliance-driven feedback controller can include a quantum-resistant encoding module implementing lattice-based cryptography for post-quantum security. As quantum computing continues to advance, traditional cryptographic methods such as RSA and ECC face increasing vulnerabilities due to the potential for quantum-based decryption attacks. The lattice-based cryptographic approach ensures that encoding operations remain secure against emerging quantum threats.

The quantum-resistant encoding module leverages structured lattices to create complex mathematical problems that are infeasible to solve within practical timeframes, even for quantum processors. This cryptographic foundation enhances the integrity of the encoding process while maintaining computational efficiency. Unlike traditional cryptographic schemes that rely on factoring large prime numbers or discrete logarithms—both of which can be efficiently broken by Shor's algorithm in quantum computing—lattice-based encryption techniques remain resistant to such attacks.

The compliance-driven feedback controller dynamically integrates quantum-resistant encoding techniques with multi-layered security mechanisms, ensuring that data remains protected in post-quantum environments. It evaluates encryption strength against regulatory mandates such as FIPS 140-3, GDPR, and HIPAA, adapting cryptographic techniques to meet compliance requirements. This real-time adaptation differentiates the system from static cryptographic methods that lack flexibility in responding to evolving security threats.

Furthermore, the feedback controller employs AI-driven anomaly detection to assess encoding security vulnerabilities and proactively adjust encryption parameters when new quantum-related attack vectors emerge. This capability ensures that the system remains resilient in high-risk environments such as financial transactions, government data protection, and long-term encrypted storage solutions.

By incorporating lattice-based cryptography within the compliance-driven feedback controller, the system not only achieves post-quantum security but also maintains encoding efficiency through adaptive security policies. Unlike traditional approaches that impose high computational overhead for encryption-hardening techniques, the system selectively applies quantum-resistant encoding only when necessary, balancing security and performance optimally.

In step 5010, the system can further comprises a federated learning-based encoding optimization module, which is configured to aggregate encoding state transitions from multiple distributed computing environments to improve state selection accuracy. This module enhances the adaptive encoding framework by allowing multiple independent computing environments to collaborate without sharing raw data, maintaining privacy while optimizing encoding decision-making.

In traditional encoding optimization models, encoding transitions are often predefined or rely on centralized learning models that require significant computational overhead. These models typically lack the ability to dynamically adjust based on real-time workload variations across different computing infrastructures. In contrast, the federated learning-based encoding optimization module, in the present invention, distributes learning tasks across a network of computing nodes, each locally training encoding state transition models using their own workload data.

Once the local models are updated, they are transmitted to a central aggregation server, where the knowledge from each node is combined to refine a global encoding transition model. The federated learning approach prevents raw data from being shared between distributed nodes, addressing concerns related to data privacy and compliance while still allowing encoding decisions to be informed by a broad set of diverse workload conditions.

By leveraging federated learning, the encoding optimization module enhances the accuracy, adaptability, and resilience of the encoding state selection process. This ensures that the encoding framework can dynamically adjust based on operational conditions across multiple environments, including cloud computing infrastructures, edge computing systems, and hybrid multi-cloud deployments.

Additionally, the federated learning-based approach reduces latency in adapting encoding states, as decisions are based on continuously evolving global models rather than relying solely on isolated, locally trained models. This results in faster convergence times for encoding state optimizations, minimizing computational overhead while maintaining optimal encoding performance.

Unlike traditional reinforcement learning-based encoding models that require extensive retraining in response to new workloads, the federated learning-based module incrementally refines encoding strategies as new data is processed across distributed environments. This allows encoding transitions to adapt dynamically without requiring manual tuning or intervention from system administrators.

The federated learning-based encoding optimization module addresses key challenges in distributed encoding optimization by:

Reducing computational overhead by enabling decentralized learning;
Enhancing adaptability by continuously refining encoding state transition models;
Maintaining data privacy by avoiding raw data sharing;
Improving encoding efficiency across diverse infrastructure types; and
Other types and or kinds of optimizations.

Through the integration of federated learning, the encoding system achieves higher predictive accuracy in encoding state selection while ensuring compliance with data privacy regulations, making it particularly advantageous for use in highly distributed environments such as IoT networks, cloud-native applications, and AI-driven data centers.

In step 5012, the compliance-aware feedback controller integrates distributed ledger-based encoding audit trails to track encoding state changes and ensure data integrity. This implementation enables an immutable and verifiable record of encoding transitions, which enhances security, regulatory compliance, and forensic traceability.

Distributed ledger technology is leveraged to maintain a decentralized ledger of encoding state transitions. Each encoding operation is logged as a cryptographic transaction within a distributed ledger, ensuring that any modification to the encoding process is securely recorded and cannot be altered retroactively. This prevents unauthorized tampering, providing an auditable chain of evidence for encoding actions.

The integration of distributed ledger-based audit trails also facilitates compliance with security and data protection regulations such as GDPR, HIPAA, and FIPS 140-3. Traditional logging mechanisms rely on centralized databases, which are vulnerable to unauthorized modifications, whereas the distributed ledger-based approach ensures that encoding transition logs remain tamper-proof and accessible for compliance verification.

Moreover, the compliance-aware feedback controller can utilize smart contracts to automate policy enforcement. For instance, if an anomalous encoding state transition is detected—such as an unapproved security downgrade—the system can trigger an automated rollback to a compliant encoding level or notify security administrators of potential unauthorized activity. This ensures that encoding processes maintain integrity across dynamically adaptive virtualized environments.

Unlike prior encoding systems that rely on centralized logging mechanisms, which are susceptible to corruption or data loss, the present invention system's distributed ledger integration ensures decentralized, immutable auditability. This enhances the reliability of encoding audit trails for forensic analysis, providing a secure and transparent mechanism to verify historical encoding transitions while minimizing the risk of malicious alterations.

By implementing distributed ledger-based encoding audit trails, the compliance-aware feedback controller establishes a verifiable, tamper-resistant framework for tracking encoding state changes, ensuring robust data integrity and regulatory adherence across multi-state encoding environments.

In step 5014, the system incorporates a cross-platform encoding synchronization mechanism to ensure consistent encoding state transitions across distributed computing environments. This synchronization mechanism is essential for maintaining encoding integrity across geographically dispersed data centers, cloud environments, and edge computing nodes.

In distributed computing environments, encoding inconsistencies can arise due to variations in network latency, hardware capabilities, and regional compliance requirements. The cross-platform encoding synchronization mechanism addresses these challenges by implementing real-time state harmonization protocols that monitor and align encoding transitions across multiple platforms. By dynamically adjusting encoding parameters based on system-wide telemetry data, the mechanism ensures that all nodes operate within a unified encoding framework.

Unlike conventional encoding systems that rely on periodic synchronization updates, which may introduce delays and inconsistencies, the present invention system can employ an AI-driven synchronization controller. This controller continuously analyzes encoding transitions and applies predictive correction strategies to prevent state mismatches. The synchronization controller also integrates adaptive learning models that refine encoding strategies over time, ensuring that transitions remain optimized for evolving workloads and security constraints.

A key advantage of this approach is its ability to facilitate seamless encoding transitions between cloud-hosted applications, edge computing nodes, and on-premise data centers. This cross-platform consistency enhances the reliability of distributed data processing pipelines, particularly in industries such as financial transactions, healthcare data security, and high-performance computing environments where encoding precision is critical.

Additionally, the synchronization mechanism supports dynamic encoding state negotiations between independent systems operating within federated computing networks. This feature enables organizations to enforce encoding policies across multi-tenant cloud environments, ensuring that encoding transitions adhere to regulatory mandates such as GDPR, HIPAA, and FIPS 140-3.

By integrating a cross-platform encoding synchronization mechanism, the system significantly improves data consistency, encoding efficiency, and interoperability across complex distributed architectures.

In step 5016, the compliance-aware feedback orchestration layer is designed to dynamically adjust encoding complexity and encryption parameters based on detected regulatory compliance changes. This enables real-time adaptation to jurisdictional requirements such as GDPR, HIPAA, and FIPS 140-3, ensuring that the encoding process remains compliant without the need for manual intervention.

In an exemplary embodiment, the compliance-aware feedback orchestration layer continuously monitors legal and regulatory frameworks that influence data protection and encryption standards. When a regulatory update is detected—such as changes in encryption key management policies or newly imposed data retention requirements—the system dynamically adjusts encoding parameters to align with the latest compliance mandates.

Unlike prior static encoding frameworks that require periodic manual policy updates, the compliance-aware feedback orchestration layer, of the present invention, integrates AI-driven regulatory analysis to automate compliance adjustments. This eliminates delays associated with human intervention and ensures that encoding states are always aligned with evolving security and legal requirements.

For instance, in response to a newly enacted law requiring higher encryption standards for financial transactions, the system can increase the encoding complexity by transitioning to a higher-order cryptographic scheme, such as lattice-based cryptography, which offers post-quantum security. Similarly, if regulations demand a more power-efficient approach to data security, the system may optimize encoding transitions to balance security with computational overhead.

By integrating real-time policy adaptation, the compliance-aware feedback orchestration layer enhances the system's capability to provide continuous regulatory adherence, ensuring that data handling, encryption strength, and encoding processes remain up to date with legal mandates while maintaining system performance.

In step 5018, the virtualized encoding engine dynamically modulates memory allocation for encoding processes based on virtualized system load balancing policies to reduce latency. The ability to adjust memory allocation in response to real-time workload variations ensures optimal resource distribution across the distributed computing environment.

In conventional encoding frameworks, memory allocation is often static or pre-configured based on estimated workloads, leading to inefficiencies when processing demands fluctuate. In contrast, the present invention system employs an adaptive memory modulation mechanism that continuously assesses virtualized system load-balancing policies. This assessment allows the virtualized encoding engine to allocate or deallocate memory resources dynamically, thereby minimizing latency and avoiding processing bottlenecks.

The memory allocation modulation is guided by real-time performance telemetry, which includes encoding task complexity, computational load distribution, and available memory bandwidth. By leveraging AI-driven workload monitoring, the system can predict upcoming memory constraints and preemptively adjust allocation strategies before bottlenecks occur. For instance, if an encoding process detects an increase in computational demand due to higher-order encoding transitions, additional memory resources can be provisioned instantaneously, preventing performance degradation.

Moreover, the integration of virtualization-aware resource management allows the system to dynamically redistribute memory among multiple virtualized instances based on encoding priority levels. For example, workloads executing latency-sensitive encoding operations can be assigned higher memory allocations, while less critical encoding tasks can operate with lower memory footprints. This ensures that performance-sensitive applications maintain consistent processing speeds, even under peak computational loads.

Unlike prior systems that relied on static provisioning, which often led to inefficient resource usage or memory exhaustion, the present approach optimizes encoding efficiency through intelligent, policy-driven memory modulation. The virtualization layer continuously refines its memory management policies using historical usage trends and real-time system feedback, enabling seamless adaptation to varying encoding workloads.

By implementing this adaptive memory allocation strategy, the system achieves significant improvements in latency reduction, workload scalability, and overall encoding performance across distributed virtualized environments.

In step 5020, the virtual encoding engine supports homomorphic encryption, allowing secure computations on encrypted data without decryption, ensuring data confidentiality during encoding operations. Homomorphic encryption enables data processing in an encrypted state, mitigating the risk of unauthorized access during computation.

In conventional encryption systems, data must be decrypted before processing, exposing it to potential security vulnerabilities. In the present invention, this step overcomes this limitation by allowing operations to be performed directly on encrypted data, preserving confidentiality throughout the encoding and decoding pipeline. The virtual encoding engine applies various homomorphic encryption schemes, including partially homomorphic encryption (PHE) for lightweight operations, somewhat homomorphic encryption (SHE) for mid-range computational tasks, and fully homomorphic encryption (FHE) for complex multi-step processing.

To enhance performance, the system integrates homomorphic encryption with hardware acceleration technologies, such as virtualized field-programmable gate arrays (vFPGAs), virtualized graphics processing units (vGPUs), and containerized tensor processing units (cTPUs). These hardware-accelerated components improve the computational efficiency of homomorphic encryption, addressing its traditionally high processing overhead.

The compliance-aware feedback controller ensures that encryption techniques align with security mandates such as GDPR, HIPAA, and FIPS 140-3 by dynamically adjusting encryption parameters based on evolving regulatory standards. Unlike conventional cryptographic models that require manual reconfiguration to meet new compliance requirements, the system automatically updates encryption policies to maintain adherence to jurisdictional mandates.

In practical applications, this capability is particularly beneficial for privacy-preserving machine learning, secure multi-party computations, and financial data processing, where encrypted datasets must be analyzed without compromising confidentiality. Unlike prior approaches that require complex key management systems to facilitate secure computations, this system simplifies cryptographic operations by embedding homomorphic encryption within the encoding engine itself, thereby reducing processing latency and operational complexity.

By enabling secure computations without exposing sensitive data, the system ensures that encryption-based encoding operations remain resilient against emerging cyber threats and unauthorized access attempts. This provides a robust framework for privacy-centric applications requiring high-performance encoding and computational integrity.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for adaptive multi-state encoding and processing in a virtualized computing environment, the system comprising:
 a software-defined virtualized state selection module instantiated within virtual machines or containerized instances, the software-defined virtualized state selection module including artificial intelligence (AI)-driven control logic, the software-defined virtualized state selection module configured to:
  monitor system performance telemetry, including processing load, power consumption, thermal dissipation, network bandwidth, and security requirements;
  determine an encoding state from a set of encoding levels, including binary, ternary, quaternary, and higher-order encoding states;
  calculate a state morph coefficient (SMC) quantifying transition efficiency between encoding states;
  apply a machine learning model, including a reinforcement learning model, using the SMC within a reward function weighted by energy savings, latency reduction, and compliance accuracy; and
  adjust the encoding state based, in part, on telemetry and compliance triggers, predicted encoding state transitions, cryptographic compliance constraints, and encoding policy outcomes;
 a hardware-accelerated virtual encoding engine operatively coupled to the virtualized state selection module, the hardware-accelerated virtual encoding engine comprising virtualized field-programmable gate arrays (vFPGAs), virtualized graphics processing units (vGPUs), or containerized tensor processing units (cTPUs), with central processing unit (CPU) failover mode, the hardware-accelerated virtual encoding engine configured to:
- transition between binary, ternary, quaternary, and higher-order encoding states based on telemetry feedback and compliance signals;
- execute encoding operations utilizing one or more hardware acceleration modules, including virtualized field-programmable gate arrays (vFPGAs), virtualized graphics processing units (vGPUs), or containerized tensor processing units (cTPUs);
- implement entropy-based encoding techniques to dynamically adjust encoding complexity; and
- support the CPU failover mode when hardware accelerators are unavailable, preserving entropy continuity;

a virtual decoding engine configured to:
- decode data in accordance with the dynamically selected encoding state;
- perform error correction, signal integrity verification, and adaptive redundancy correction; and
- validate data integrity using zero-knowledge proof-based verification without exposing original data;

a policy-constrained compliance-driven feedback controller implemented as a tri-layer compliance loop with reinforcement learning integration, the policy-constrained compliance-driven feedback controller configured to:
- continuously evaluate encoding operations against jurisdictional or organization-specific compliance frameworks, including GDPR, HIPAA, and FIPS;
- trigger encoding policy reconfiguration events based on threat levels, compliance changes, or performance anomalies;
- tune entropy and cryptographic complexity based on regulatory risk level;
- modify encoding transitions in response to anomalies, jurisdictional updates, or threat patterns;
- a policy-driven override interface providing one or more user-configurable prioritization options, enabling selection of encoding strategies based on predefined operational goals, including security, latency, energy efficiency, or regulatory adherence;

wherein the system is further configured to:
- dynamically integrate reinforcement learning-based state selection with federated learning-based policy refinement and a distributed ledger configured for use as a distributed ledger based compliance verification;
- perform encoding transitions optimized in real-time by combining workload telemetry, compliance trust scoring, and regulatory policy triggers;
- generate and verify zero-knowledge proofs in conjunction with smart contract logic to enforce encoding policy adherence, thereby enabling provable compliance while preserving data confidentiality in federated and distributed environments; and
- resolve conflicts between real-time telemetry signals and the one or more user-configurable prioritization options by applying a weighted policy resolution engine, wherein the integration of reinforcement-learning-driven SMC computation, compliance-triggered cryptographic transitions, and hardware-accelerated failover provides a non-conventional encoding architecture that improves throughput, compliance automation, and security resilience.

2. The system of claim 1, further comprising a federated learning-based encoding optimization module configured to:
- aggregate encoding state transitions and compliance outcomes from distributed nodes;
- refine a global encoding model based on feedback from participating client nodes;
- compute one or more trust scores for each node, using a weighted combination of audit integrity scores derived from cryptographically verifiable logs, historical compliance adherence metrics, frequency and severity of prior policy violations, and node uptime and update responsiveness;
- apply a compliance-weighted model aggregation mechanism, wherein the one or more trust scores derived from compliance history, audit trail integrity, and successful encoding transitions determine the influence of each node's update on the global model;
- periodically retrain the federated model using a machine learning reward function, including reinforcement learning, weighted by global system performance indicators and compliance policy satisfaction;
- ensure privacy preservation and data locality by sharing updates using differential privacy or homomorphic encryption techniques, thereby preventing exposure of raw content during aggregation; and
- support asynchronous node participation to account for decentralized update availability, thereby improving system robustness.

3. The system of claim 2, wherein the virtualized state selection module is further configured to:
- weight encoding state decisions based on energy consumption models for edge and constrained nodes;
- incorporate region-specific data residency rules to restrict encoding transitions that may violate jurisdictional compliance boundaries;
- model energy prioritization based on telemetry-derived cost estimates, such as power grid strain or device thermal profiles; and
- wherein smart contract logic enforces encoding policy compliance for applications involving financial data transmission, medical record storage, and AI-generated content audit logs.

4. The system of claim 1, wherein the compliance-driven feedback controller is configured to:
- integrate operation of the distributed ledger with either a zero-knowledge proof (ZKP) module, a smart contract execution engine, or both;
- utilize the smart contract execution engine to:
  - jointly verify and enforce compliance policies;
  - automatically evaluate compliance benchmarks against encoding state transitions;
  - trigger alerts upon threshold violations;
  - log corresponding ZKP attestations to the distributed ledger;
- enable the ZKP module to generate proofs of compliance validity without disclosing underlying encoding parameters, and to forward said proofs to the distributed ledger for immutable auditability;
- distribute the distributed ledger across internal security auditors and external regulatory agencies to provide shared, tamper-resistant compliance oversight; and include timestamped audit entries and encoded state hashes as part of the ZKP attestations logged to the distributed ledger.

5. The system of claim 1, wherein the virtual encoding engine configured to:
supports homomorphic encryption techniques that enable secure computation directly on encrypted data without requiring decryption; and
ensures data confidentiality throughout encoding operations by maintaining cryptographic integrity during processing.

6. The system of claim 1, further comprising a cross-platform encoding synchronization mechanism configured to:
ensure consistent encoding state transitions across distributed cloud and edge computing environments;
compare telemetry data across participating nodes to identify encoding state mismatches;
verify encoding state legitimacy using smart contract and zero-knowledge proof attestations; and
initiate fallback synchronization procedures to restore encoding state alignment based on predefined recovery thresholds or confidence metrics.

7. The system of claim 1, wherein the compliance-driven feedback controller includes a quantum-resistant encoding module implementing lattice-based cryptography configured to:
implement cryptographic encoding modes based on lattice-based primitives or NTRUEncrypt; and
operate within high-entropy encoding state transitions to ensure resilience against decryption attempts by quantum computing systems.

8. The system of claim 1, wherein the compliance-driven feedback controller configured to:
monitor for changes in jurisdictional or organizational data protection regulations; and
trigger automatic reconfiguration of encoding complexity and encryption parameters in response to detected regulatory compliance updates.

9. The system of claim 1, wherein the virtualized state selection module further comprises an AI-driven anomaly detection model configured to:
proactively identify irregular or nonconforming encoding patterns based on historical and real-time telemetry data; and
dynamically adjust encoding parameters in response to detected anomalies to maintain performance, security, and compliance thresholds.

10. A method of using the system of claim 1, the method comprising:
monitoring real-time telemetry, including processing load, network bandwidth, power consumption, compliance status, and latency indicators;
selecting the encoding state from a plurality of available states based on a weighted analysis of performance constraints, security risks, and regulatory compliance mandates, using a machine learning model including reinforcement learning;
transitioning between the encoding state, in real-time, based on telemetry-driven efficiency metrics and compliance triggers;
reallocating processing resources to optimize throughput and energy consumption under dynamic workloads;
validating encoded data integrity and compliance status using zero-knowledge proofs;
recording encoding operations and compliance metadata to a distributed ledger to ensure auditability and tamper-resistant regulatory verification; and
retraining the machine learning model using telemetry data derived from encoding outcomes and compliance audit feedback.

11. The system of claim 1, wherein the compliance-driven feedback controller further comprises a threat exception module configured to:
detect advanced threat patterns, including policy spoofing, adversarial encoding transitions, or anomaly-triggered compliance violations;
trigger emergency encoding state locks or fallback to predefined secure states in response to confirmed or suspected compliance breaches; and
trigger a rollback to a secure encoding state and log the one or more user-configurable prioritization options with a cryptographic signature and a timestamp.

12. The system of claim 1, wherein the virtual encoding engine and the compliance feedback controller are deployed across a container orchestration framework selected from the group consisting of Kubernetes, Docker Swarm, OpenShift, or equivalent orchestration environments supporting container scheduling and policy enforcement.

13. A system for adaptive multi-state encoding and processing in a virtualized computing environment, the system comprising:
a distributed virtualized state selection module, instantiated within virtual machines or containerized instances, the distributed virtualized state selection module including artificial-intelligence (AI)-based predictive models or supervised anomaly forecasting, the distributed virtualized state selection module configured to:
monitor telemetry, including computational workload, memory utilization, power allocation, security policies, and encoding latency metrics; and
dynamically adjust encoding states across cloud environments using AI-driven predictive analytics to optimize performance and reduce processing impact;
a virtual encoding engine instantiated within a distributed cloud computing environment, the virtual encoding engine configured to:
execute encoding operations within a hardware-accelerated virtualization framework; and
dynamically modulate encoding entropy levels in response to detected network congestion, workload spikes, and adaptive security profiles;
a compliance-driven feedback controller configured to:
automatically reallocate computing resources across nodes in real time upon anomaly detection to mitigate performance degradation and reduce virtualization overhead; and
detect anomalous latency spikes, inefficient encoding transitions, and emerging security threats using AI-driven threat intelligence models;
a policy-driven override interface configured to:
enable administrators to define encryption security thresholds and compliance requirements; and
activate emergency encoding lockdown modes in response to anomaly detections or compliance violations;
wherein integration of predictive telemetry-driven state selection, entropy modulation within a hardware-accelerated virtualization framework, anomaly-responsive compliance reallocation, and administrator-configurable policy overrides operates as a virtualized threat-adaptive encoding architecture incorporating post-quantum cryptographic routines and real-time anomaly detection, thereby providing a non-conventional encoding system resilient to performance anomalies and evolving security threats.

14. The system of claim 13, further comprising a multi-tenant encoding isolation module configured to:
segregate encoding processes to prevent data leakage across virtualized environments while maintaining encoding efficiency;
enforce tenant-specific state transition rules, compliance policies, and encoding histories; and
maintain encoding efficiency and performance scalability within shared or containerized infrastructure.

15. The system of claim 13, wherein the virtualized state selection module further comprises an AI-driven anomaly detection model configured to:
proactively identify irregular or abnormal encoding patterns based on historical telemetry, behavioral baselines, or deviation thresholds; and
dynamically adjust encoding state selection parameters in response to detected anomalies to preserve system performance, security posture, and compliance alignment.

16. A method of using the system of claim 13, the method comprising:
instantiating a virtualized multi-state encoding engine within a distributed cloud or edge computing infrastructure;
monitoring system resource allocation, encoding load distribution, and virtualized power consumption across active nodes; and
dynamically adjusting encoding states using AI-based predictive models to optimize system latency and energy efficiency in real time.

17. A system for adaptive multi-state encoding and processing in a virtualized computing environment, the system comprising:
a virtualized state selection module instantiated within virtual machines or containerized instances;
a virtual encoding engine operatively coupled to the virtualized state selection module and configured as a virtualized threat-adaptive encoding engine, the virtualized threat-adaptive encoding engine comprising artificial intelligence (AI) anomaly detection logic and lattice-based cryptographic circuitry or software routines, the virtualized threat-adaptive encoding engine configured to:
apply multi-layered encryption encoding techniques, including homomorphic encryption, lattice-based cryptography, and adaptive obfuscation methodologies; and
predict potential encryption vulnerabilities using unsupervised machine learning models, including clustering or autoencoder-based anomaly detection trained on historical threat telemetry and attack signatures:
dynamically adjust encoding redundancy factors to improve data survivability in environments subject to data injection attacks or packet manipulation;
a compliance-driven feedback controller configured to:
continuously evaluate regulatory compliance adherence based on current security policies and threat context;
align encoding structures with jurisdiction-specific mandates, including GDPR, HIPAA, and FIPS 140-3 by adjusting encoding states accordingly;
a policy-driven override interface configured to:
enable security administrators to define encryption security thresholds and compliance requirements; and
activate emergency encoding lockdown modes in response to anomaly detections or compliance violations;
wherein the integration of anomaly-driven redundancy adjustment, lattice-based post-quantum cryptography, and administrator-triggered compliance lockdown provides a non-conventional security architecture resilient to evolving threats.

18. The system of claim 17, wherein the virtualized threat-adaptive encoding engine further comprises an AI-driven anomaly detection framework configured to:
predict potential encryption vulnerabilities based on historical threat data, attack signatures, and real-time anomaly patterns; and
balance encryption strength with processing load and resource constraints to maintain secure and efficient system performance.

19. The system of claim 17, wherein the virtualized threat-adaptive encoding engine incorporates quantum-resistant encoding techniques configured to:
utilize post-quantum cryptographic algorithms, including lattice-based cryptography and NTRUEncrypt; and
ensure encryption resilience against quantum computing decryption attacks while maintaining interoperability with multi-layered security protocols.

20. A method of using the system of claim 17, the method comprising:
selecting an encoding state based on a combination of detected cybersecurity threats and applicable regulatory compliance mandates, including telemetry from intrusion detection systems (IDS), data access anomalies, or risk scoring engines; and
dynamically transitioning between encoding states in response to evolving threat intelligence and policy triggers to harden encryption against unauthorized interception or manipulation.

* * * * *